United States Patent
Dvorak

(10) Patent No.: US 11,182,548 B2
(45) Date of Patent: Nov. 23, 2021

(54) METHODS AND SYSTEMS FOR PROVIDING SELECTIVE MULTI-WAY REPLICATION AND ATOMIZATION OF CELL BLOCKS AND OTHER ELEMENTS IN SPREADSHEETS AND PRESENTATIONS

(71) Applicant: Adaptam Inc., Atherton, CA (US)

(72) Inventor: Robert E. Dvorak, Atherton, CA (US)

(73) Assignee: Adaptam Inc., Atherton, CA (US)

( * ) Notice: Subject to any disclaimer, the term of this patent is extended or adjusted under 35 U.S.C. 154(b) by 0 days.

(21) Appl. No.: 16/031,339

(22) Filed: Jul. 10, 2018

(65) Prior Publication Data

US 2019/0012308 A1    Jan. 10, 2019

Related U.S. Application Data

(60) Provisional application No. 62/530,786, filed on Jul. 10, 2017, provisional application No. 62/530,835, (Continued)

(51) Int. Cl.
*G06F 17/00* (2019.01)
*G06F 40/186* (2020.01)
(Continued)

(52) U.S. Cl.
CPC .............. *G06F 40/186* (2020.01); *G06F 8/34* (2013.01); *G06F 16/901* (2019.01); *G06F 16/903* (2019.01); *G06F 17/11* (2013.01); *G06F 40/103* (2020.01); *G06F 40/16* (2020.01); *G06F 40/174* (2020.01); *G06F 40/18* (2020.01); *G06F 40/205* (2020.01); *G06F 9/453* (2018.02)

(58) Field of Classification Search
CPC .... G06F 17/248; G06F 17/212; G06F 17/211; G06F 17/2288; G06F 16/93; G06F 40/103; G06F 40/186; G06F 40/16; G06F 40/205
See application file for complete search history.

(56) References Cited

U.S. PATENT DOCUMENTS 5,815,421 A    9/1998  Dulong et al.
6,038,567 A *  3/2000  Young .................. G06F 40/103
(Continued)

OTHER PUBLICATIONS

Understanding Styles in Microsoft Word—A Tutorial in the Intermediate Users Guide to Microsoft Word, last edited by Charles Kenyon on Apr. 30, 2017, retrieved from http://www.addbalance.com/usersguide/styles.htm, archived on Jun. 30, 2017.*
(Continued)

*Primary Examiner* — Scott T Baderman
*Assistant Examiner* — Barbara M Level
(74) *Attorney, Agent, or Firm* — Haynes Beffel & Wolfeld, LLP; Ernest J. Beffel, Jr.

(57) ABSTRACT

The disclosed technology includes multi-way triggering of automatic replication elements selectively within and across documents, cellular atomization of spreadsheet cells and charts while retaining their desired formula, function and content properties, combining the selective multi-way replication with the cellular atomization, and employing a library capability to easily reuse automatically coordinating elements and atomized spreadsheet or tabular cells and charts.

12 Claims, 51 Drawing Sheets
(48 of 51 Drawing Sheet(s) Filed in Color)

Related U.S. Application Data filed on Jul. 10, 2017, provisional application No. 62/530,794, filed on Jul. 10, 2017.

(51) Int. Cl.

| | |
|---|---|
| *G06F 8/34* | (2018.01) |
| *G06F 40/16* | (2020.01) |
| *G06F 40/18* | (2020.01) |
| *G06F 40/103* | (2020.01) |
| *G06F 40/174* | (2020.01) |
| *G06F 40/205* | (2020.01) |
| *G06F 16/903* | (2019.01) |
| *G06F 16/901* | (2019.01) |
| *G06F 17/11* | (2006.01) |
| *G06F 9/451* | (2018.01) |

(56) References Cited

U.S. PATENT DOCUMENTS

| | | |
|---|---|---|
| 6,317,750 B1 | 11/2001 | Tortolani et al. |
| 6,985,895 B2 | 1/2006 | Witkowski et al. |
| 6,988,241 B1 | 1/2006 | Guttman et al. |
| 7,099,890 B2 | 8/2006 | Cahill et al. |
| 7,117,435 B1 | 10/2006 | Kotler et al. |
| 7,120,866 B2 | 10/2006 | Kotler et al. |
| 7,155,667 B1 | 12/2006 | Kotler et al. |
| 7,302,444 B1 | 11/2007 | Dunmore et al. |
| 7,350,141 B2 | 3/2008 | Kotler et al. |
| 7,370,274 B1 * | 5/2008 | Stuple .................. G06F 40/117 715/255 |
| 7,412,645 B2 | 8/2008 | Kotler et al. |
| 7,506,242 B2 | 3/2009 | Kotler et al. |
| 7,506,243 B2 | 3/2009 | Kotler et al. |
| 7,523,390 B2 | 4/2009 | Kotler et al. |
| 7,546,533 B2 | 6/2009 | Sareen et al. |
| 7,549,115 B2 | 6/2009 | Kotler et al. |
| 7,673,227 B2 | 3/2010 | Kotler et al. |
| 7,702,997 B2 | 4/2010 | Kotler et al. |
| 7,702,998 B2 | 4/2010 | Kotler et al. |
| 7,810,032 B2 | 10/2010 | Bauchot et al. |
| 8,140,549 B2 | 3/2012 | Barinaga |
| 8,286,072 B2 * | 10/2012 | Chamberlain ........ G06F 40/106 715/215 |
| 8,312,371 B2 | 11/2012 | Ording |
| 8,341,512 B2 | 12/2012 | Sol et al. |
| 9,092,412 B2 | 7/2015 | Salch et al. |
| 9,305,176 B2 | 4/2016 | Gloski et al. |
| 9,436,637 B2 | 9/2016 | Kommanaboyina |
| 9,727,989 B2 | 8/2017 | Garg et al. |
| 9,990,349 B2 | 6/2018 | Campbell et al. |
| 10,019,758 B2 | 7/2018 | Bartolucci |
| 10,140,352 B2 | 11/2018 | Hariharan et al. |
| 10,409,892 B2 * | 9/2019 | Rothschiller ........... G06F 16/26 |
| 10,685,174 B2 * | 6/2020 | Bastide ................ G06F 40/177 |
| 2002/0036662 A1 | 3/2002 | Gauthier et al. |
| 2002/0169799 A1 | 11/2002 | Voshell |
| 2003/0009411 A1 | 1/2003 | Ram et al. |
| 2003/0110191 A1 | 6/2003 | Handsaker et al. |
| 2003/0212953 A1 | 11/2003 | Serraf |
| 2005/0044496 A1 | 2/2005 | Kotler et al. |
| 2006/0069635 A1 | 3/2006 | Ram et al. |
| 2006/0131383 A1 | 6/2006 | Battagin et al. |
| 2007/0005635 A1 | 1/2007 | Martinez et al. |
| 2007/0136666 A1 | 6/2007 | Khen et al. |
| 2010/0211862 A1 | 8/2010 | Parish et al. |
| 2013/0013994 A1 | 1/2013 | Handsaker et al. |
| 2013/0021377 A1 * | 1/2013 | Doll .......................... G09G 5/14 345/649 |
| 2013/0073939 A1 | 3/2013 | Honsowetz |
| 2015/0082137 A1 | 3/2015 | Zarpas |
| 2015/0149893 A1 * | 5/2015 | Lukic .................... G06F 40/258 715/249 |
| 2015/0254226 A1 | 9/2015 | Renshaw et al. |
| 2016/0055139 A1 * | 2/2016 | Creason ................. G06F 40/18 715/217 |
| 2016/0142488 A1 | 5/2016 | Adler et al. |
| 2016/0371249 A1 | 12/2016 | Chilakamarri et al. |
| 2017/0004125 A1 | 1/2017 | Honsowetz |
| 2017/0124046 A1 | 5/2017 | Campbell et al. |
| 2017/0124049 A1 | 5/2017 | Campbell et al. |

OTHER PUBLICATIONS

"Parts of an Algebraic Expression", Nelson Mathematics Secondary Year Two, Cycle One, 2009, Nelson Education Ltd., 4 pages.

U.S. Appl. No. 16/031,759—Office Action with Restriction Requirement dated Dec. 30, 2019, 53 pages.

"Apply multiple styles to single text selection", Microsoft Community, answers.mircrosoft,com, Apr. 9, 2018,, 3 pages (accessed Apr. 21, 2020 at https://answers.microsoft.com/en-us/msoffice/forum/msoffice_word-mso_mac-mso_mac2011/apply-multiple-styles-to-single-text-selection/654ca4ad-a202-43aa-b7e1-b4c7cdea5acb).

U.S. Appl. No. 16/031,379, filed Jul. 10, 2018, US-2019-0012305-A1, Jan. 10, 2019, Pending.

U.S. Appl. No. 16/031,759, filed Jul. 10, 2018, US-2019-0012306-A1, Jan. 10, 2019, Pending.

"Copying Formulas and using Relative and Absolute Cell References Tutorial", Mar. 16, 2016, www.teststeststests.com, pp. 1-13 (Year: 2016).

U.S. Appl. No. 16/031,759—Final Office Action dated Sep. 4, 2020, 54 pages.

U.S. Appl. No. 16/031,759—Response to Office Action dated Dec. 30, 2019, filed Jun. 1, 2020, 12 pages.

U.S. Appl. No. 16/031,379—Nonfinal Office Action dated Jul. 22, 2020, 30 pages.

U.S. Appl. No. 16/031,759—Response to Final Office Action dated Sep. 4, 2020, filed Jan. 4, 2021, 14 pages.

"How to create and share custom Stylesheets in Microsoft Word", PC World Magazine, Sep. 14, 2014, 13 pages (downloaded from https://web.archive.org/web/20140914082635/https://www.pcworld.com/article/2156364/how-to-create-and-share-custom-style-sets.html Jan. 6, 2021).

Sartain, JD, "How to create and share custom Style Sheets in Wordand PowerPoint", PC World Magazine, Aug. 8, 2018, 11 pages (downloaded from https://www.pcworld.com/article/2156364/how-to-create-and-share-custom-style-sets.html Jan. 6, 2021).

U.S. Appl. No. 16/031,379—Response to Nonfinal Office Action dated Jul. 22, 2020, filed Jan. 22, 2021, 12 pages.

www.teststeststests.com Formulas and Functions tutorial dated Jul. 22, 2020 13 pages.

U.S. Appl. No. 16/031,379 Notice of Final Rejection dated Apr. 27, 2021, 40 pages.

Microsoft Support—Turn on or off automatic bullets or numbering (downloaded from <https://support.microsoft.com/en-us/office/turn-on-or-off-automatic-bullets-or-numbering-ac3d9d00-0bb6-4421-92a6-f73e564ce71e>.

Microsoft Support—Define new bullets, numbers, and multilevel lists (downloaded from https://support.microsoft.com/en-us/office/define-new-bullets-numbers-and-multilevel-lists-6c06ef65-27ad-4893-80c9-0b944cb81f5f#style <https://support.microsoft.com/en-us/office/define-new-bullets-numbers-and-multilevel-lists-6c06ef65-27ad-4893-80c9-0b944cb81f5f>>. ).

\* cited by examiner

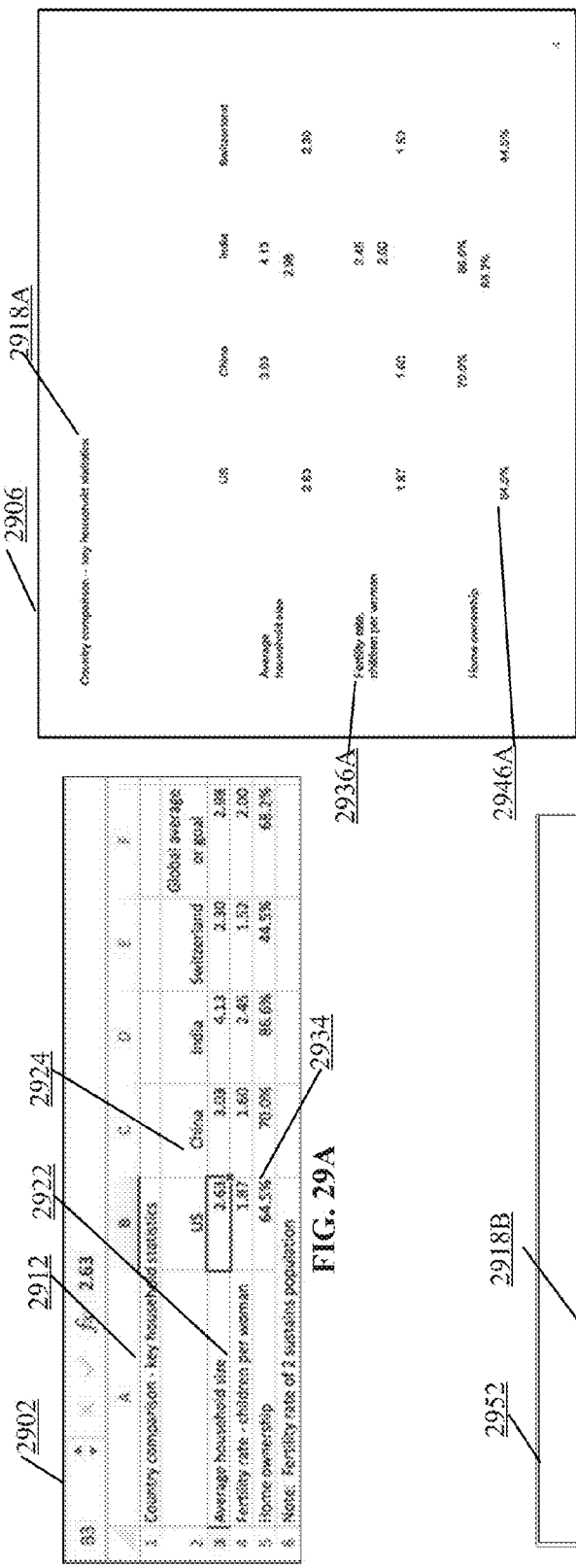
FIG. 29A
FIG. 29B
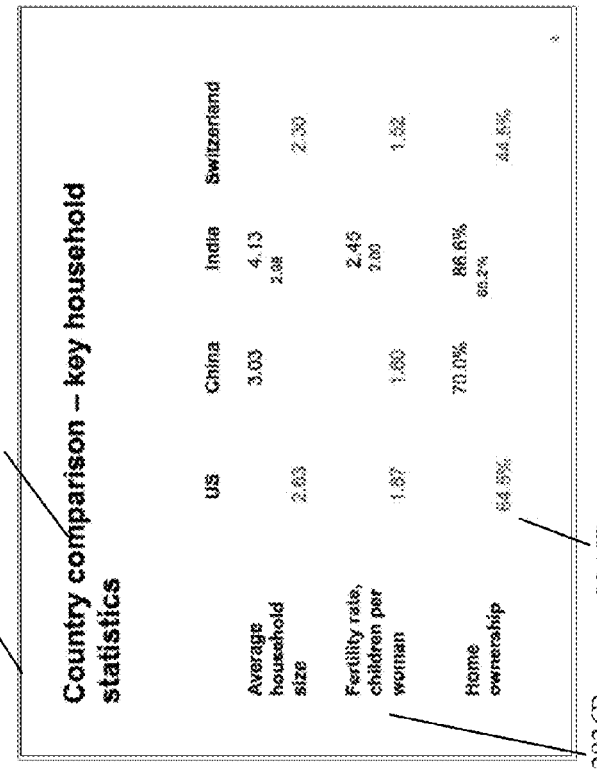
FIG. 29C
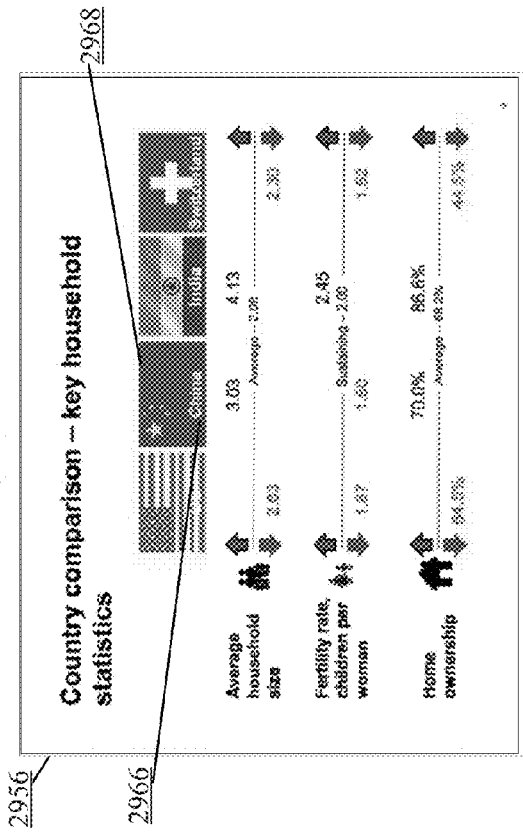
FIG. 29D

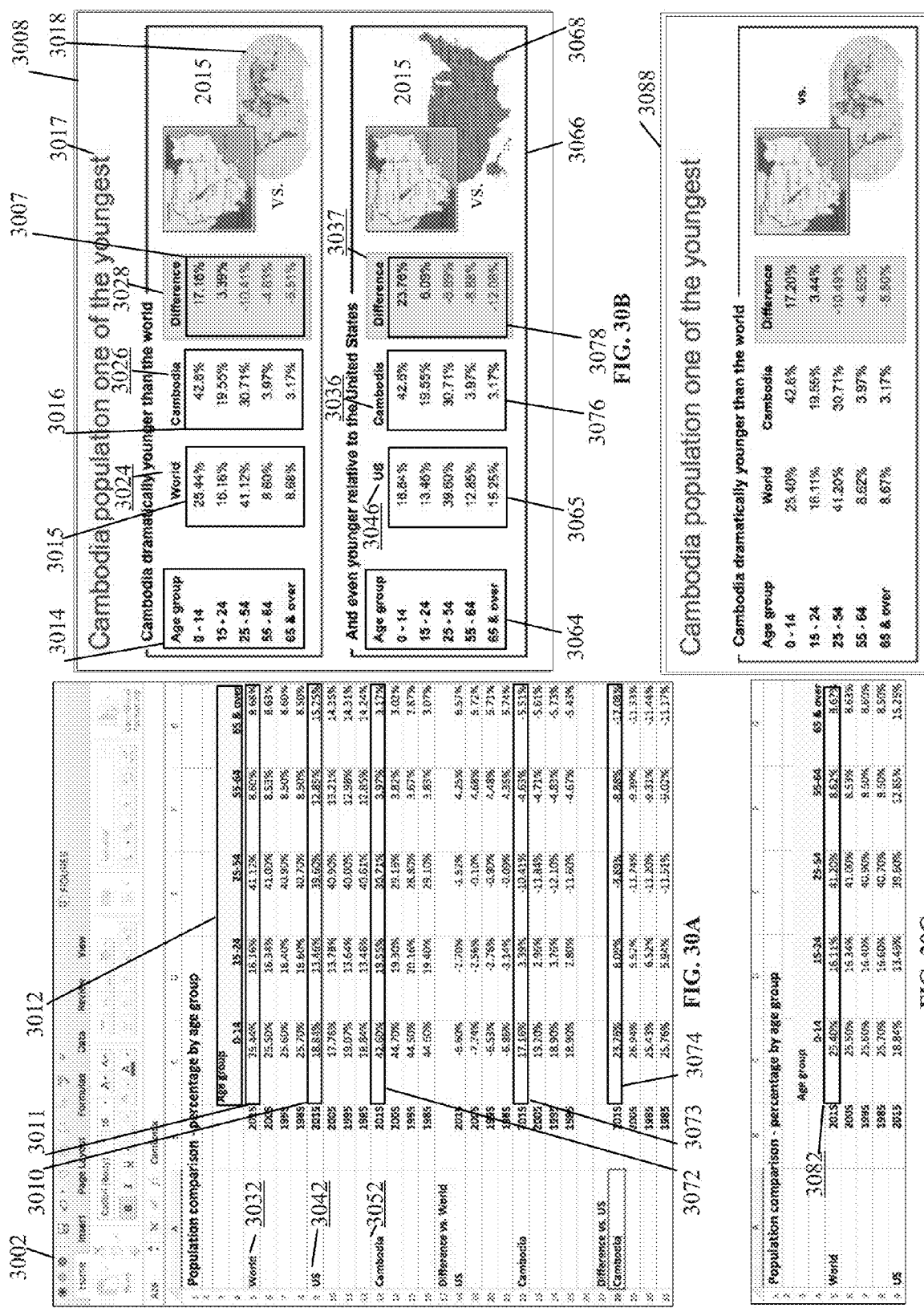
FIG. 30A / FIG. 30B / FIG. 30C / FIG. 30D

| | C14 | $f_x$ | =G9+G12+G15+G18 | | | | | | | | |
|---|---|---|---|---|---|---|---|---|---|---|---|
| | A | | B | | C | D | E | F | G | H | |
| 1 | Play development time | | | | | | | | | | |
| 2 | | | | | | | | | | | |
| 3 | Play requirement types | | | | | | | | | | |
| 4 | Script | | Mild edit | | | | | | | | |
| 5 | Casting | | Fast | | | | | | | | |
| 6 | Set | | Full production | | | | | | | | |
| 7 | | | | | Serial development | | Parallel set production | | Parallel development | | |
| 8 | | | | | Total | Elapsed | Total | Elapsed | Total | Elapsed | |
| 9 | Script development | | | | 3.0 | 3.0 | 3.0 | 3.0 | 3.0 | 3.0 | |
| 10 | | | | | | | | | | | |
| 11 | | | | | | | | | | | |
| 12 | Casting call | | | | 1.0 | 1.0 | 1.0 | 1.0 | 1.0 | 0.5 | |
| 13 | | | | | | | | | | | |
| 14 | | | | | | | | | | | |
| 15 | Set production | | | | 4.2 | 4.2 | 4.2 | 0.0 | 4.2 | 2.0 | |
| 16 | | | | | | | | | | | |
| 17 | | | | | | | | | | | |
| 18 | Rehearsal | | | | 5.4 | 5.4 | 5.4 | 5.4 | 5.4 | 3.1 | |
| 19 | Total work weeks | | | | 13.6 | | 13.6 | | 13.6 | | |
| 20 | Elapsed weeks | | | | | 13.6 | | 9.4 | | 8.6 | |

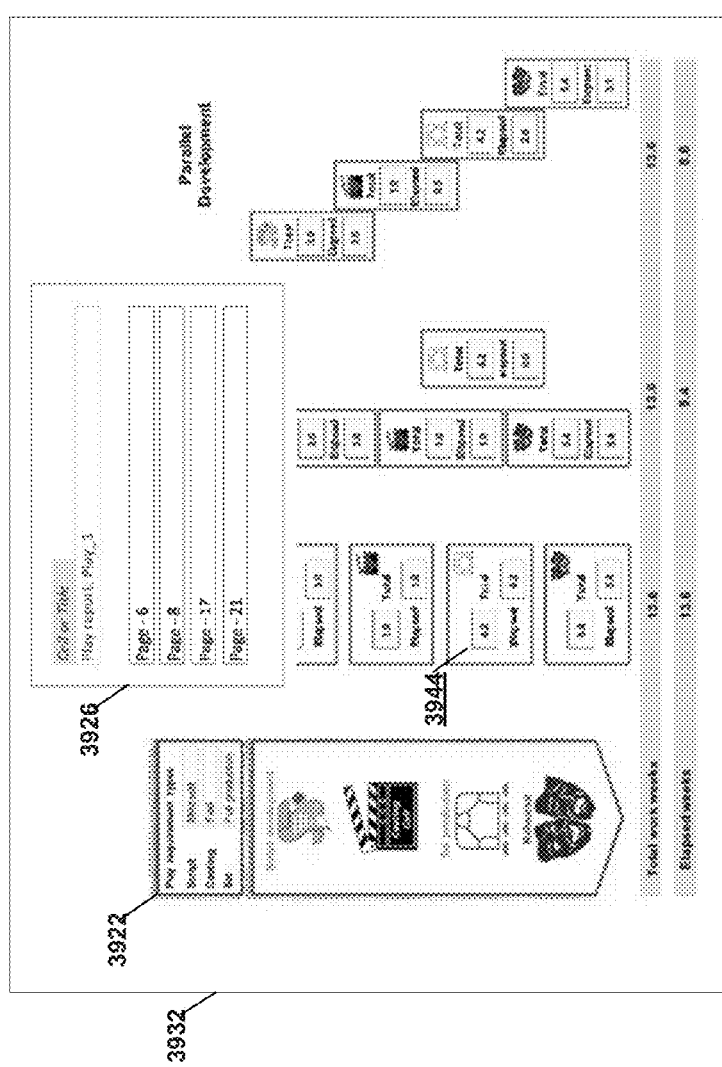
FIG. 39A
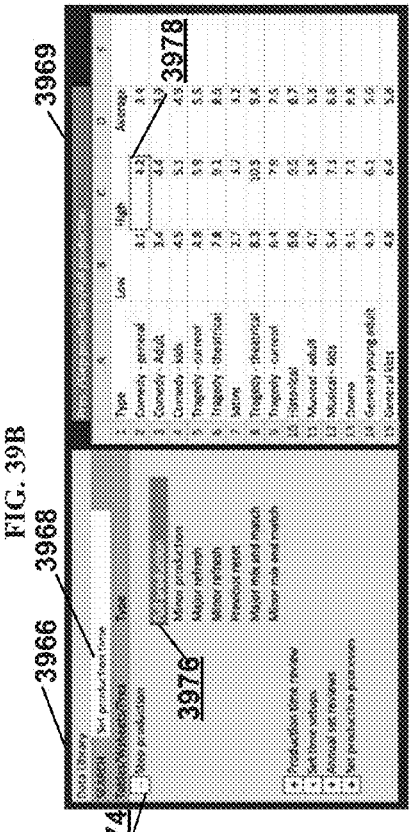
FIG. 39B
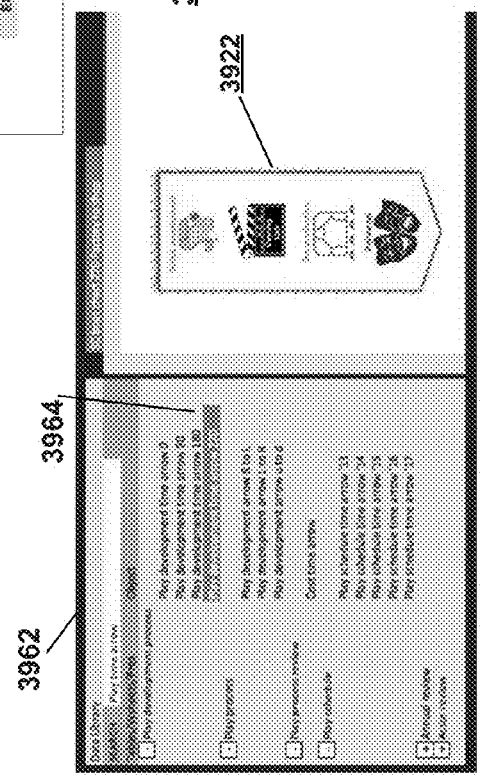
FIG. 39C
FIG. 39D

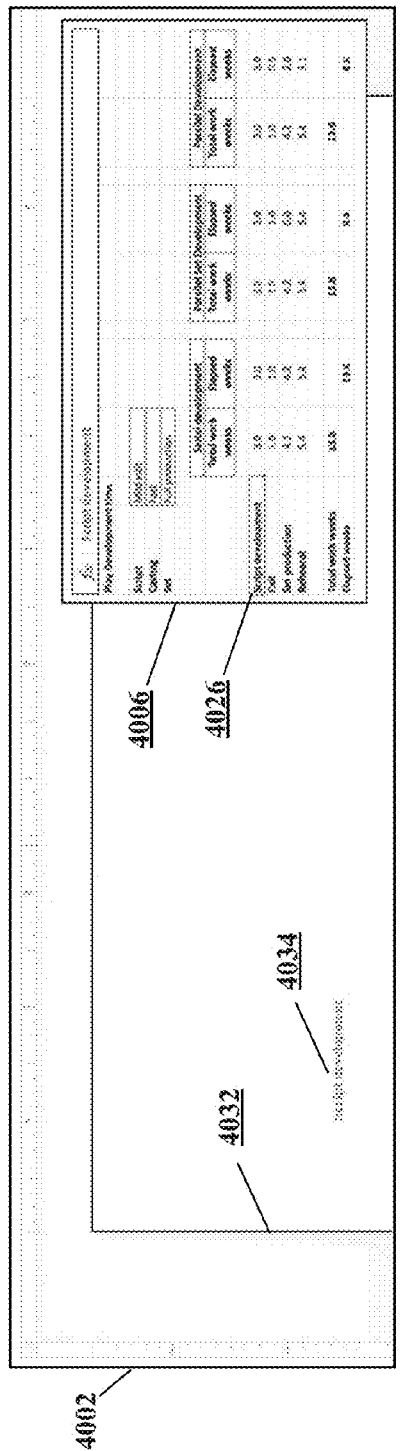
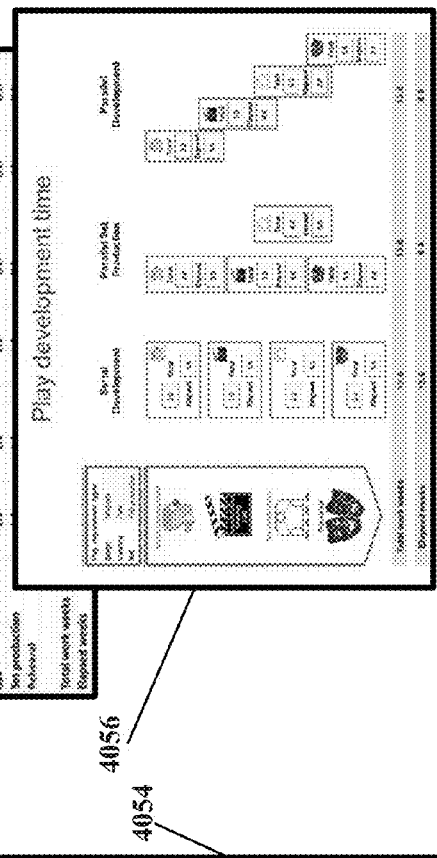
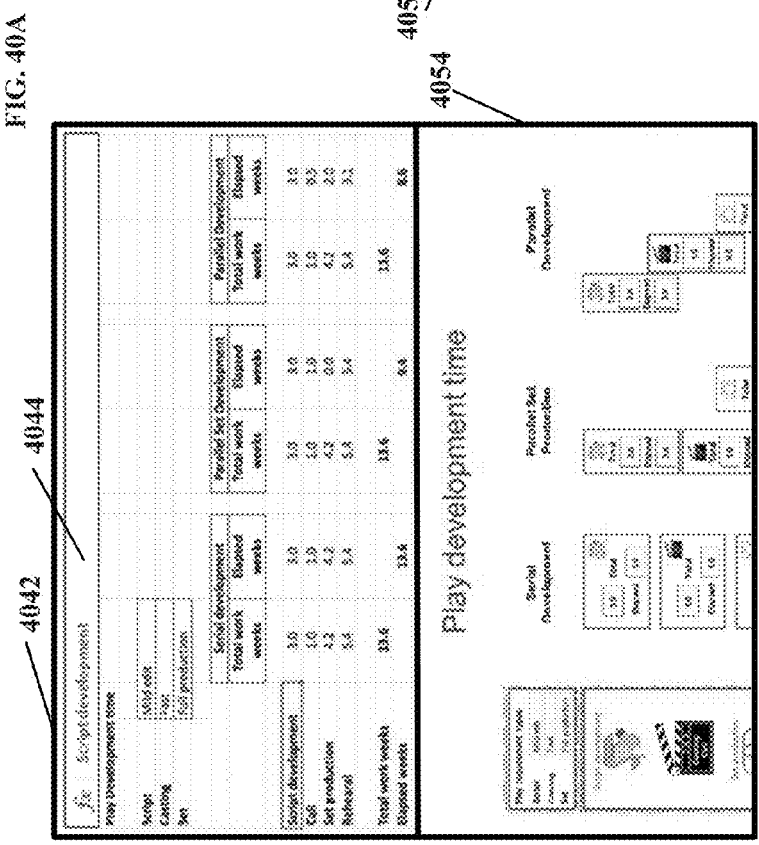
FIG. 40A
FIG. 40B
FIG. 40C

METHODS AND SYSTEMS FOR PROVIDING SELECTIVE MULTI-WAY REPLICATION AND ATOMIZATION OF CELL BLOCKS AND OTHER ELEMENTS IN SPREADSHEETS AND PRESENTATIONS

PRIORITY APPLICATIONS

This application claims the benefit of three provisional applications filed on the same day. One is U.S. Provisional Patent Application No. 62/530,835, entitled, "METHODS AND SYSTEMS FOR PROVIDING SELECTIVE MULTI-WAY REPLICATION AND ATOMIZATION OF CELL BLOCKS AND OTHER ELEMENTS IN SPREADSHEETS AND PRESENTATIONS" filed on Jul. 10, 2017. The next is U.S. Provisional Application No. 62/530,786, entitled, "METHODS AND SYSTEMS FOR CONNECTING A SPREADSHEET TO EXTERNAL DATA SOURCES WITH FORMULAIC SPECIFICATION OF DATA RETRIEVAL" filed on Jul. 10, 2017. Another is U.S. Provisional Patent Application No. 62/530,794, entitled, "METHODS AND SYSTEMS FOR CONNECTING A SPREADSHEET TO EXTERNAL DATA SOURCES WITH TEMPORAL REPLICATION OF CELL BLOCKS" filed on Jul. 10, 2017.

RELATED APPLICATIONS

This application is related to the following contemporaneously filed applications:

U.S. application Ser. No. 16/031,759, entitled, "METHODS AND SYSTEMS FOR CONNECTING A SPREADSHEET TO EXTERNAL DATA SOURCES WITH FORMULAIC SPECIFICATION OF DATA RETRIEVAL" filed on Jul. 10, 2018 and U.S. patent application Ser. No. 16/031,759, entitled, "METHODS AND SYSTEMS FOR CONNECTING A SPREADSHEET TO EXTERNAL DATA SOURCES WITH TEMPORAL REPLICATION OF CELL BLOCKS" filed on Jul. 10, 2018, now U.S. Pat. No. 11,017,165, issued May 25, 2021.

Each of the contemporaneously filed non-provisional applications claim the benefit of the three provisional applications listed above. The related and priority applications are hereby incorporated by reference for all purposes.

FIELD OF DISCLOSURE

The field of disclosure relates to automatically coordinating updates to multiple elements in a document and to the atomization of copying of spreadsheet cells and charts into other documents while retaining their formula and function properties. The field of disclosure also includes employing a library capability to easily reuse automatically-coordinating elements and atomized spreadsheet cells.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

People spend a lot of time and effort creating content in document applications such as Microsoft PowerPoint, Excel, Word, and Access, Google Slides, Sheets, Docs and Forms and Apple Keynote and Numbers. Over time, use of these applications has made some creation processes easier. However, not so much attention has been devoted to selective propagation of formatting and content over cells, worksheets, pages, slides, forms and dashboards in documents, nor has adequate attention been dedicated to integrating analytic inputs from spreadsheet applications, such as Microsoft Excel, Google Sheets, Apple Numbers and to other document applications.

Development of spreadsheet, presentation and other document software has advanced over the decades, without meaningful convergence. Technical advances have done little to facilitate use of spreadsheet analytics, or even simple data tables, in visually appealing presentations and other documents. Sophisticated spreadsheet features, such as pivot tables, have become particularly difficult to merge into presentations.

An opportunity arises to reduce the work needed to edit documents that have repeating features that follow a theme and to better integrate spreadsheet inputs into documents.

A simplified summary is provided herein to help enable a general understanding of various aspects of exemplary, non-limiting implementations described in more detail in the detailed description, accompanying drawings and claims infra. This summary is not intended as an extensive or exhaustive overview. Instead, the sole purpose of this summary is to present some concepts related to some exemplary non-limiting implementations in a simplified form as a prelude to the more detailed description of the various implementations that follow.

Other aspects and advantages of the technology disclosed can be seen on review of the drawings, the detailed description and the claims, which follow.

BRIEF DESCRIPTION OF THE DRAWINGS

This patent or application file contains at least one drawing executed in color. Copies of this patent or patent application publication with color drawing(s) will be provided by the Office upon request and payment of the necessary fee. The color drawings also may be available in PAIR via the Supplemental Content tab.

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 5 through FIG. 16 illustrate examples of selective multi-way replication property set up and then different use of those selective multi-way replication elements. FIG. 5 displays a slide with banner controls used to specify the style of the selected text box.

FIG. 6 illustrates features of an adapt tab for a build, that specifies replicating text shape and borders of a selected text box.

FIG. 7 shows example results of text box group replication.

FIG. 8A shows the slide of FIG. 7 after text customization of text box two.

FIG. 8B shows the slide of FIG. 7 after text customization of text box three.

FIG. 8C shows the slide of FIG. 7 after the remaining text boxes have been customized.

FIG. 9 illustrates the controls for a second build, after 'add new build' has been selected for a selected set of text boxes.

FIG. 10 shows example controls for style for a selected set of elements on a page.

FIG. 11 illustrates an additional way to modify a selective multi-way replication build property setting.

FIG. 12 lists five slides which use selective build: utilizing selective multi-way replication of text box content in build two.

FIG. 13 shows feature propagation results.

FIG. 14A shows slide four and text box four selected to propagate the properties of build one.

FIG. 14B shows text box three of slide three selected to propagate the properties of build one.

FIG. 14C shows text box two of slide two selected to propagate the properties of build one.

FIG. 14D shows text box one of slide one selected to propagate the properties of build one.

FIG. 15A shows slide four with text box four, with the black left-justified font of the original meeting agenda propagated across the set of slides, as discussed supra.

FIG. 15B shows a text box four selected, and with text features changed to use center-justified blue font and propagation of the change to the five agenda pages.

FIG. 15C illustrates the build 2 elements partially impacted by the FIG. 15B build 1 element changes.

FIG. 15D shows further changes to slide four, text box four and automated selective multi-way replication of those changes

FIG. 18A shows pages with elements, with builds assigned for various aspects of each element. FIG. 18B shows the user making a change to an element. FIG. 18C shows the result when the subscribers to build one for the changed build element receive the change message.

FIG. 21 illustrates gravity and orientation for an element being replicated. FIG. 22 illustrates selective orientation. FIG. 23 shows an example of auto-replication of additions: adding an additional graphic element to the graphic group.

FIG. 28C shows the results of transposing an element by 90 degrees clockwise when the element has selective transposition turned on.

FIG. 29A through FIG. 29D illustrates a spreadsheet to presentation page transition using our atomized cellular mode. FIG. 29A shows a typical simple example spreadsheet. FIG. 29B shows the atomized cellular ways a user might want to display some of the spreadsheet content of FIG. 29A into a presentation page. FIG. 29C displays user-edited changes to the formatting of content in the presentation positions. FIG. 29D displays example user-edited changes to intermingle the spreadsheet content with shapes, pictures and other content.

FIG. 30A through FIG. 30D illustrates a disclosed method for importing spreadsheet tabular cells and then supporting separating the cells for use in a presentation application. FIG. 30A shows an example spreadsheet, with a combination of numeric and formulaic cells, in which a student has developed an analysis of world population ages. FIG. 30B shows a user-constructed presentation page. FIG. 30C displays corrected world numbers for 2015 that replace the numbers in the same group of cells shown in FIG. 30A. FIG. 30D illustrates the spreadsheet changes automatically propagated to the atomized cells within the presentation page.

FIG. 31A shows waterfall chart generated from a summary result set of spreadsheet cells. FIG. 31B shows the waterfall chart on a presentation page, with an element selected to move to a new desired position. FIG. 31C displays the result of this change to the waterfall chart on the presentation page. FIG. 31D shows how the prior art would require a change to the order of rows to match the order wanted in the waterfall in contrast to how our atomized cellular embodiment would work to achieve desired waterfall outcome without changes to the order of rows in the data.

FIG. 32A displays a starting spreadsheet chart and FIG. 32B shows an example spreadsheet the user must open and edit if not using the disclosed embodiments. FIG. 32C shows the desired placement of the waterfall elements and FIG. 32D shows the chart onto which the labels need to be moved and how our embodiment would work.

FIG. 35A shows example titled presentation elements created by the user. FIG. 35B shows the titled presentation element view available after each of the elements is constructed and ready for replication. FIG. 35C shows an example use of the elements by a presentation designer. FIG. 35D displays spreadsheet cells added to the presentation page.

FIG. 38 displays the example representation described in FIG. 37 that retains the formulaic and other capabilities in a spreadsheet FIG. 39A through FIG. 39D illustrate utilizing separable spreadsheet-like cells and using them in titled group elements to search in different views and connected presentations, spreadsheets and data bases to find content and data used in a presentation. FIG. 39A shows a titled presentation element that has been clicked on for search, triggering the ability to step through the document to view all the places the search element is in use, using the move arrow.

FIG. 39B shows for the same titled element, employing a search that shows the user all the pages where the element is used, letting the user click on any page number they would then like to visit. FIG. 39C shows the results for a scenario in which the user has elected to search for titled presentation elements or titled groups of elements/cells. FIG. 39D displays a user utilized data library pop-up search capability usable to find candidate tables, worksheets and presentations that contain data relevant to the search.

FIG. 40A through FIG. 40C illustrate ways to transition between spreadsheet view and presentation page view to easily transfer content or data to a presentation page. FIG. 40A shows a way a user can turn on spreadsheet view while working on a presentation page. FIG. 40B shows other options for displaying the presentation and the spreadsheets views such as split screens within the app showing both the spreadsheet and presentation views. FIG. 40C shows the display option of overlapping tiles—allowing easy clicking forward and back between the spreadsheet and the presentation views.

FIG. 42A through FIG. 42C illustrate spreadsheet configuration of selective multi-way replication elements for an existing spreadsheet. FIG. 42A shows the starting spreadsheet.

FIG. 42B shows the use-selected spreadsheet cells for the conversion to selective multi-way replication elements.

FIG. 42C shows the user invoking selective multi-way replication elements via a banner button.

FIG. 46A through FIG. 46C show the shape size group builds created by the build in FIG. 43. FIG. 46A shows group A, the largest cells selected.

FIG. 46B shows group B medium sized cells selected and FIG. 46C shows group C smallest sized cells selected.

FIG. 47A through FIG. 47D show the setting up of additional builds related to the build in FIG. 43 and their use. FIG. 47A shows Build 2. FIG. 47B shows Build 3 and FIG. 47C Build 5. FIG. 47D shows the usage of the created builds within the spreadsheet.

FIG. 48 through FIG. 50B show copying of selective multi-way replication spreadsheet cells into a presentation page and setting the selective multi-way replication sharing between the documents. FIG. 48 shows the multi-way replication spreadsheet cells selected for copying to the presentation page. FIG. 49 shows cells pasted in the presentation page and the default selective multi-way replication sharing between the spreadsheet, its presentation clone and the presentation page. FIG. 50B shows a user changing one of the sharing options.

FIG. 51A shows part of a six-build library set of elements and their group options. FIG. 51B shows the usage of one of the elements in a spreadsheet. FIG. 51C shows the usage of one of the elements in a presentation page.

DETAILED DESCRIPTION

Figure 1:
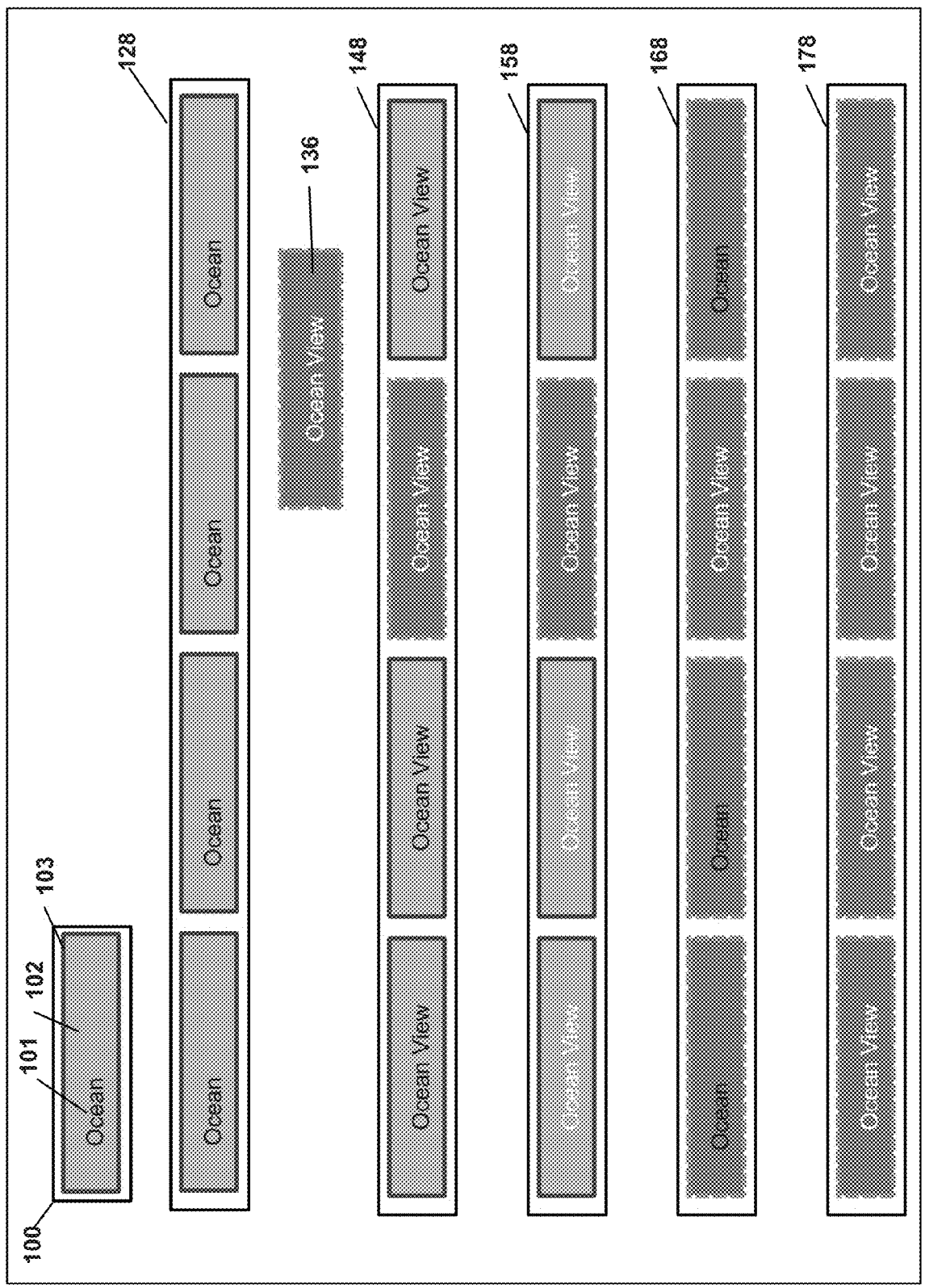
FIG. 1 illustrates ways that selective multi-way selective replication works, with different selections of propagation parameters impacting synchronization.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Document software has made many advances over the decades, adding new capabilities for adding different types of charts, Smart Art, multimedia and more, but those advances have not extended to editing documents and then chasing those changes throughout the documents. We disclose building and replicating items in a new way that saves a user time by allowing a user to make a change once and have it automatically and intelligently replicated throughout an entire document or series of documents.

Technical advances have done little to facilitate reuse of spreadsheet analytics, or even simple data tables, in visually appealing presentations. Importation of spreadsheet cells, tables and charts is limited to large blocks and cannot be used in more creative ways without a great deal of work by the user and breaking of the formulaic and function linkages of the spreadsheet. Sophisticated spreadsheet features, such as pivot tables, have become particularly difficult to merge into presentations. We present new technology that imports spreadsheet cell-based concepts into other document software.

We disclose selective multi-way replication with finely tuned replication parameters. Multiple copies of an element or a container of elements can be linked with selective, finely tuned synchronization, so that edits to any related elements selectively propagate to all the related elements. One document source is linked to multiple document copies. This improvement on existing spreadsheet and document software addresses naïve copying of spreadsheet elements into other documents, which inevitably breaks any link between updates to the source spreadsheet and an attractive target presentation. Selective multi-way replication improves on "paste special".

Multi-way replication particularly supports signposting and theme development during presentations. These presentation strategies require multiple copies of presentation elements, which are out-of-step as soon as one copy is updated. Finely tuned synchronization gives users multiple ways to build their presentation, replicate elements, and have the software automatically propagate changes within and across pages, worksheets, dashboards and forms.

Selective replication with transposition and orientation options further supports thematic development in which document items containing multiple elements can be arbitrarily oriented—horizontal, vertical or slanted—yet retain selective specified consistency. A document item can be an elaborate graphic container for spreadsheet cell, graphic, shape, text, icon, picture or other document elements. Transposition and orientation options can be applied to elements or groups of elements, even those without graphic containers. When the source is a spreadsheet, the selective transposition and orientation feature retains links from document cells back to source spreadsheet cells. Of course, selective replication allows formatting of linked cells to match presentation needs, without modification of the source spreadsheet.

We disclose rearranging cells from blocks, found in spreadsheet cells, into organizations better suited to presentation. Both separation and reordering of cells are disclosed. Separation breaks out parts of the block and redistributes them across a page. Reordering changes the order of columns and rows in the presentation, again without modifying the source spreadsheet, while maintaining, as desired, formatting, formulaic and other content links to the source spreadsheet. The combination of separation and reordering can produce a transposed version of selected data rows with ordering that makes sense in the context of a page, without modification of the source spreadsheet.

Tight coupling of the spreadsheets and presentations can extend to file containers. File packages or other file structures reduce the chance that spreadsheet data will be separated and links broken. A single file load can make both the spreadsheet and presentation editable.

In the following sections, we start by addressing a fundamental way to remove work from the revision of formatting and content in different documents, a capability we call selective multi-way replication. Then we describe how similar concepts can be used to reduce the work of creating a document through selective build and selective transposition. After that, we describe a novel way of taking out a great deal of work in documents involving some spreadsheet content, through dramatically tighter integration of the spreadsheet and facilitating easy usage of it at the single cell level. Finally, we then show our novel ways of making document content much more reusable through different views, content naming, and easy search within an element library. Combined, these capabilities allow users to create superior documents much more quickly and easily.

Selective Propagation

An example illustrates selective multi-way replication. FIG. 1 shows ways that different selections of propagation parameters impact synchronization of edits from one instance of a text box to three others. In FIG. 1, text box 100, with blue fill color 102 and a darker blue outline 103, contains the word 'Ocean' 101 left justified in black type. Text box 100 is used in four different places in document 128. Practicing selective multi-way replication, a change 136 made to the third instance in document 148 selectively replicates to the other text boxes. The user can set the properties they want to replicate, so that only edits to properties selected for replication will propagate to the remaining text boxes. Different replication parameter selections can be applied to different replicated instances.

In FIG. 1, four examples show different selective multi-way replication settings. These settings control propagation of changes made in box 136. In this example, the text in box 136 has been modified from 'Ocean' to 'Ocean View', the text color has shifted from black to white, the fill color has shifted from blue to grey, and the box outline has shifted from a solid dark blue to a dashed light blue. In FIG. 1, the changed text box 136 is the third of the four text boxes, and 148, 158, 168 and 178 example four different selective multi-way replication setting outcomes of the change.

In example document 148, with only text selected for multi-way replication to the three other text boxes, automatic replication changes only the text 'Ocean' to 'Ocean View' in the remaining three boxes. No text color, box shading or box outline changes replicate.

Example document 158 shows the effects of selecting both text and formatting for multi-way replication and auto replication. The black type 'Ocean' wording changes to white type 'Ocean View' in the other three boxes. If, instead of selecting text and formatting for replication for the other three boxes, the selects are activated for shape fill and border weight and border type and border color for multi-way change replication, then auto replication changes the border color, line type and fill color in the other three cells, as shown in document 168 and does not change the text content. If 'all' selective multi-way replication is activated for the three boxes, then the auto replication of the changes will cause all four text boxes to look alike, as shown in document 178. In these examples, we set the three unedited boxes with the same selective multi-way replication parameter options. In another example, the user can assign a different replication setting for each element in a document and changes to any of the linked elements will selectively replicate.

Selective Multi-Way Propagation

Having the selective ability to turn on multi-way replication allows users to connect elements of their document and still allow some differentiation. This is useful for individual elements or complete pages of elements that are repeated within a document, such as topic agendas.

Figure 2:
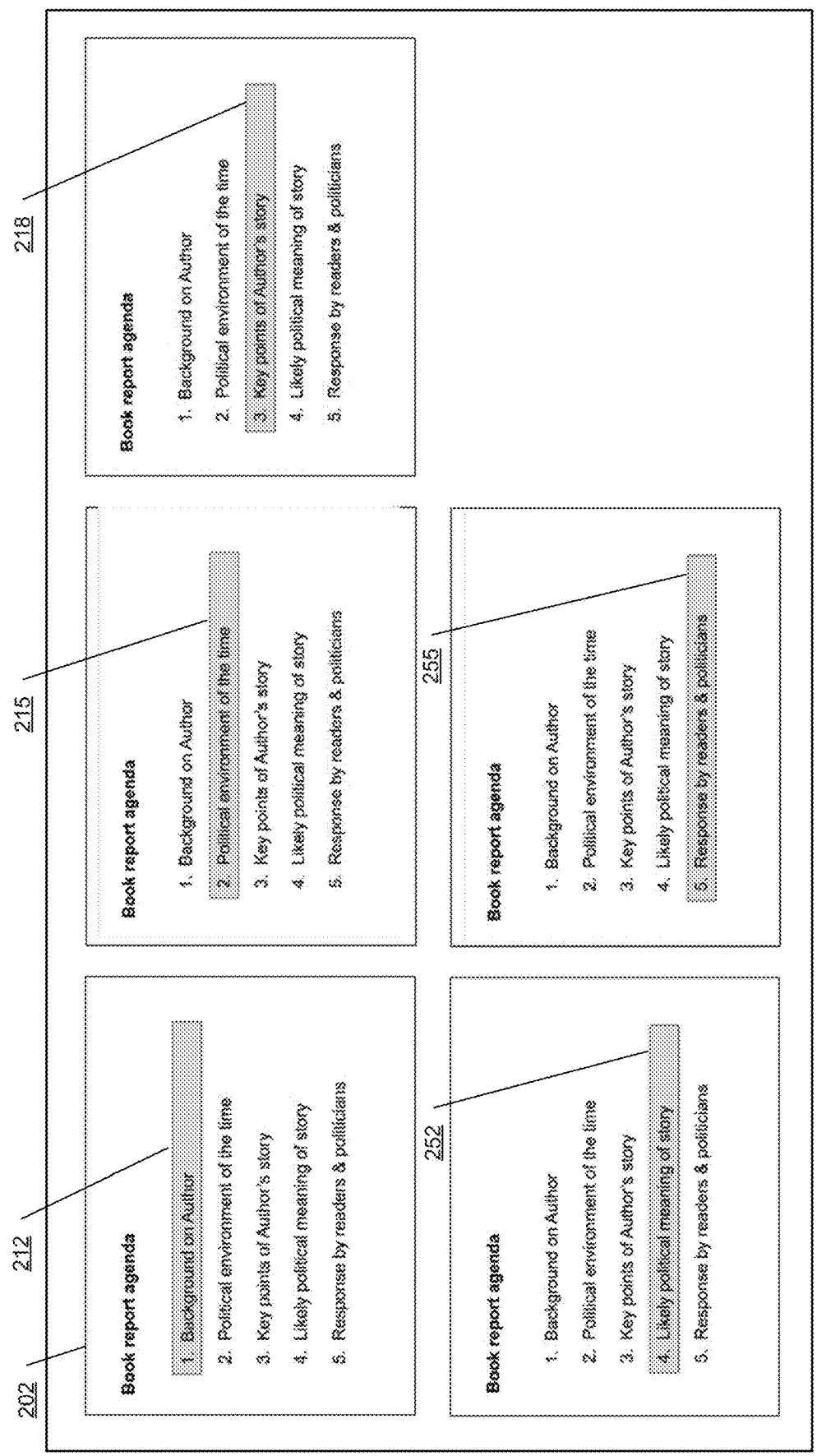
FIG. 2 further illustrates selective multi-way selection replication, with a set of agenda pages designed to appear in front of each section of meeting slides, with the appropriate section to be discussed next formatted as boxed and shaded.

An example illustrates how edits to features of one text box are selectively propagated to other instances, according to selected replication parameters, to create topic agenda pages. FIG. 2 shows a set of agenda pages designed to appear in front of each section of meeting slides—a common situation in which an agenda page 202 appears in front of each section of meeting slides, with the appropriate section to be discussed next shown as boxed and shaded 212. Four subsequent agenda page instances introduce subsequent sections of the deck, each with an agenda element being emphasized with bold text, box lines and shading turned on for the appropriate agenda number: '2. Political environment of the time' 215, '3. Key points of Author's story' 218, '4. Likely political meaning of story' 252, and '5. Response by readers and politicians' 255.

The features selected for replication from instance-to-instance can include text on the page. That way, any changes to the text automatically replicate without altering the boxing and shading. Therefore, the user can edit the text on any of the pages and the element replicating structure will cause the edited text to be replicated as desired throughout the document.

Figure 3:
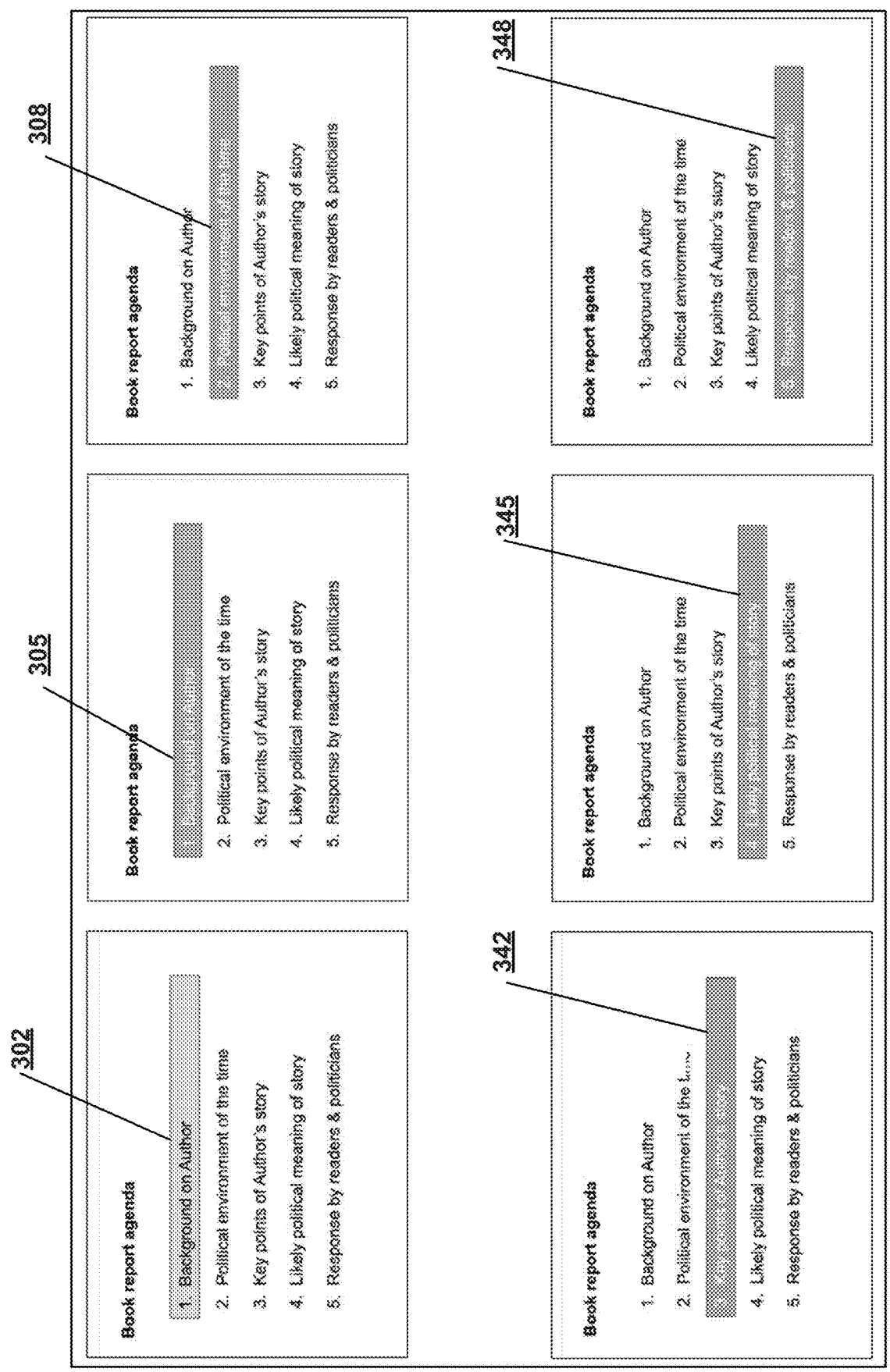
FIG. 3 illustrates automatic formatting replication of selective multi-way replication for the format of agenda elements.

FIG. 3 illustrates the selective multi-way formatting replication feature for the format of agenda elements. Any change to one of the boxed and shaded agenda item points 305, 308, 342, 345 or 348 will propagate to the remaining agenda elements. That is, user-initiated changes to the style of agenda item point 305 propagate in subsequent agenda page instances to sections two through five of the agenda 308, 342, 345, 348. The agenda items change from the lighter grey box fill and black text color 302 to a darker grey box fill and white text 305. While in this example that change was done to the first agenda item and first agenda page, the same replication would have occurred if the change was made to any of the agenda items 305, 308, 342, 345 or 348.

The linkage of multiple properties in selective multi-way replication is a refinement that allows further differentiation of the presentation and the automatic replication of changes. Therefore, changing the text color and box fill color 302 to that in 305 causes it to auto-replicate the changes to 308, 342, 345, and 348 but not to the other elements on those five agenda pages. This capability allows users to create and reuse attractive pages, eliminating a lot of the work of going through the document and changing each of the pages. As we will discuss later in our library section, this cascading replication feature allows users to create pages they can then copy to other documents, quickly rename and then wildly change while retaining very sophisticated replication capabilities that are common to agenda and other frequently used pages.

Selective Propagation Controls

Selective multi-way replication includes granular controls that allow users to reuse elements in ways that look different while still retaining the ability for auto replication of important edits. There are many ways to make it easy for a user to set-up the type of selective multi-way replication they desire. One easy way to eliminate the need for selective multi-way replication set up is to have a default setting of 'all' that allows users to do nothing if they are happy with all changes replicating.

Figure 4:
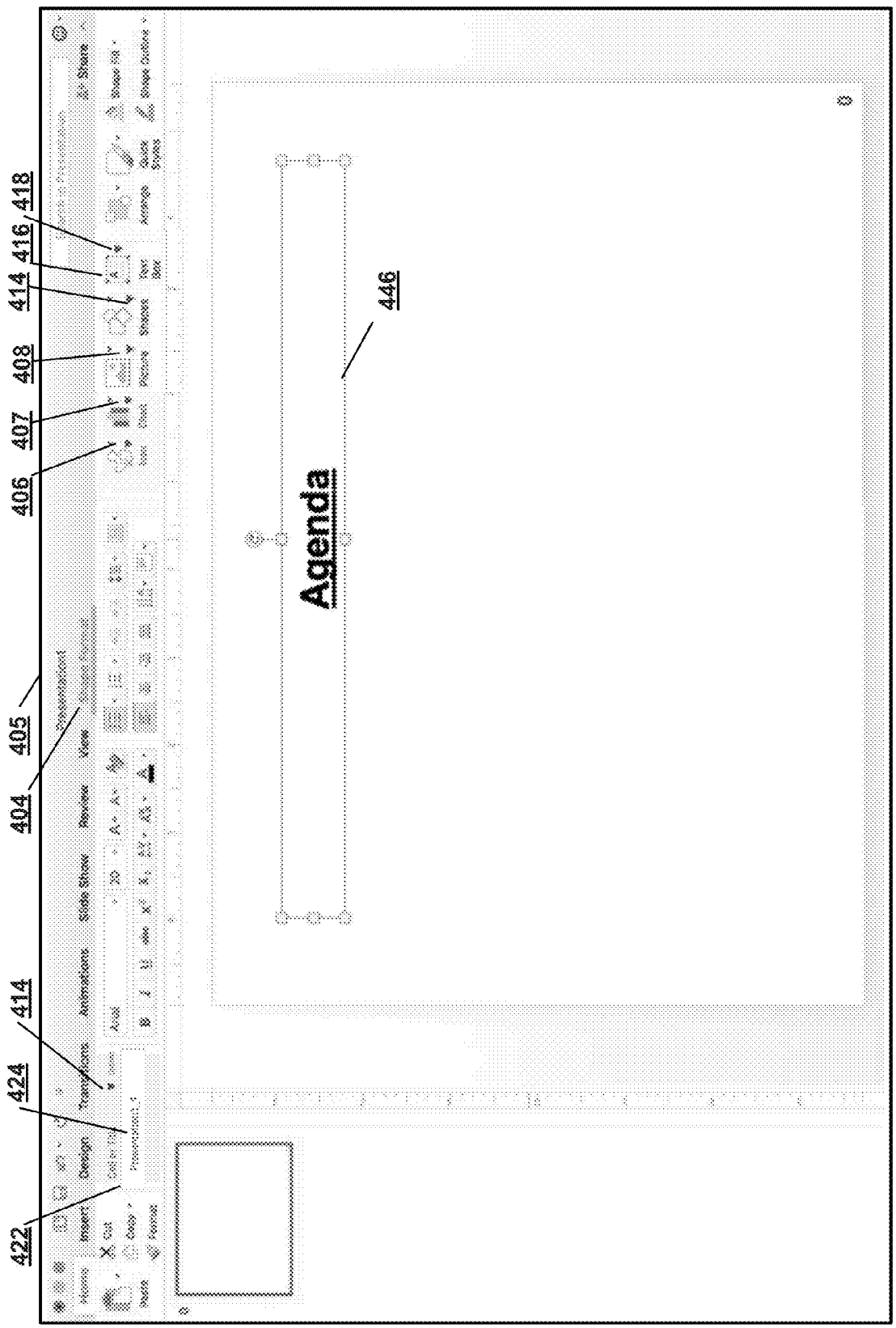
FIG. 4 displays example selective multi-way replication property set up and option controls usable to design a document page with selective replication options.

FIG. 4 displays an example set of selective multi-way replication option controls usable to design a presentation via presentation screen 405 with selective options available for the various element creation buttons. Under the shape format menu 404, a red drop-down arrow 418 control has been added for Text Box 416. When clicked, the red drop-down arrow 418 causes presentation of a pull down menu from which a selective multi-way replication text box can be chosen by the user. When the user opens the text box they will be able to see the default title of that text box element 422. In this example, the default element numbering is the document name and then sequential numbering: text box 446 has the title 'Presentation I' 424. If the user closes that text box without altering the title in text box element 422 or popping up the selective multi-way replication setting mode, then they have accepted the name and default selective multi-way replication setting—in this case 'all'. To view options for changing the naming or to set up a new name, users can select blue Options arrow 414 to access a drop-down or pop-up which presents naming options. Many naming options are available, from creating a one-off name to adding a name to an existing sequence, to adding a name to a spreadsheet-like tabular grid, as we will discuss later—with a goal of keeping the name simple and definitive, to make it easy to identify and reuse the presentation. FIG. 4 also shows selective multi-way replication red drop-down arrow options for Icon 406, Chart 407, Picture 408 and Shapes 41. Video, Audio, SmartArt, Tables and other graphic elements would have similar selective multi-way replication creation options. Various selective multi-way replication options are utilized to build an agenda, as described next.

Selective Build-an-Agenda Use Case

We offer an example of selectively building a set of meeting agenda slides to further elucidate selective replication and multi-way propagation features and to answer questions that may arise from the preceding agenda slide example discussion. A user can make selections to set the type of selective multi-way replication they desire, in cases in which they do not want to use the default settings. Once the user sets up one build, they can select an element of the build and open the selective multi-way adapt tab, which lists the options applicable to the content and formatting of the selected element; and they can select the options they want to automatically replicate. Any features not selected will be blocked from automatic replication. In this example, the slides are built beginning with a selective build and multi-way replication text element.

Figure 5:
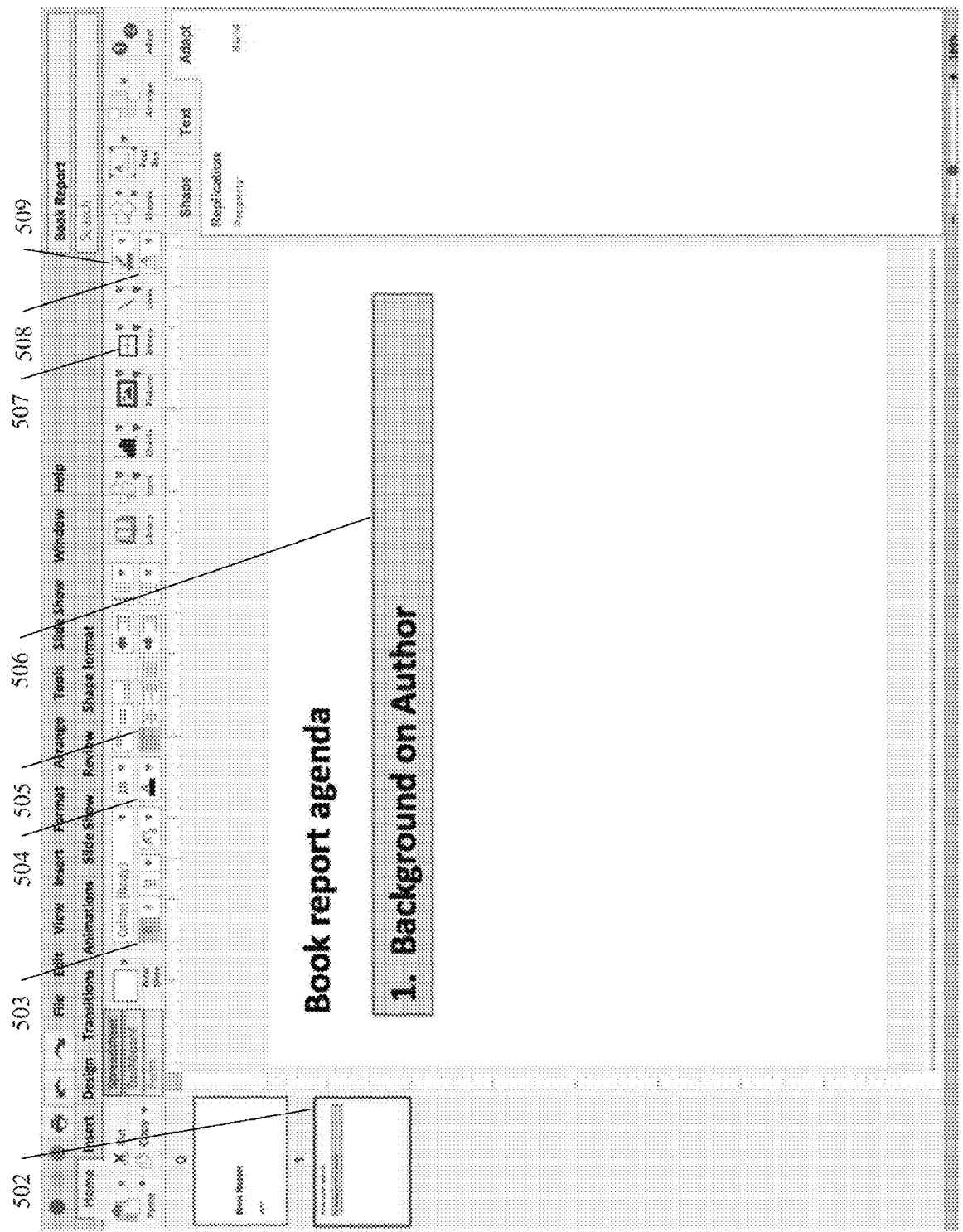
Figure 6:
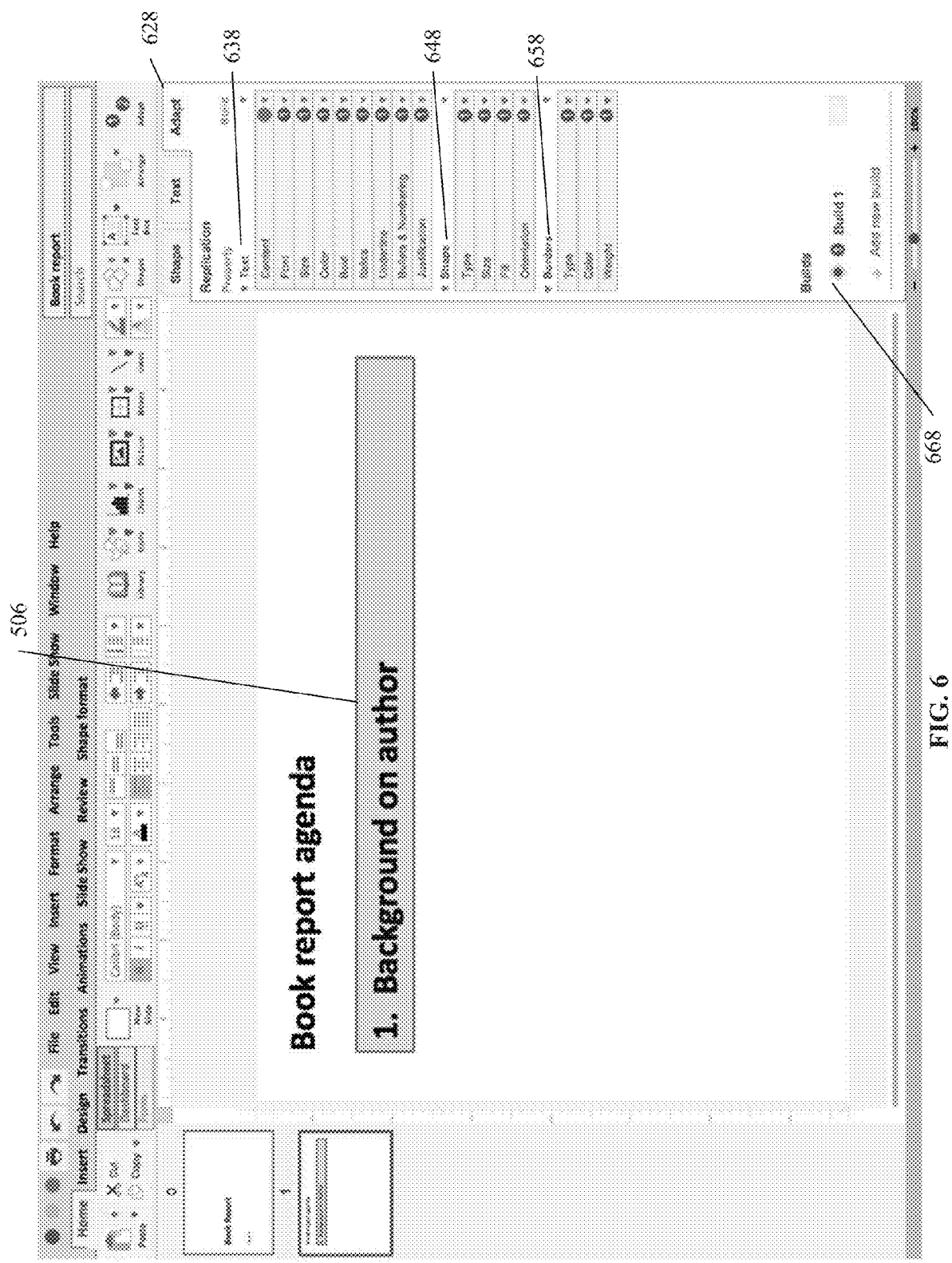
Figure 7:
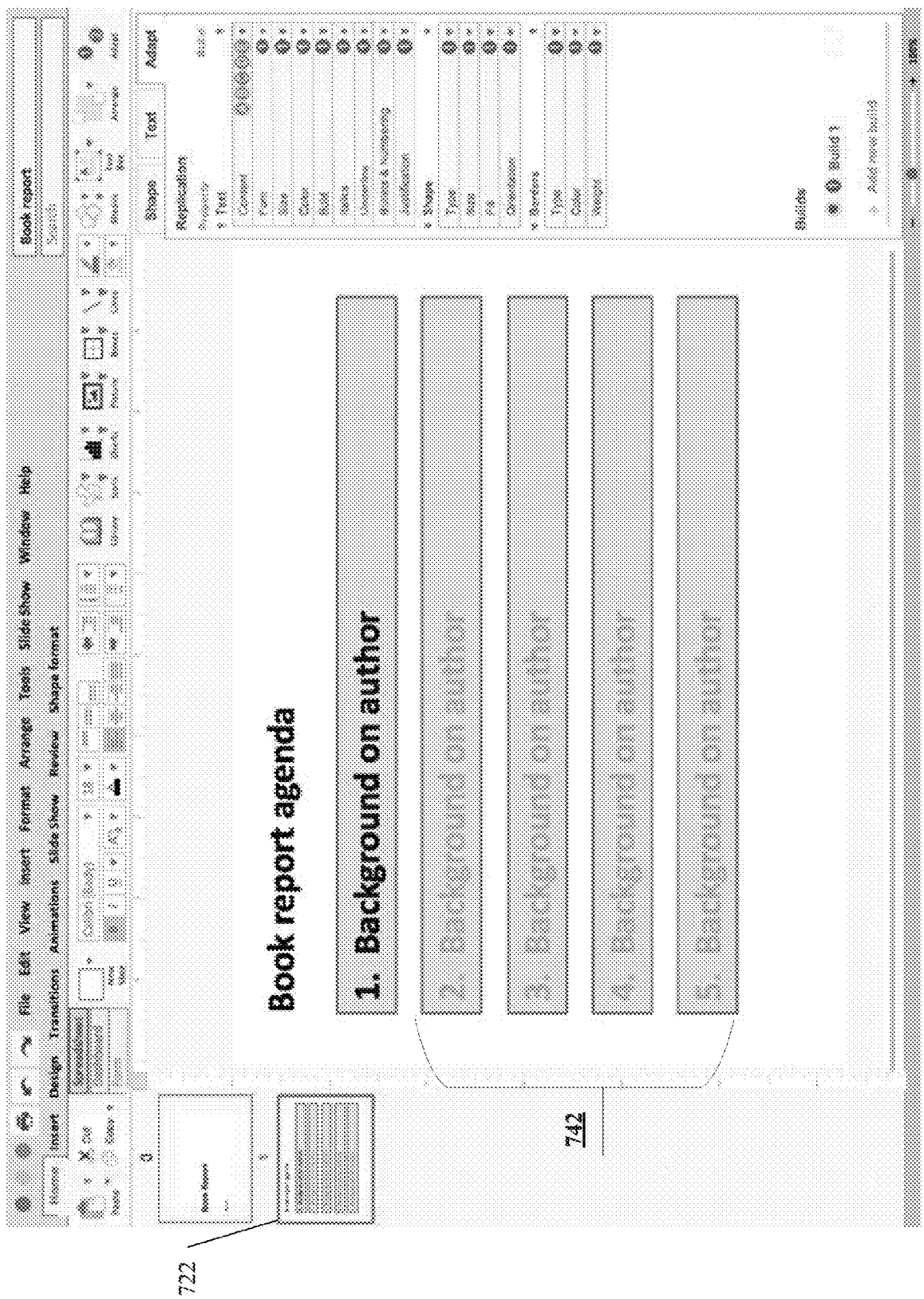
Figures 8A, 8B, 8C:
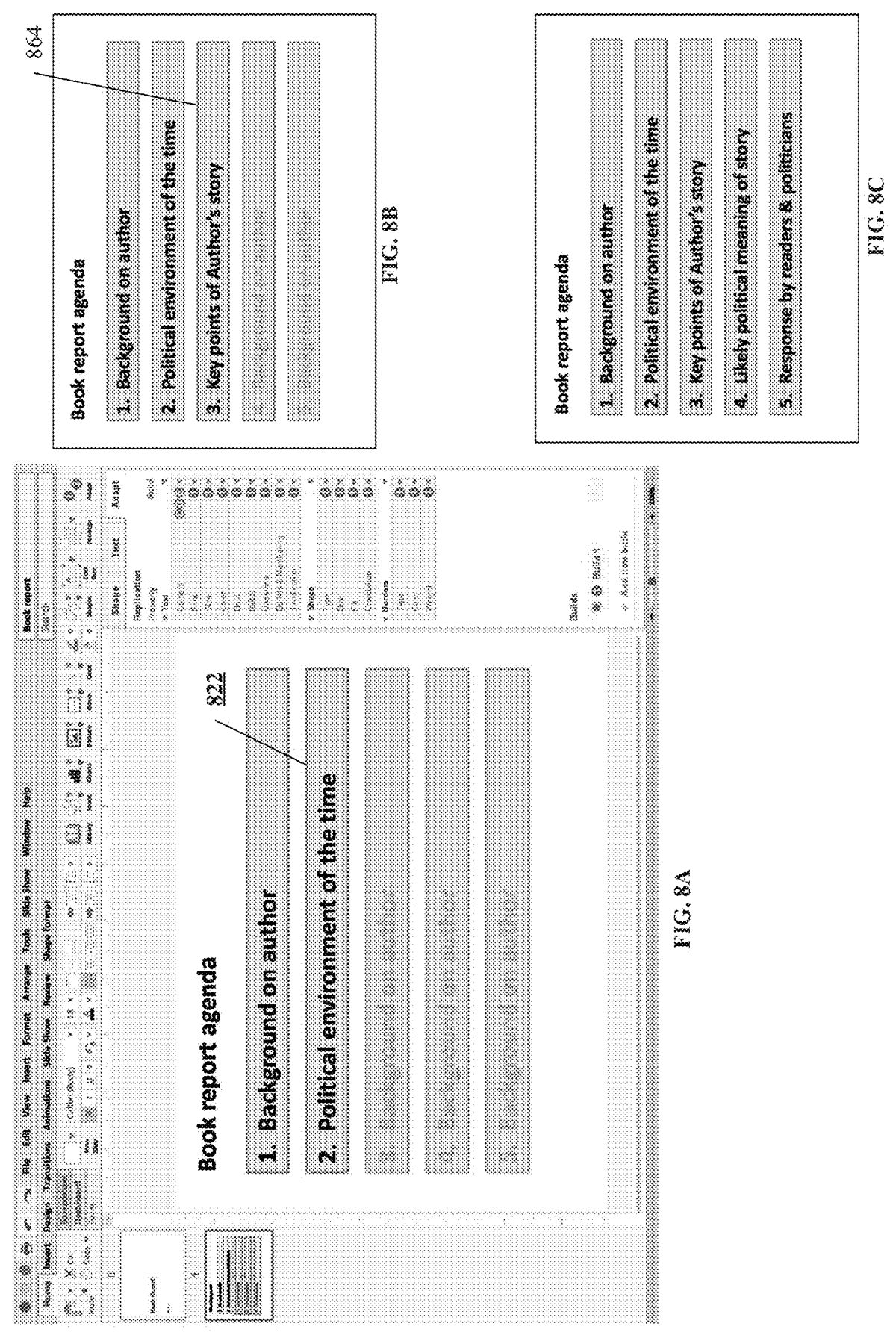

FIG. 5 shows slide one 502, with a first meeting agenda text box 506 whose style is defined by the elements shown in the settings: left justified 505 bolded 503 black text 504 in a box 507 with light grey shaded fill 508 and darker grey solid borders 509. In FIG. 6, adapt tab 628 for build one 668 specifies replicating text 638, shape 648 and borders 658 of selected text box 506. The number of times and different ways to replicate text box 506 can be specified in the text box control drop-down, accessed via drop-down arrow 418, described infra. FIG. 7 shows the results of the text box group replication for slide one 722, with new group text boxes 742 containing highlighted text that has not yet been customized. The group replication in this example creates four additional related points each of which is a different numbered text point. FIG. 8A shows the slide of FIG. 7 after text customization of text box two 822. FIG. 8B shows the same slide after text customization of text box three 828. FIG. 8C shows the slide after the remaining text boxes have been customized.

Figure 9:
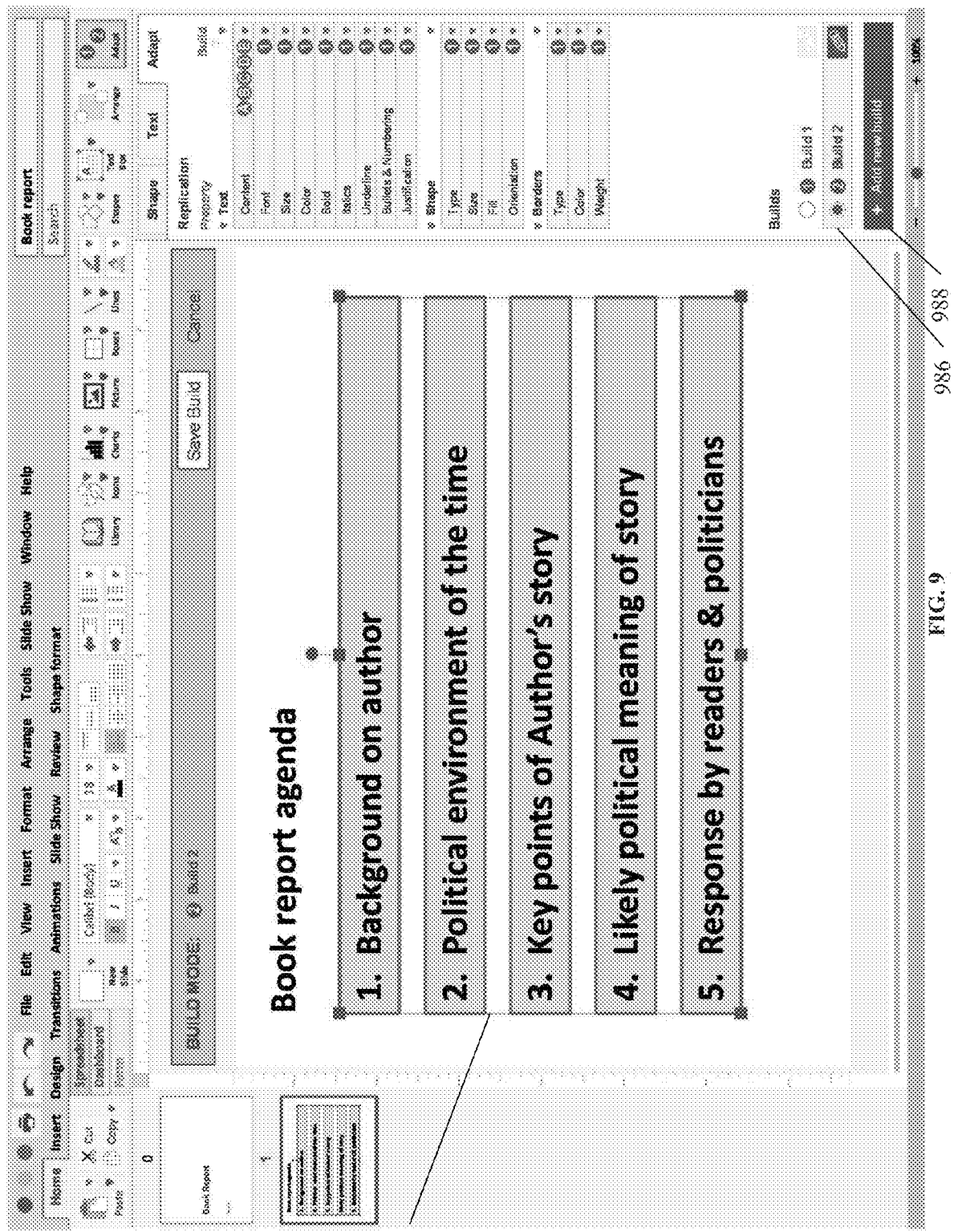
Figure 10:
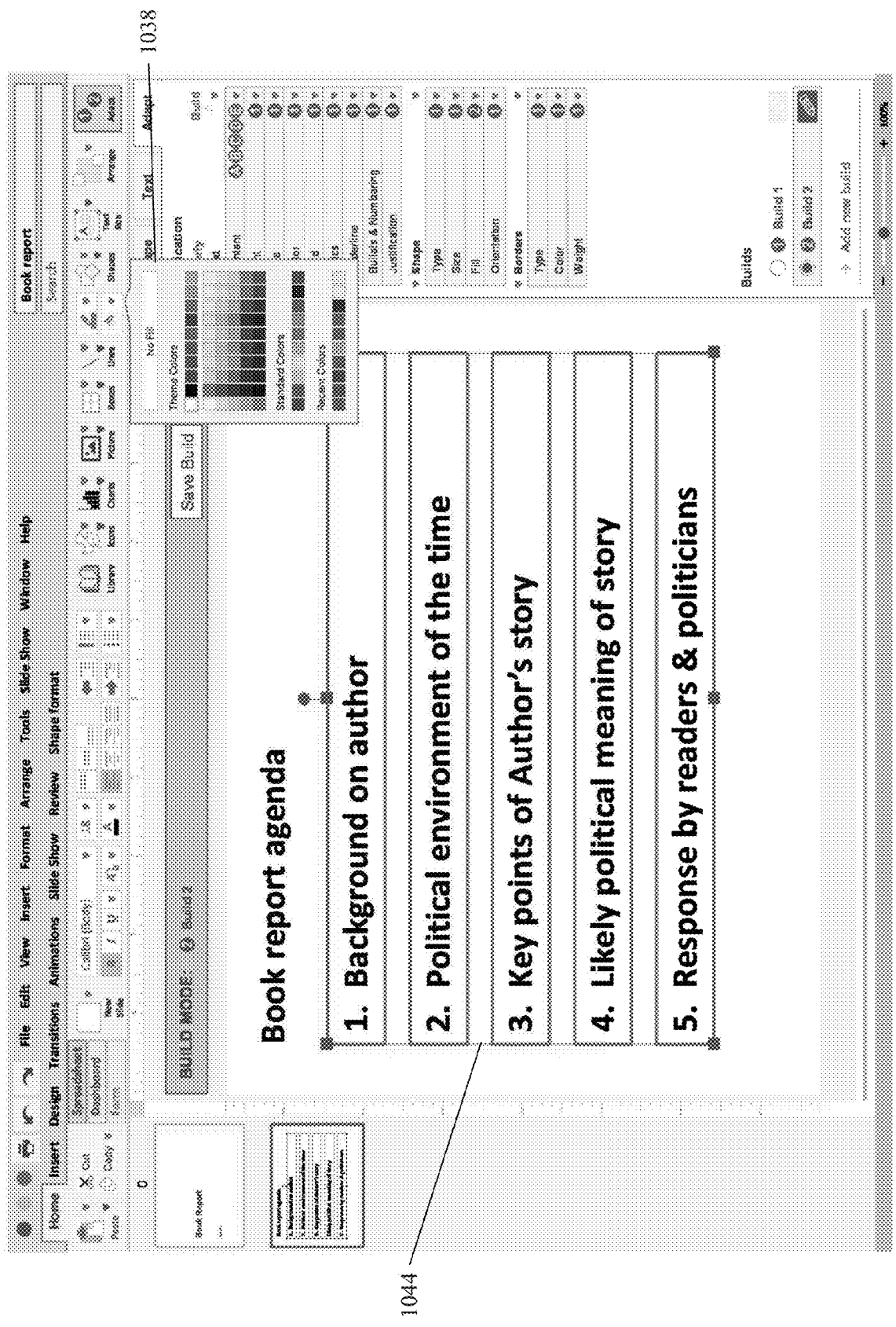

In FIG. 9 the user is creating a second build with different features for the five highlighted points 944. FIG. 9 shows build two 986, after the user added a new build 988 for the selected set of text boxes 944. For emphasizing propagation features, FIG. 10 shows example controls for the selected set of text boxes 1044 including fills 1038, which has been changed from the light grey in FIG. 9 to the white selected in 1038. The disclosed system automatically changes the specific properties of build two as the user makes changes to the selected set of text boxes 1144 shown in FIG. 11. In this example, the user has changed the text color 1138, removed the bolding 1148, changed the shape fill 1158, and changed border color 1168. The application has therefore automatically recorded these properties as build 2 and indicated that with the red 2's as in 1198. The user can close the build and they have defined the initial look of build two and its replication propagation.

Figure 11:
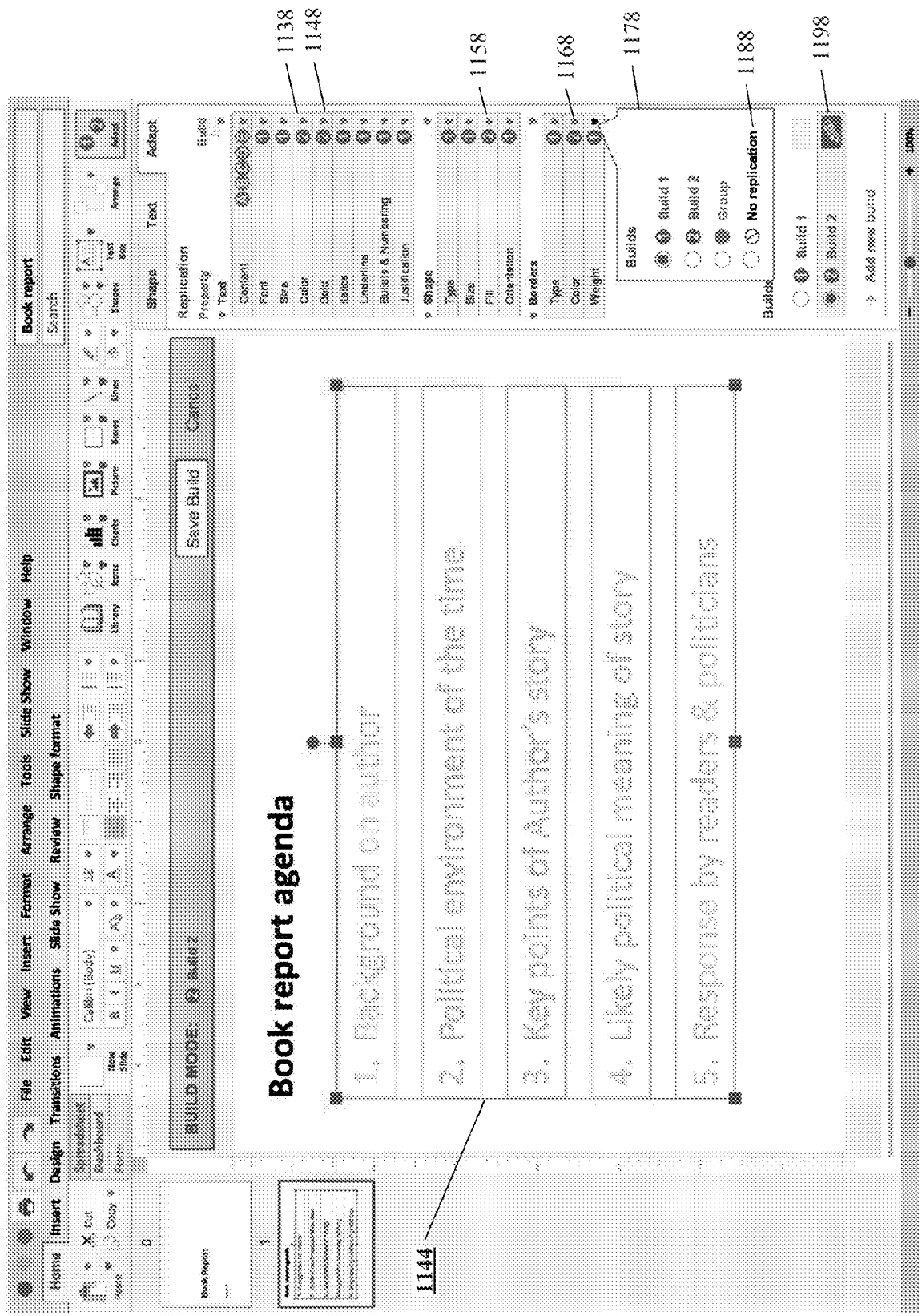

Exampling another way to set the build property, the user could also change other element replication while build mode is open, by changing a property build indicator to a different build. FIG. 11 shows for the border property weight the user has opened the drop down 1178 which shows that weight is currently set to build 1. The user can change that setting by selecting the one desired from the available options. In this example, the user can switch the weight property of the five highlighted elements to build 2, a group build, or a property that does not replicate 1188. The property that does not replicate behaves as described and results in turning off the replication of that property for all of the selected set of text box elements. Group build would separate these five elements from any other elements for this property for replication purposes, so that any change in the border weight would replicate to the other four elements but not to any remaining build 2 elements. The first creating of build 2 for these related elements allows later separation of different groups of related elements that can be differentiated on this property, as for the text of the agenda points described infra, thus allowing users flexibility in setting up different forms of automatic selective multi-way replication.

Figure 12:
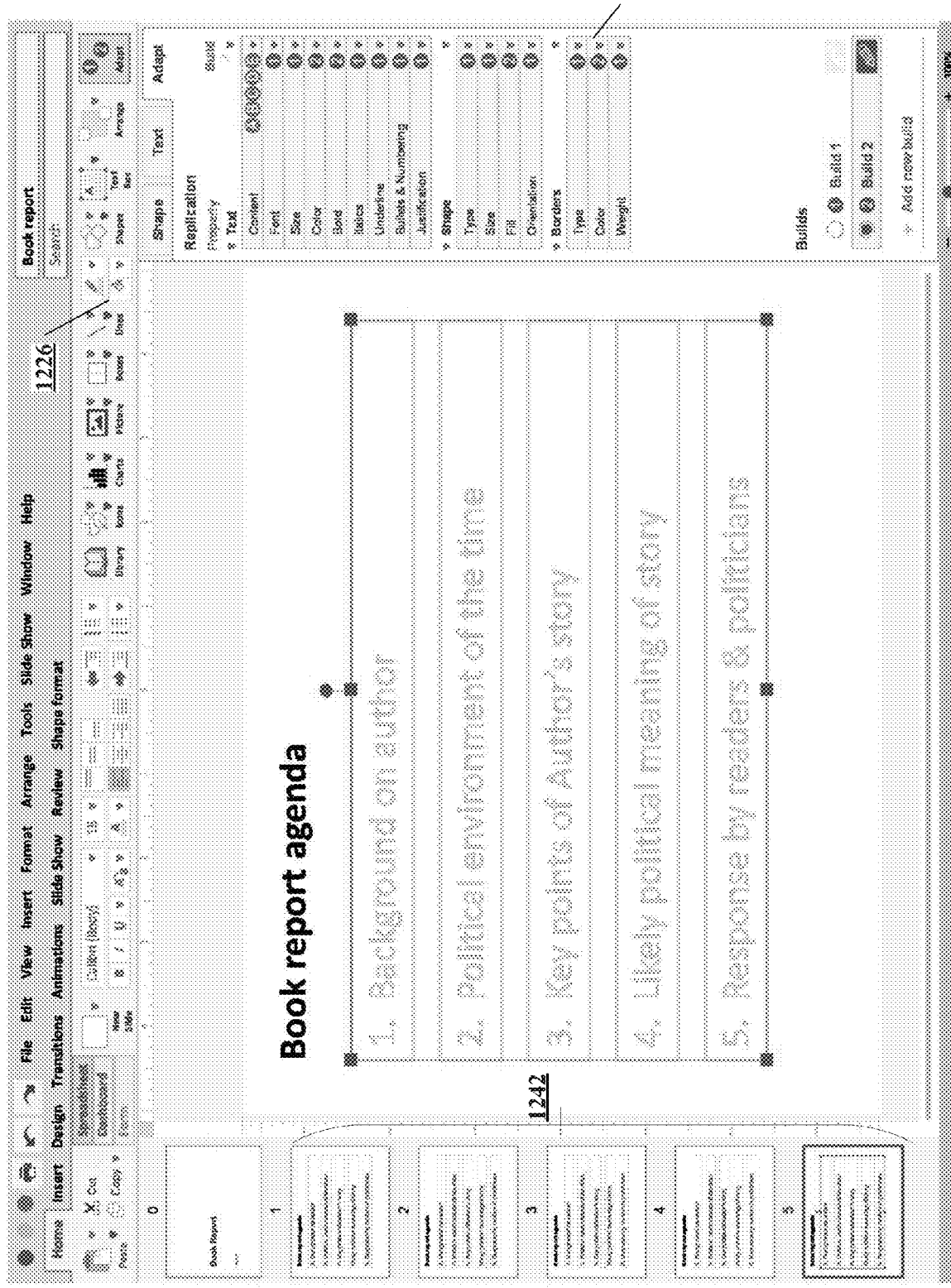
Figure 13:
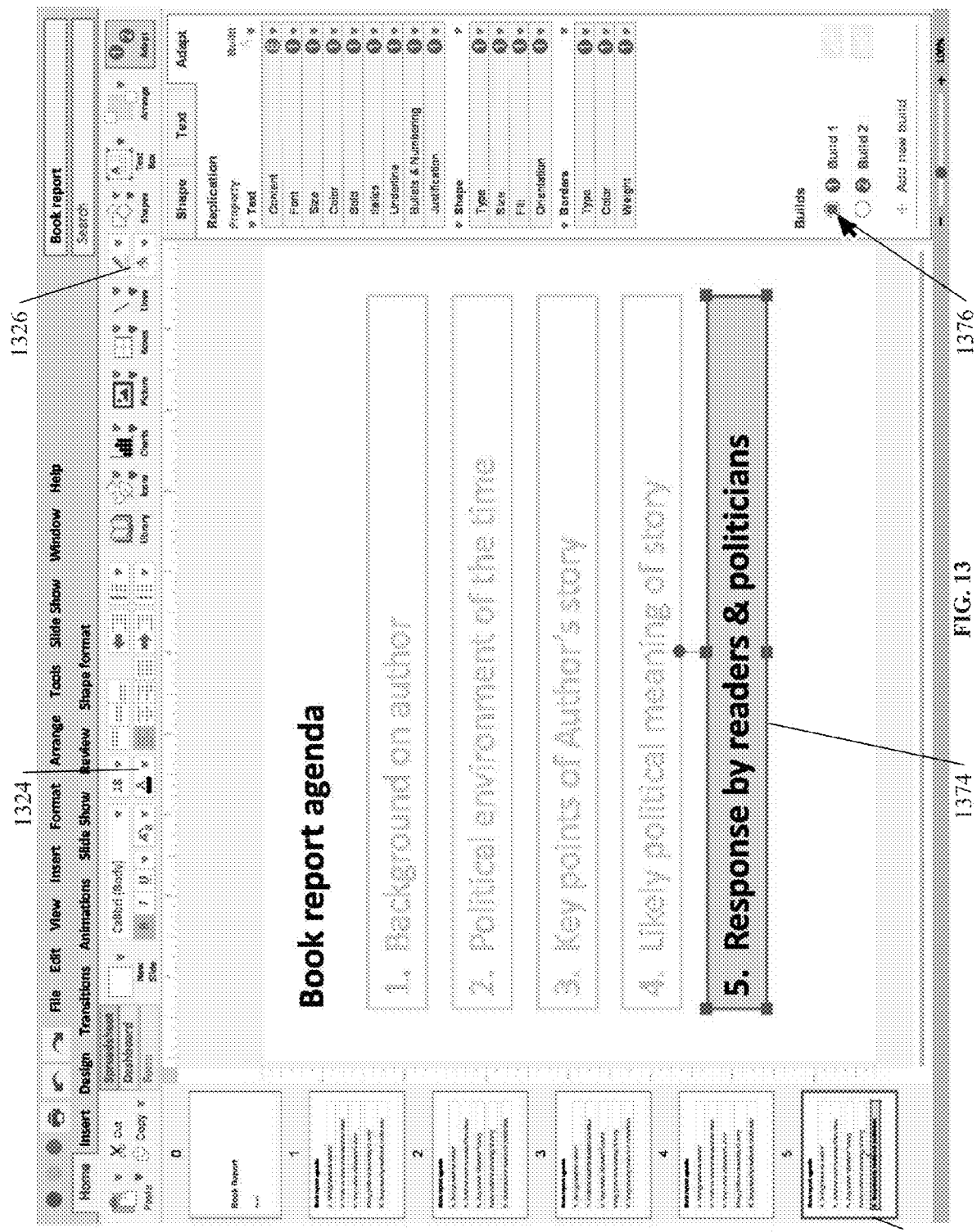
Figure 14B:
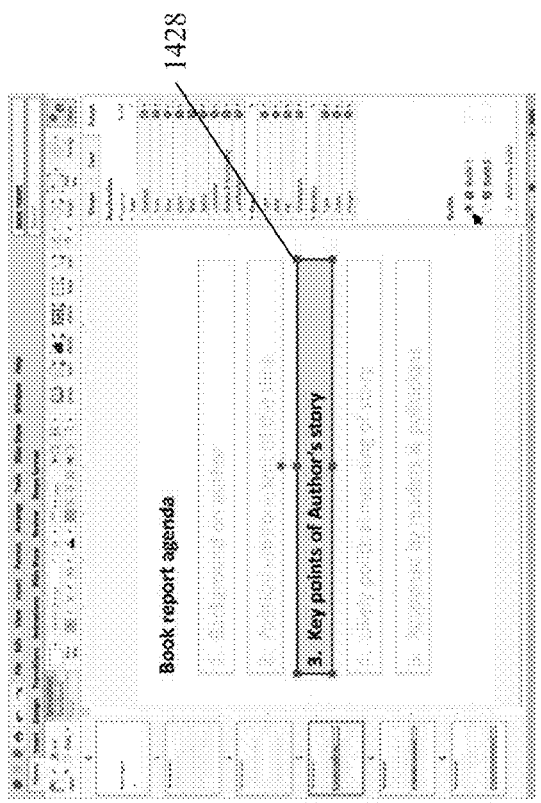
FIG. 14A through FIG. 14D illustrate extended benefits of the disclosed build approach to produce automatic selective multi-way replication.
Figure 14D:
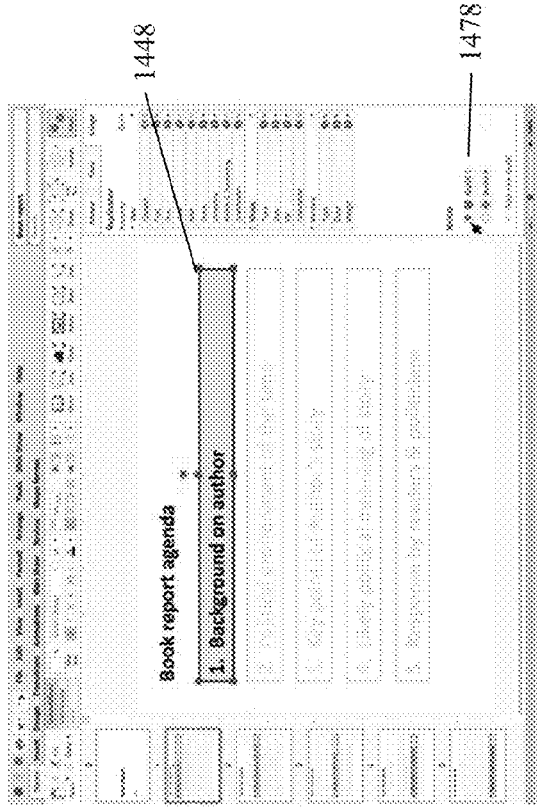
Figure 14A:
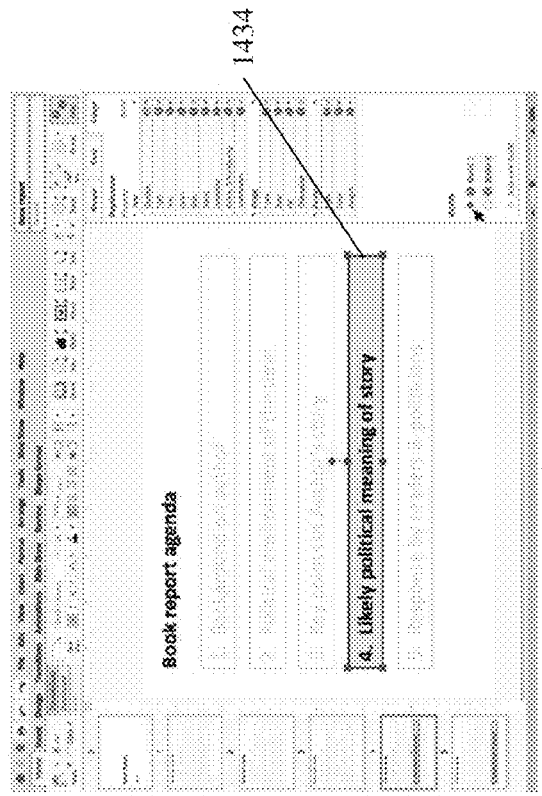
Figure 14C:
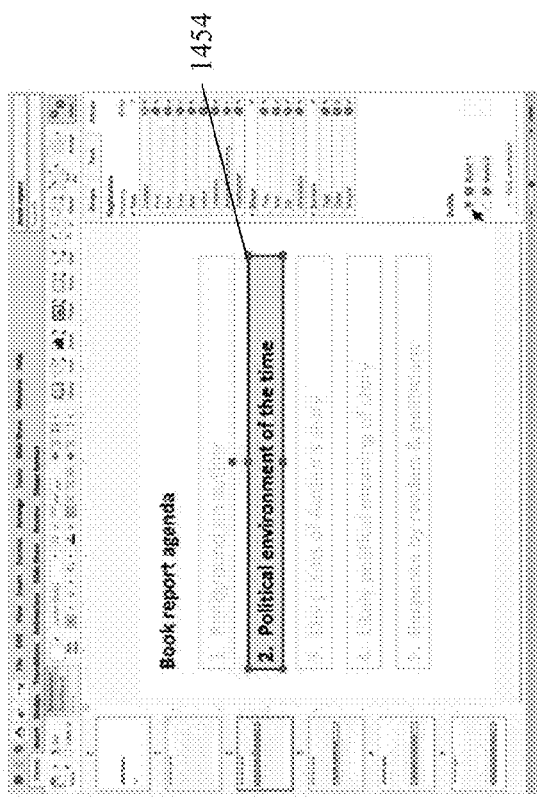

Continuing with selective multi-way replication, FIG. 12 lists five slides 1242 which include the original slide created previously and four copies of the original slide, with all five meeting points in build two, including white fill 1226 and light borders 1268. FIG. 13 illustrates an example use of built elements, with text box five 1374 of slide five 1372 selected, and then build one 1376 selected, with grey fill 1326 and bolded black type 1324. Similarly, FIG. 14A shows slide four and text box four 1434 with build one selected; FIG. 14B shows text box three 1428 of slide three selected to build one; FIG. 14C shows text box two 1454 of slide two selected to build one; and FIG. 14D shows text box one 1448 of slide one with the selected features of build one 1478. The extended benefit of this build approach is that the user can change text or other of the features of the elements without disrupting the specific bolding, fill color and borders of the highlighted elements 1434, 1428, 1454 and 1448. In another example, if the user decides to change a build feature while working on a different slide, text box three could be the text box selected for adding or changing build features to be emphasized instead of text box one 1448.

Figure 15A:
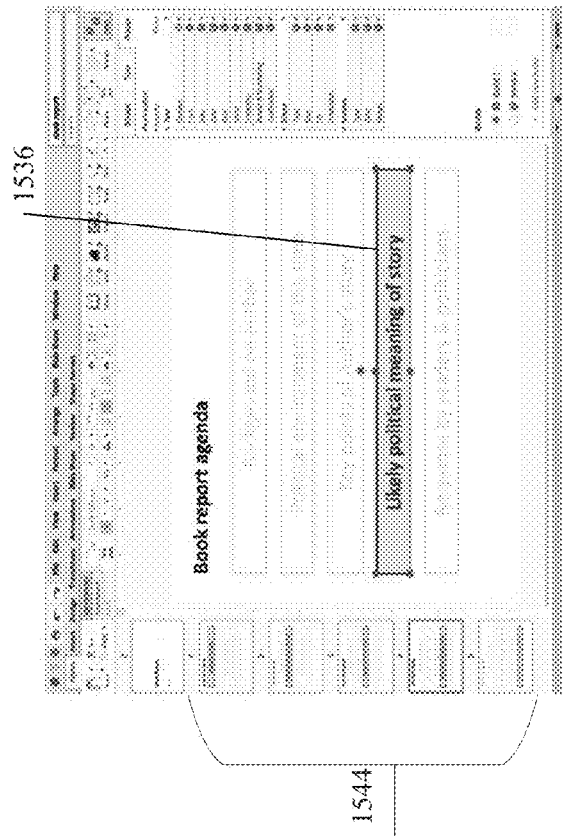
FIG. 15A through FIG. 15D illustrate a use case of changing format parameters for elements of a set of agenda slides employing selective multi-way replication elements.
Figure 15B:
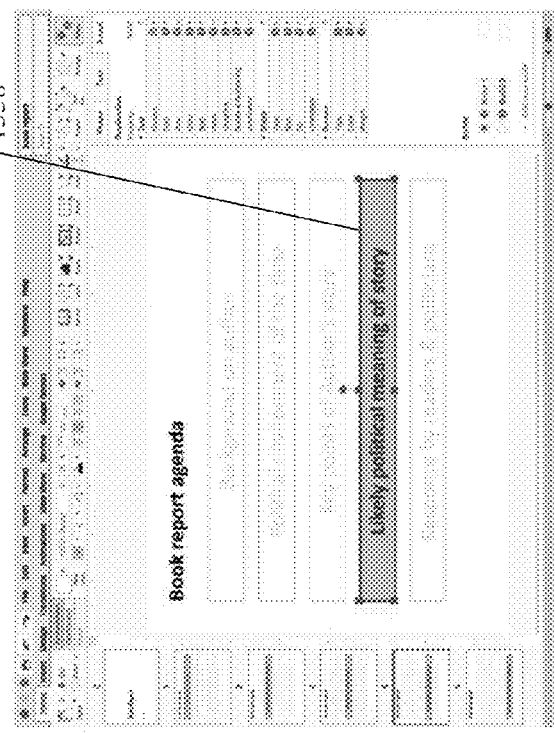
Figure 15C:
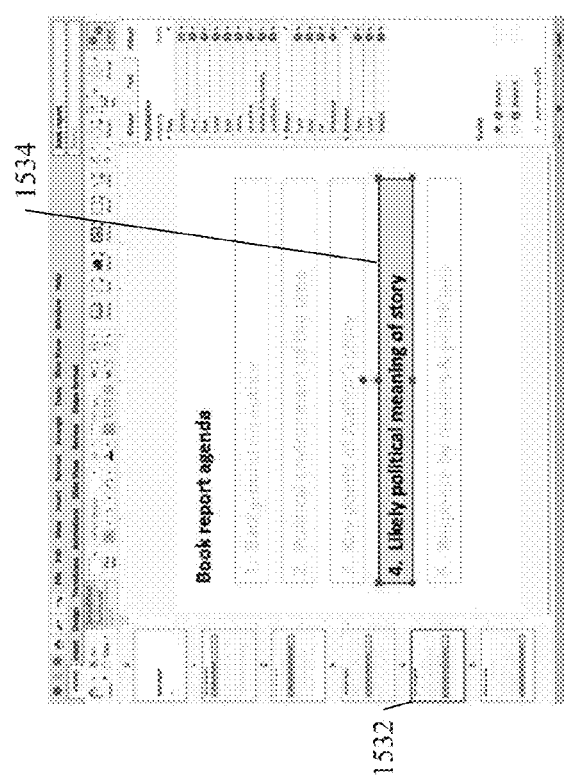
Figure 15D:
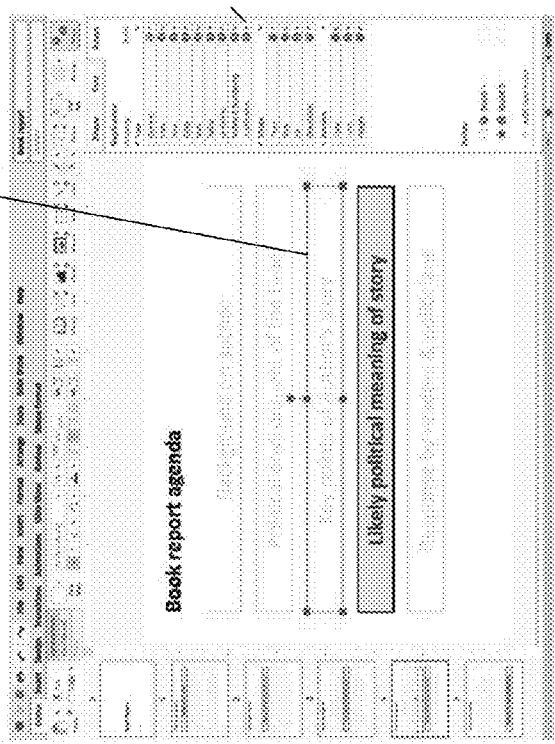

Continuing with our example, using the set of meeting agenda slides built as described supra, FIG. 15A shows slide four 1532 with text box four 1534 with the black left-justified font of the original meeting agenda propagated across the set of slides, as discussed supra. Text box four 1536 in FIG. 15B shows the result when the user decides to remove the numbers, switch to center justification, change the black text to dark blue and change the black box border to dark blue. Once those changes have been completed, the selective multi-way replication automatically alters all the related elements with affected properties set in build 1: centering the text within the boxes and changing the text color to dark blue in the remaining four of the five of the agenda pages 1544, as illustrated in FIG. 15B. It also centered all the text in the boxes on all five of the agenda pages 1544 because text justification for the build 2 boxes is also controlled by build 1, as illustrated by agenda text box 1554, which has justification replication set to build 1 1566, as shown in FIG. 15C. In this example, a justification change to either a build 1 or build 2 text box will automatically replicate to all the text boxes on all five pages, as it did in agenda pages 1544 in FIG. 15B. FIG. 15D shows the result when the user selects text box four 1558 and changes the fill to medium blue: the fill change automatically propagates only to the other build 1 elements across the five agenda pages.

Figures 16A, 16B:
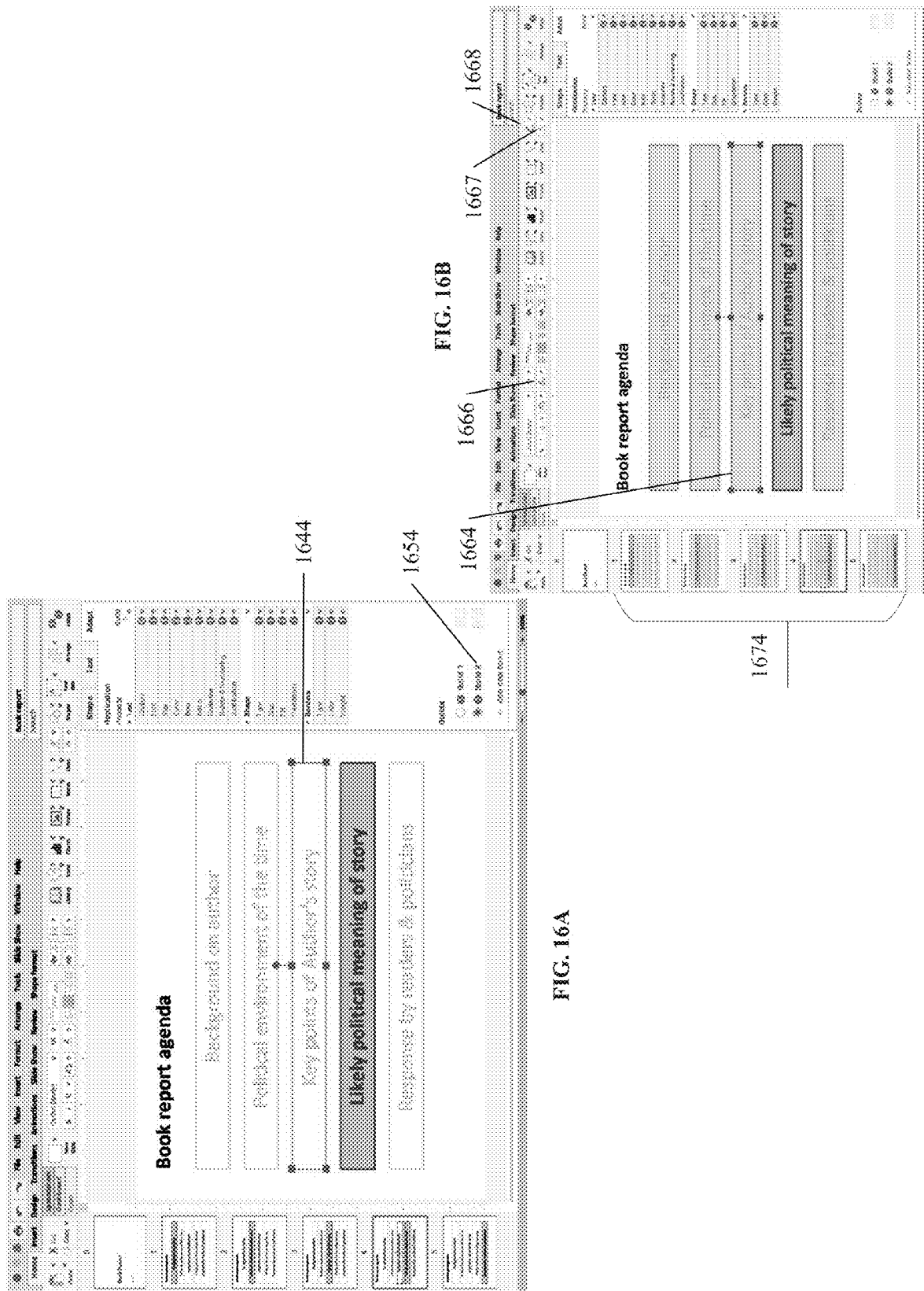
FIG. 16A shows 'inactive topic' text box three selected and build two selected.
In FIG. 16B, 'inactive topic' text boxes in all five slides are updated to reflect the selective multi-way formatting feature propagation changes made to slide four text box three.

Further continuing with the example, when the user changes a build-two element, the changes get propagated to build-two elements only, as build-two controls nothing in build one. FIG. 16A shows selected 'inactive agenda topic' text box three 1644 (in grey lettering and boxing like the other inactive agenda topics) currently set to build 2 1654. FIG. 16B shows the results, with 'inactive agenda topic' text boxes in all five slides 1674 updated to reflect the propagation of light blue fill 1667, blue borders 1668 and blue text 1666 changed in the third text box 1664.

Figure 17A:
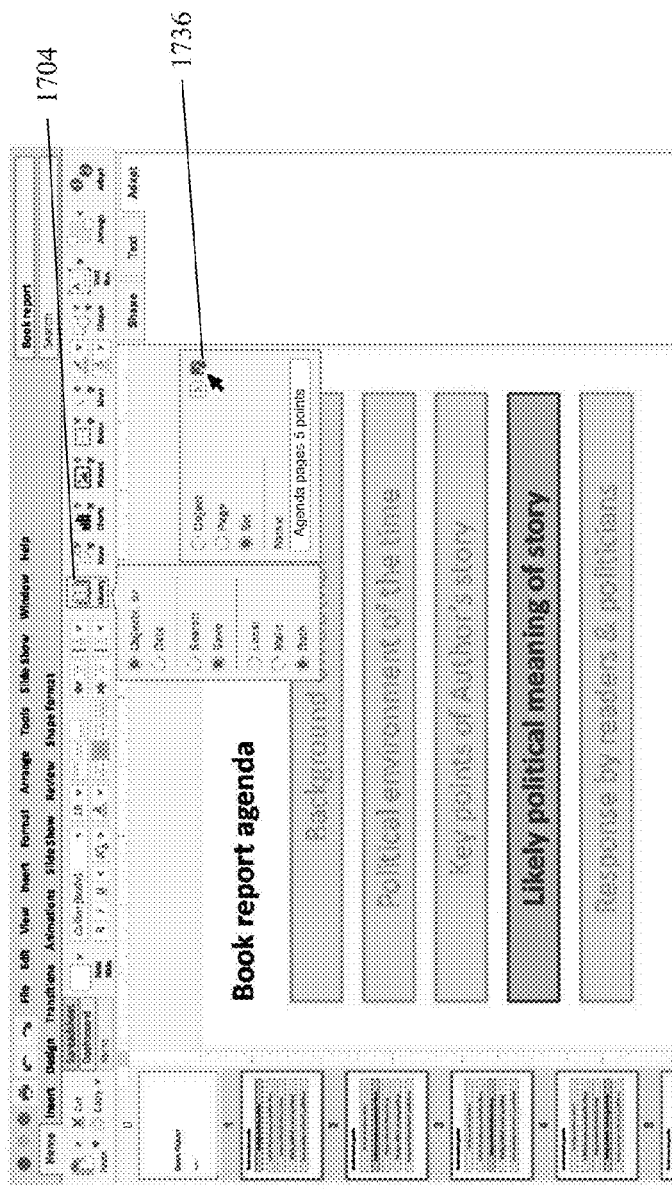
FIG. 17A illustrates an example user interface for adding a completed set of selective multi-way replication pages to a library of slide sets.

The results of building the meeting agenda can be made available in library 1704 by selecting add to library 1736, as shown in FIG. 17A. The new library item named 'Agenda pages 5 points' 1766, a meeting agenda with five slides 1786, is available for future use. Think about the ease of copying and using the agenda slides for a different presentation. The user simply inserts the set and can make changes on only one of the pages and have all the changes automatically replicate on the other slides. Those changes can be very substantial yet will auto replicate. Emphasized features can include numbered points replaced by dot points or text points, boxes replaced by 3D shapes, ovals or fancy graphics, different fonts and colors of text with centering or right justification, different arrangement and spacing on the slide, and different points could be vertical and sequenced across the slide. The options for easy reuse present huge opportunities for work elimination, very quickly delivering much more interesting looking charts, and making last-minute very dramatic changes incredibly easy. Users can copy and paste agenda slides where they want them in a presentation and simply change the selective multi-way replication settings to build the presentation they want, with all the selective multi-way auto replication capabilities they desire.

Figure 18C:
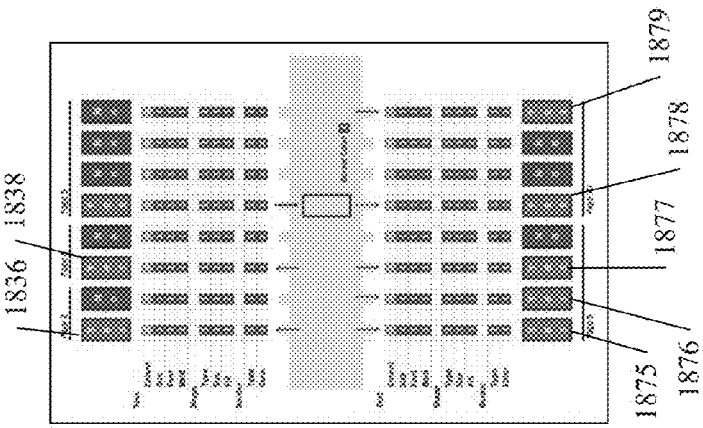
FIG. 18A through FIG. 18C examples the data flow for selective multi-way replication.
Figure 18B:
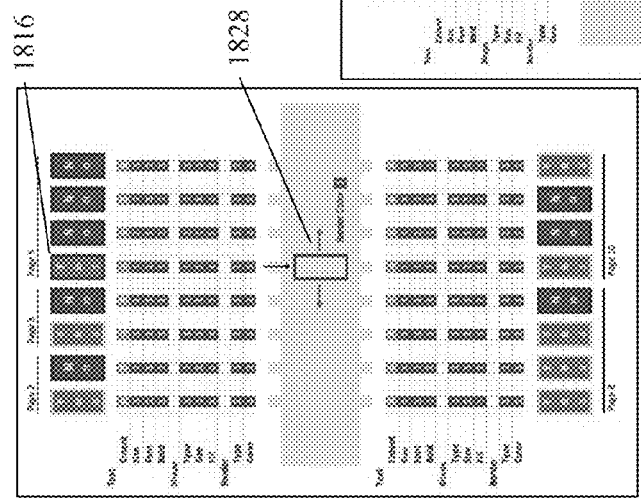
Figure 18A:
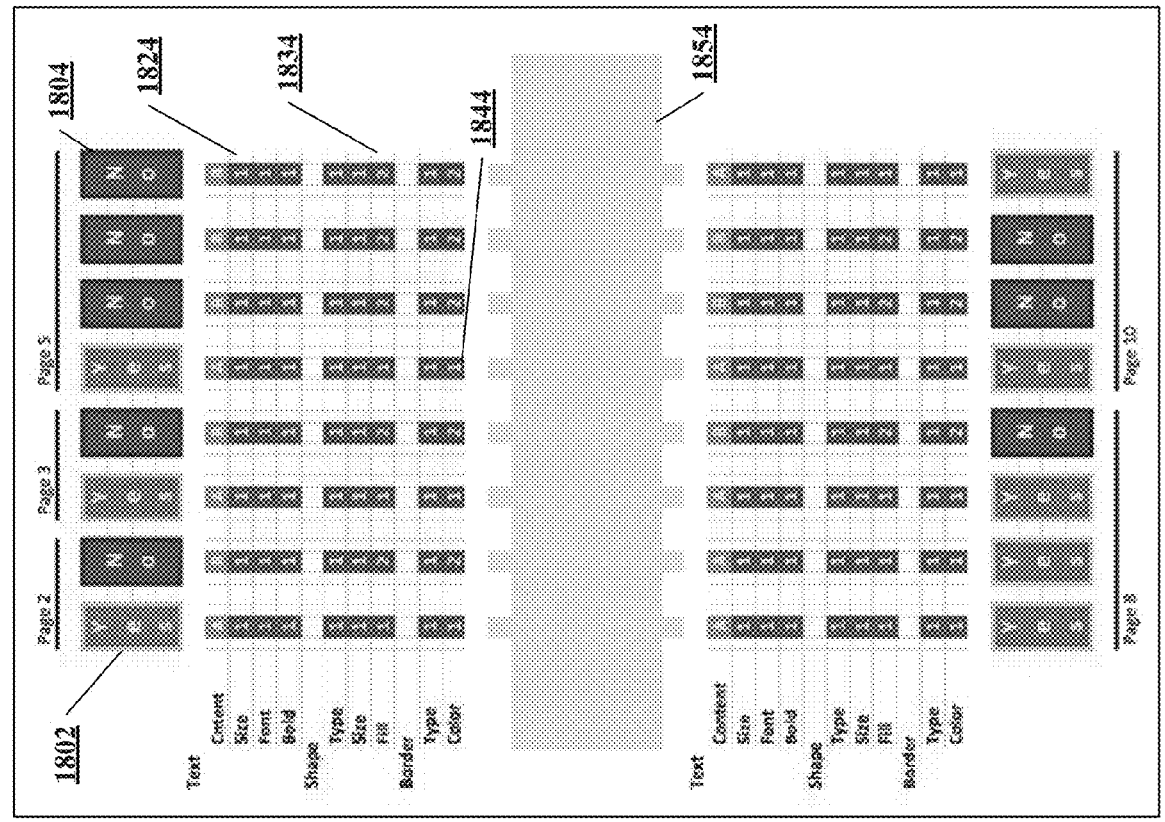

FIG. 18A through FIG. 18C illustrate the data flow for selective multi-way replication, utilizing data change communication bus 1854. In the example, two different builds, '1' 1824 in blue boxes, and '2' 1834 in red boxes, have been created with 'A' and 'B' text content groups. The two builds are currently being used for a vertical green box with the text 'Yes' 1802 and a vertical red box with the text 'No' 1804. Those boxes are displayed on pages 2, 3, 5, 8 and 10 of a document. The user, when looking at page 5, decides that the green box would look better if the border color was changed from light green to a much darker shade and changes box 1816 to use the darker border. Border color is an element of build one for that box 1844. FIG. 18B shows the border color change 1816, and publishes the change 1828 to start the replication, using a publish-and-subscribe middleware model in which all the elements see all the changes and accept only relevant changes for that element. The data change communication bus message 1828 signals that the border color of build one has been changed to a shade of dark green. FIG. 18C shows the result when the subscribers to build one for border color 1836, 1838, 1875, 1876, 1877, 1878 and 1879 receive a message that border color has been changed to the dark green making the change.

Figure 19:
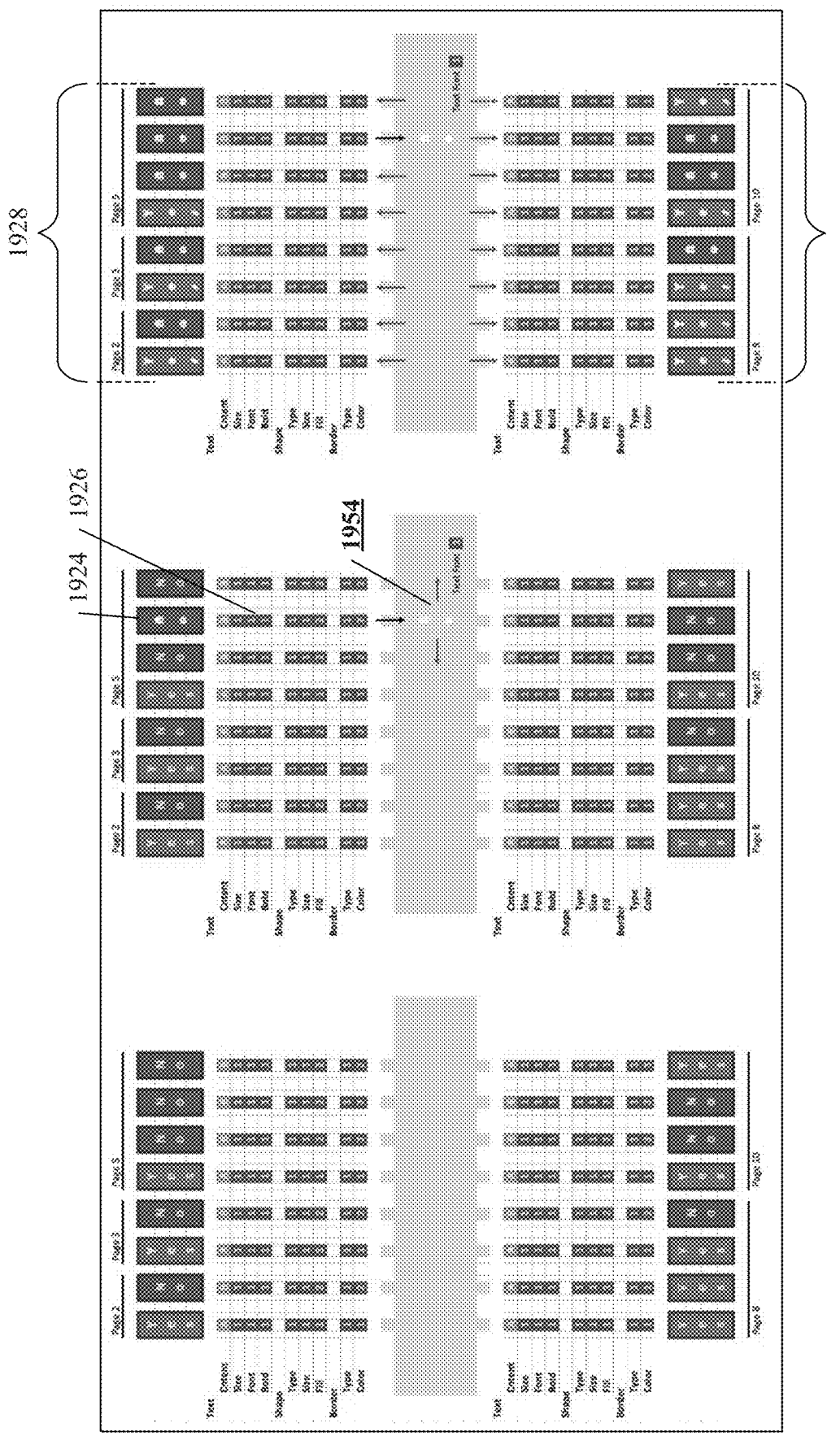
FIG. 19 examples how the selective multi-way replication messaging can change elements that appear in a different build when the change is not to that build.

Similarly, FIG. 19 illustrates how the selective multi-way replication messaging can change elements that appear in a different build when the change is not to that build. In this example, the user continues to edit page 5, but could be working on any page and the change would replicate the same way. The user decides they want to change to a different text font and so they change element 1924. Text font for that element 1926 is in build 1 and is in the same build for all the elements, in this example. The change replicates immediately to all the other elements 1928, 1988 as shown by the blue arrows that illustrate the subscribers accepting the changed and published text font 1954.

Figure 27:
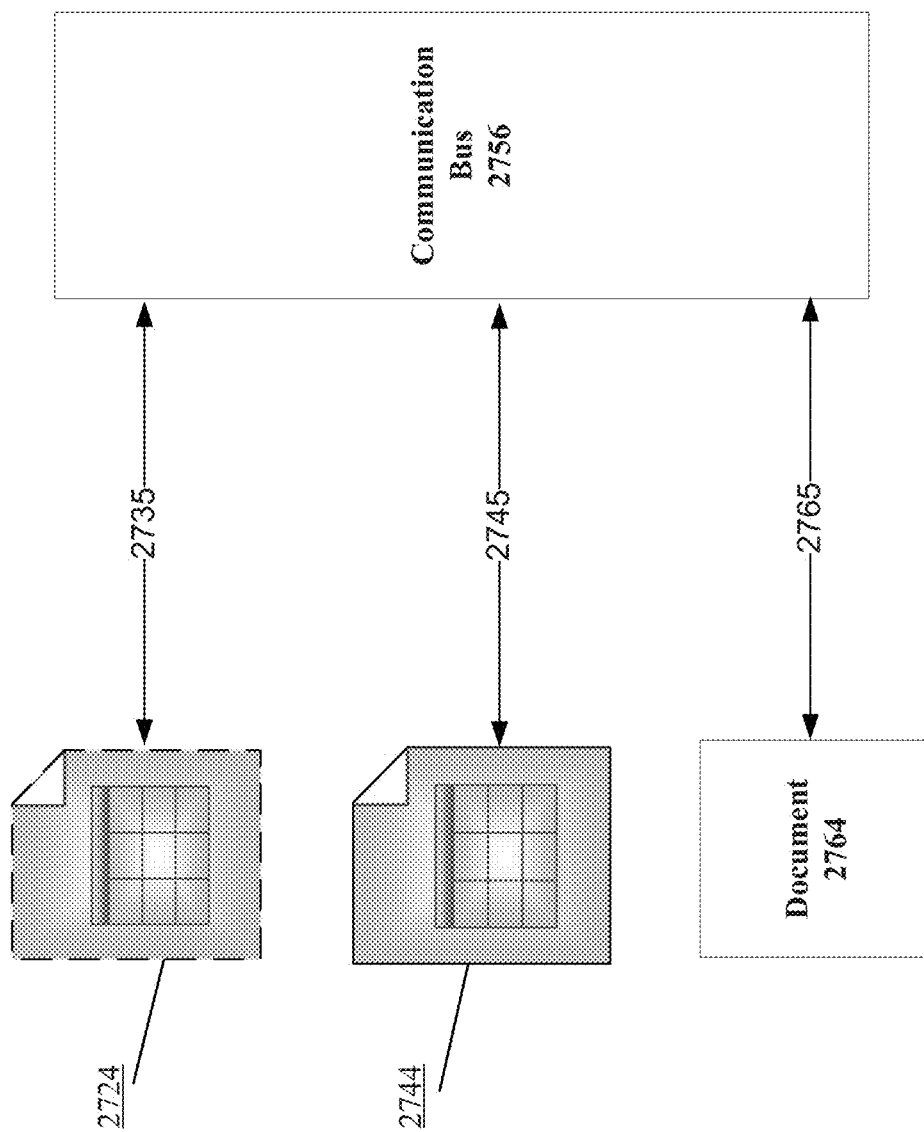
FIG. 27 shows a block diagram of data flow for selective multi-way replication.
Figure 49:
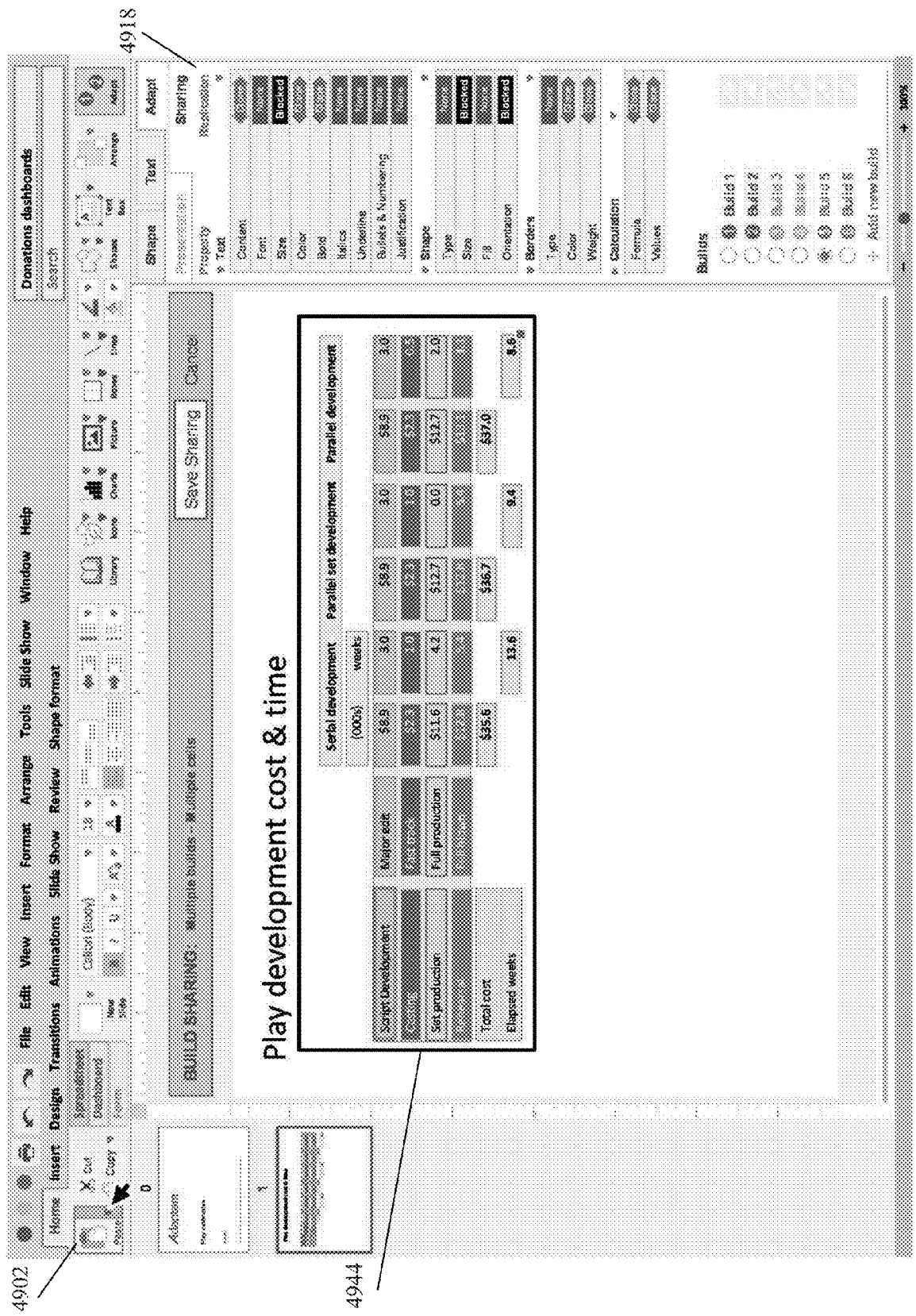
Figure 50B:
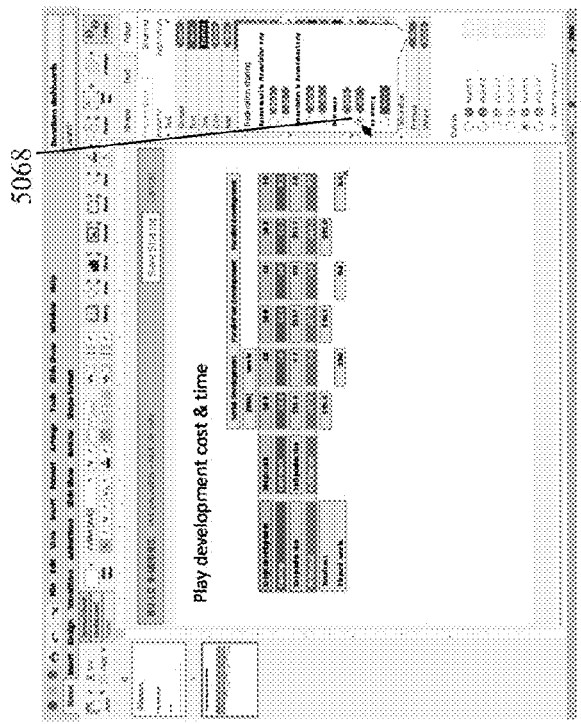
Figure 50A:
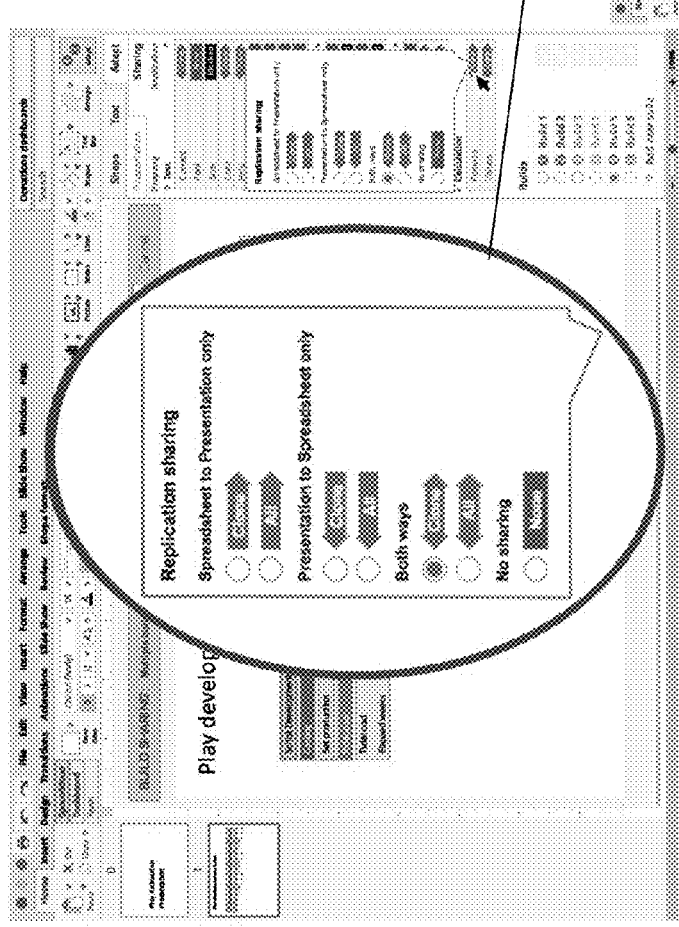
FIG. 50A shows the sharing options.

FIG. 27 shows a block diagram of selective multi-way replication to cells which are linked across document types: a presentation page, a dashboard, a form, a Word page, a data visualization form, a spreadsheet or other document. The publish-and-subscribe data model extends across those documents, with selective multi-way replication then working at the element level. In this example, there are connected elements in three different documents, 2724, 2744 and 2764. Each of the elements is connected via 2735, 2745, or 2765 to the Communication Bus 2756 through which the messages pass when properties are changed within elements, as shown in FIG. 18A through FIG. 18C and FIG. 19. Substantial differences in the replication can occur at the specific element property level, as for example there are features of a presentation that do not well translate to a spreadsheet or a Word page and visa-versa. Therefore, those properties may be blocked from replication by the user or by a default setting, while other features propagate in the manner shown in FIG. 18A through FIG. 18C and in FIG. 19. One implementation of controls over propagation between document types is shown in FIG. 49, 50A-B, as explained below.

Boat Arrow Graphically-Styled Container Use Case

Another way to save users a large amount of work is to use selective multi-way replication for shapes, pictures, video, audio, SmartArt, charts and other graphic elements— as well as combinations of any of them. For example, students frequently use arrow shapes in many places in their documents and then decide to change the outline color, fill color, shadowing or other property of the shape. A boat styled arrow is an example of a graphically-styled container of cells to which selective multi-way replication can be applied. The next examples show multiple ways in which gravity can be applied when replicating images. The user may want to specify some elements as staying stationary, as though they are bolted onto a sailboat tilted by a wave on the water, and other elements to stay vertical relative to the horizon when the sailboat rolls on the waves.

Figure 20:
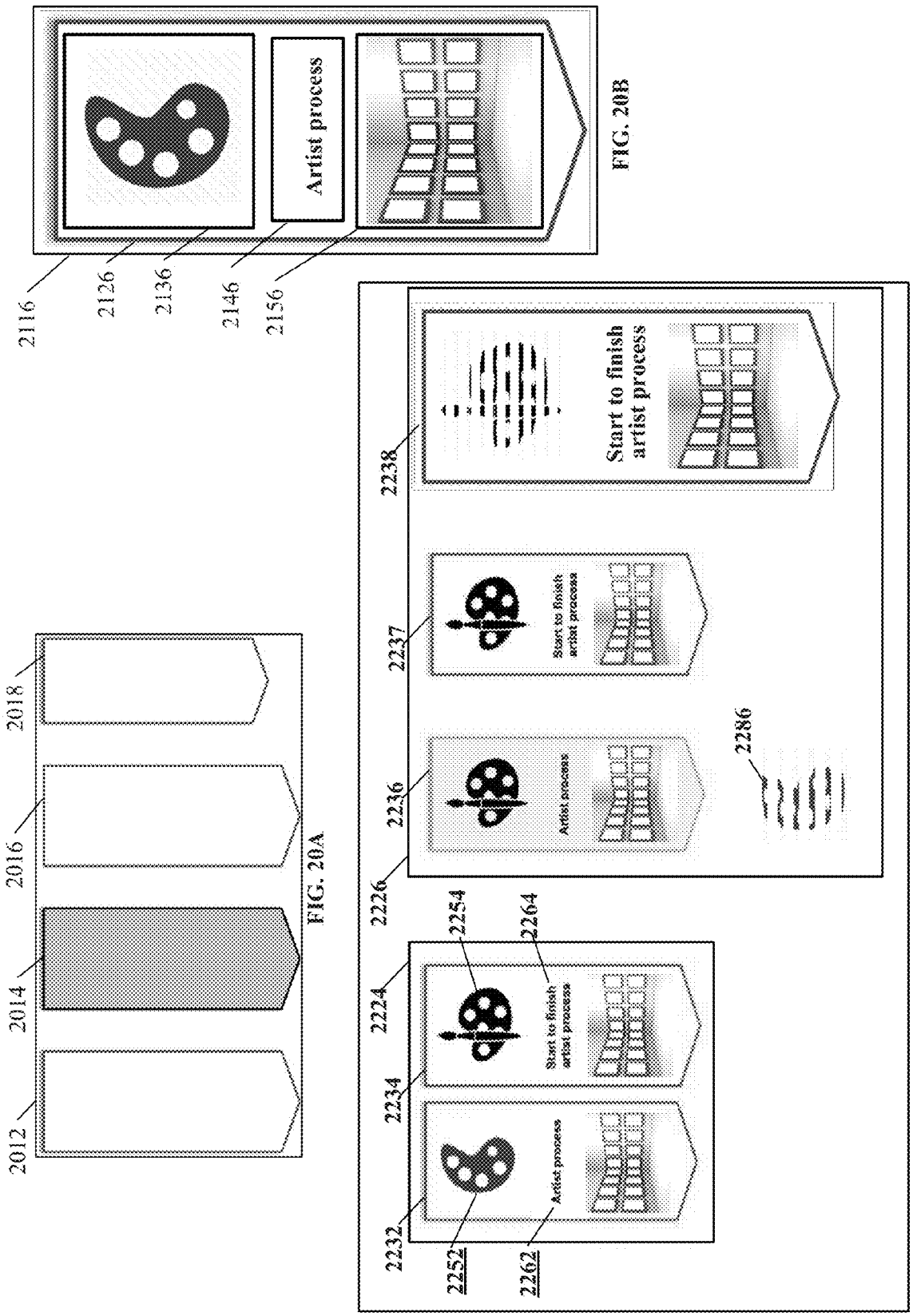
FIG. 20A shows example arrows for illustrating the use of selective multi-way replication for graphic, picture and text content.
FIG. 20B shows a combination of elements grouped together, for illustrating the use of selective multi-way replication.
FIG. 20C shows propagation of selected elements across multiple designs, for illustrating the use of selective multi-way replication.

FIG. 20A shows four example boat styled arrows for illustrating the use of selective multi-way replication for images. A user may start with simple fat arrow 2012 and later decide to change the shape fill and shape outline colors to arrow 2014, remove the shading as shown by arrow 2016 or change the size to that of arrow 2018. Any of these arrow changes could be replicated through all the arrow element usage events throughout the slide deck. Selective multi-way-replication can drive the selection of arrow property changes to replicate. In one example, a page may utilize its own unique color theme and if so, the selective multi-way replication can exclude replication of colors of the arrow line and the fill, while other changes such as the shadow and the size can be selected to automatically replicate.

FIG. 20B shows a more complicated example, with a combination of elements 2116 grouped together: the fat blue arrow outline 2126, with black outlined picture 2136 sitting above black outlined 'Artist process' text 2146 which is sitting above black outlined picture 2156. Combining and naming a group of elements allows easier identification and reuse of the group, as well as selective multi-way replication limitations specific to the group, which is exemplified in FIG. 20C.

FIG. 20C shows propagation of selected elements across multiple designs. In box 2224, changes are displayed for one titled group element 'Arrow artist' 2234 in which palette image 2252 is replaced by palette-and-brush image 2254 and 'Artist process' text 2262 is replaced by 'Start to finish artist process' text 2264. The automatic replication impact on the remainder of the document is shown in box 2226. The 'Artist arrow' 2236 has been set to a different color and does not change, and selective multi-way replication are turned off for outline border color and arrow fill color, as is the text 'Artist process' which does not change to 'Start to finish artist process'. In contrast, Artist arrow' 2237 has all multi-way replications turned on, so all the changes from group element 2234 get replicated. In the third example, 'Artist arrow' 2238 has all the selective multi-way replication, except size, turned on for all the elements and therefore all the changes, except size, get replicated. As it turns out for this example, palette image 2252 is also used elsewhere in the deck, and because the replacement image in 'Artist arrow' 2234 is selective and not an overall replacement of presentation element 2254 in place of presentation element palette image 2252, palette image 2286 does not change in the slide deck.

Selective Transposition

Figure 21:
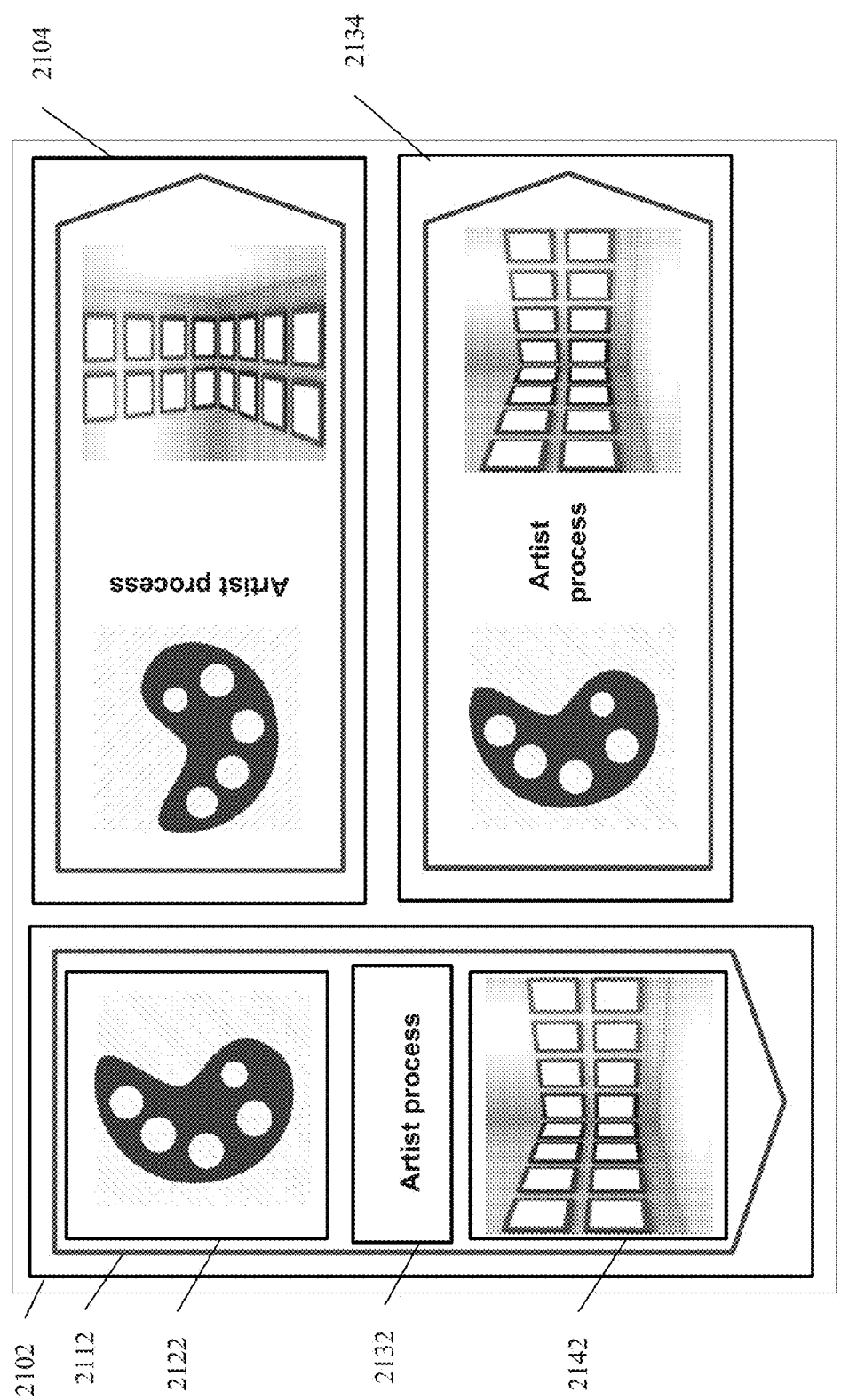
FIG. 21 through FIG. 23 illustrate selective transposition capability.

Selective multi-way replication can be further enhanced by selective replicate transposition, which improves on the transposition of rows and columns of information in tables or spreadsheets and the group-and-rotate capability of presentations to add further selectivity to the nature of the rotation. Selective replicate transposition applies both to data from spreadsheets and to arbitrary data, such as process set labels. In the example shown in FIG. 21, gravity and orientation are illustrated further. We start with four titled presentation elements in frame 2102 and show grouping those elements in a presentation application and then rotating the elements 90 degrees counterclockwise, resulting in presentation 2104. However, the user may want to keep the icons and text oriented the same direction on the page as the original arrow 2112, despite the rotation. Our invention gives users a selective transposition option in which the orientations for palette object 2122, text object 2132 and gallery object 2142 are selectable options, relative to the page. This is shown in presentation 2134 in which icon 2122 and icon 2142 stay oriented the same way, relative to the bottom of the page, and text 2132 keeps its page orientation and adjusts its space and text configuration relative to the other objects. Neither existing spreadsheet transposition nor presentation application rotation includes this selective orientation option. Existing presentation applications also do not have a multiple relationship orientation capability options illustrated in the next example.

Figure 22:
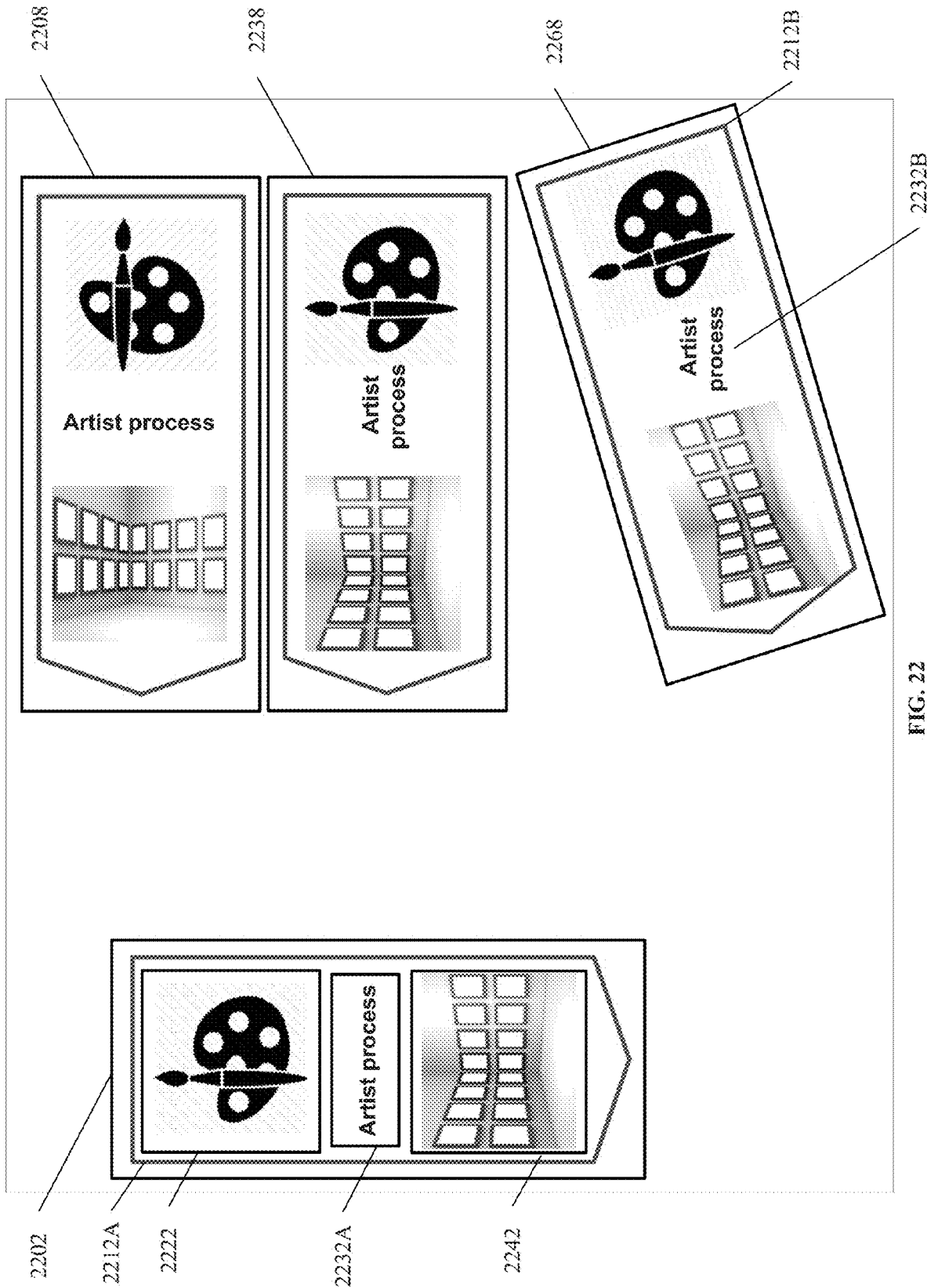

FIG. 22 illustrates selective orientation, rotating the four elements of presentation 2202 by 90 degrees clockwise with the typical approach, resulting in presentation 2208. With our approach and with the page orientation locking turned on, palette object 2222, text object 2232A and gallery object 2242 keep their page orientation and arrow 2212A rotates 90 degrees clockwise as shown in presentation 2238. Presentation 2268 shows the results of rotating presentation 2238 by 75 degrees counterclockwise with the page orientation 'on' only for text object 2232B and another variant of the page orientation on for palette object 2222 and gallery object 2242. That transposition variant works against two orientation specifiers. The first keeps the orientation alignment relative to a specified object, in this case, arrow 2212B, the second the page orientation as close as possible. The first specifier ensures that palette 2222 and gallery object 2242 keep one edge of their elements aligned with the arrow 2212B while orienting the icons so that their bottom edges stay as close as possible to oriented towards the bottom of the page. When using a group of elements multiple times and with multiple orientations, these intelligent transposition options will eliminate a lot of work. This is particularly true when combined with altering one of the elements and having that change automatically replicate throughout the other linked, grouped elements, while maintaining the correct orientations.

Users can set the orientation they want relative to an element of the group of elements. Just as users can set the desired selective multi-way replication settings, a similar capability is disclosed for transposition. The user will be able to specify settings such as 'All text page orientation' to specify that all the text content retain its orientation toward the bottom of the page as it is rotated. In one example, an arrow object, palette object, text object and gallery object can each be set to utilize whatever setting the user prefers. The user can also set two or more elements of an object group to retain their relationship to each other as rotation takes place. For example, elements can be set to maintain their right-to-left order despite rotation, or elements can be set to retain or switch their front-to-back order during rotation.

Figure 23:
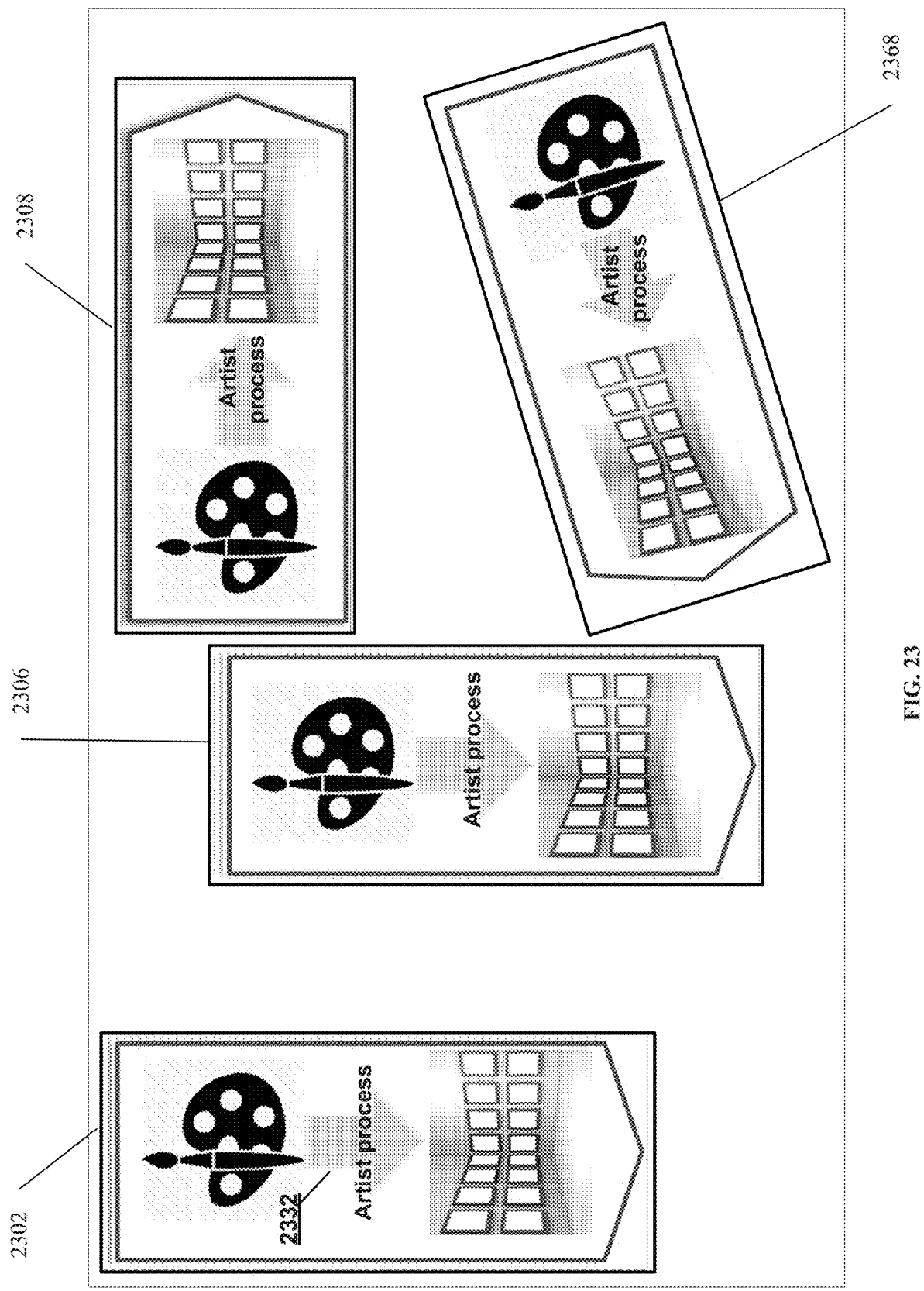

FIG. 23 shows an example of auto-replication of additions: adding an additional graphic element 2332 to the graphic group 2302. That element then replicates to all the linked graphic groups that accept all changes, accept additions, or accept shape changes, which in this case includes graphic groups 2306, 2308 and 2368. This auto replication of additions will make it very easy for users to make changes in one place and have no worry about missing making the same change elsewhere in the document.

Figure 24B:
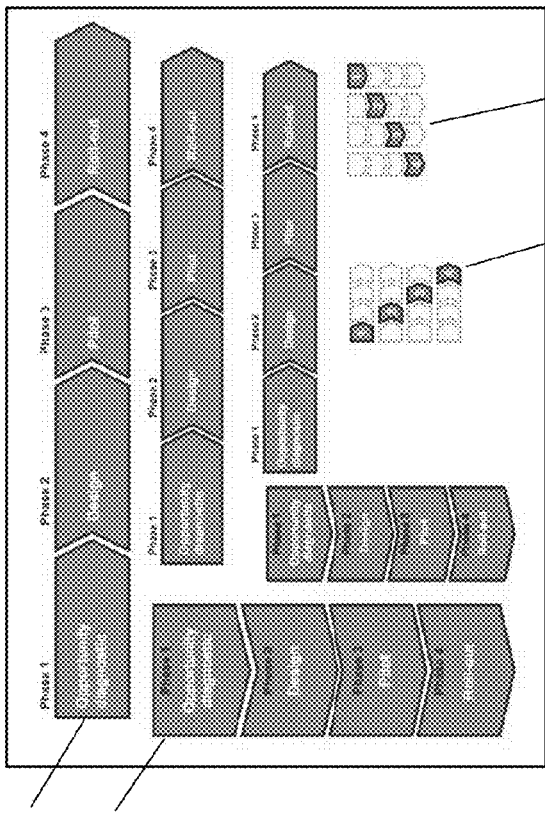
FIG. 24B shows the set of related selective multi-way replication elements made available from the library after selecting a design.
Figure 24C:
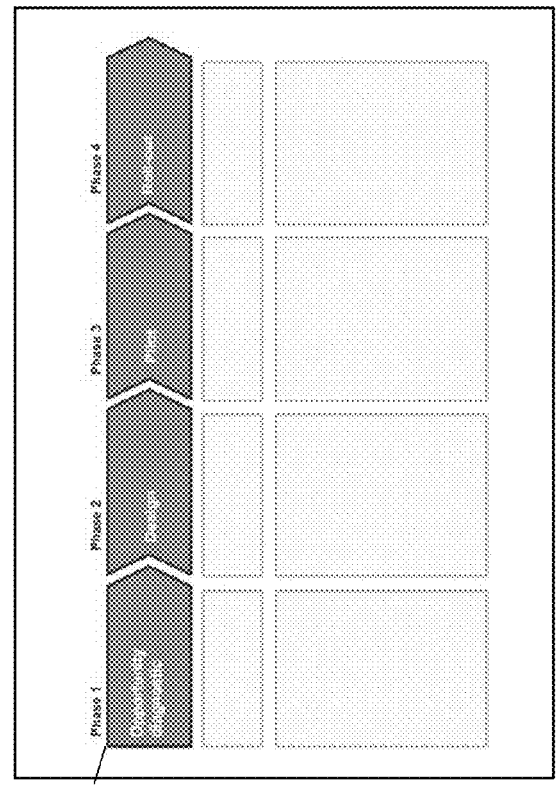
FIG. 24C illustrates a user-created presentation page, created by using drag-and-drop actions from a page in the library of elements.
Figure 24A:
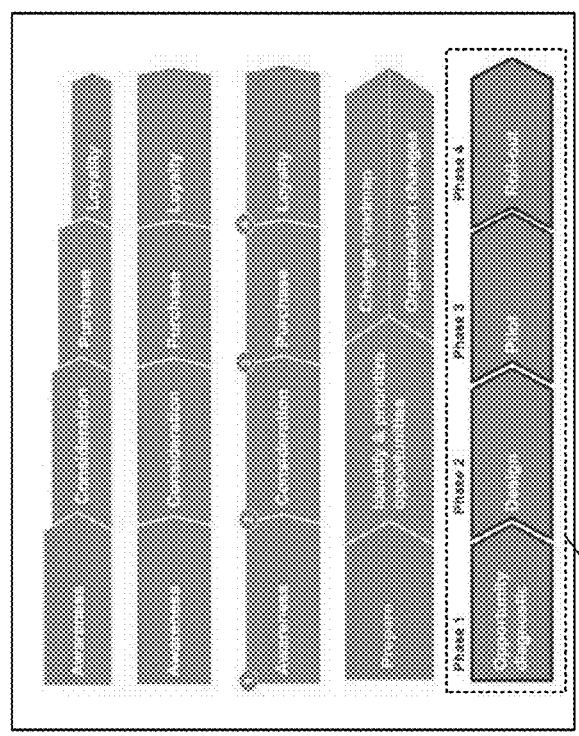
FIG. 24A shows an example library of elements.

An example library of elements, shown in FIG. 24A, allows navigation to sets of selective multi-way replication elements. After selecting design 2452, six replication element sets, shown on selector page FIG. 24B, are made available from the library. The user can create their design using drag-and-drop actions from the selector page of alternative replications. In one case, a user can select a horizontal list of activity phases 2416 to create a page 2456 in FIG. 24C in which the user fills in more details. A user could then create vertically oriented page by dragging and dropping the far-left vertical set of activity phases 2426, and use breadcrumb element 2446 or breadcrumb element 2448 on supporting pages giving detail on specific activity phases. The library elements give users a very powerful way to replace creation with easy editing to get exactly the design they want.

Figure 25B:
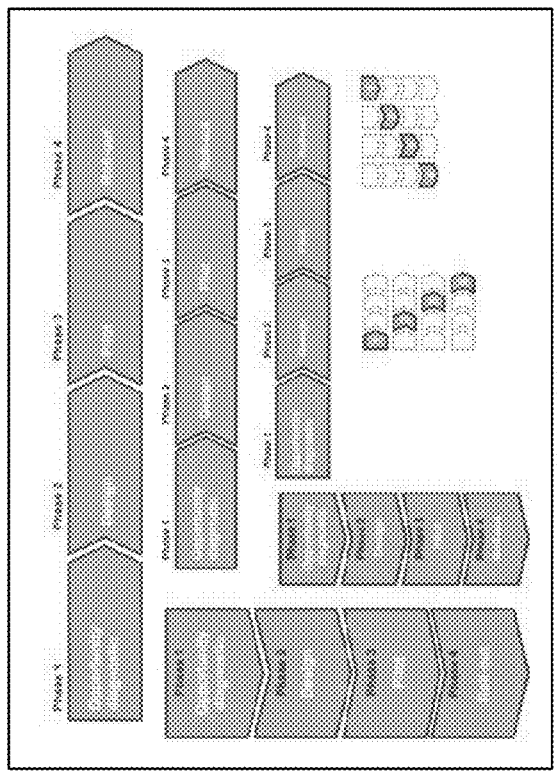
FIG. 25B shows the change, illustrated in FIG. 25A, automatically propagated to the set of selective multi-way replicated elements.
Figure 25C:
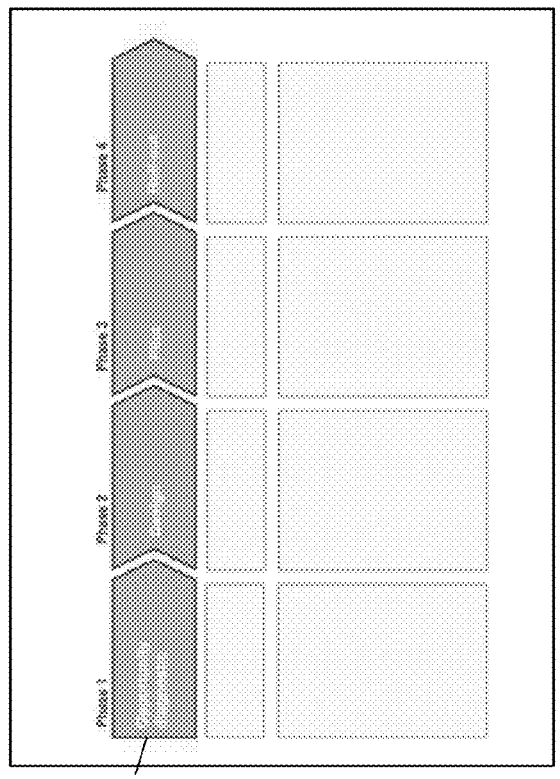
FIG. 25C shows the user-created design with red background color ready for use, after a single editing action by the user.
Figure 25A:
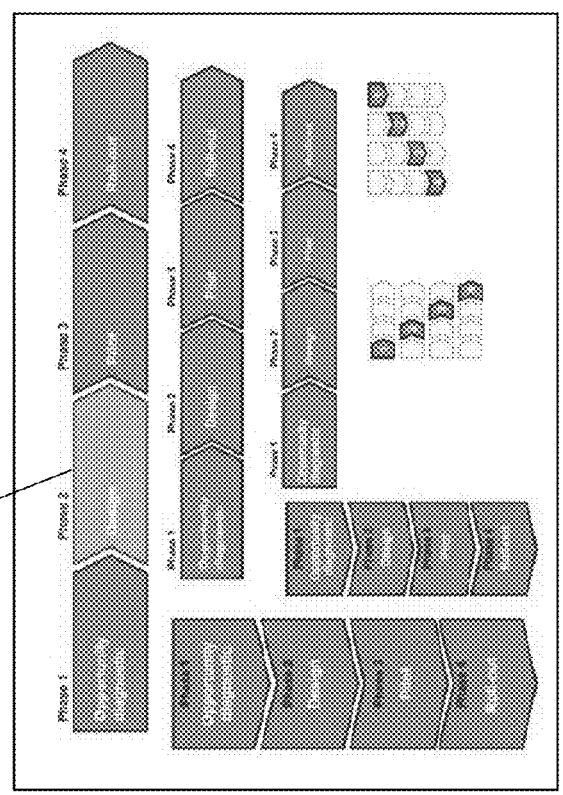
FIG. 25A shows an example of a design element edited to change the element background color from blue to red.

A user can also apply an easy edit to an element in the selective multi-way replication elements to obtain the look they want: FIG. 25A shows phase two design element 2534 edited to change the element background color from blue to red. FIG. 25B shows the change propagated to the set of related selective multi-way replication elements and FIG. 25C shows the new agenda 2556 with red background color ready for use, after a single editing action by the user done on a different page in this example.

Applying Selective Multi-Way Replication to Previously Built Document Elements

Figures 42A, 42B, 42C:
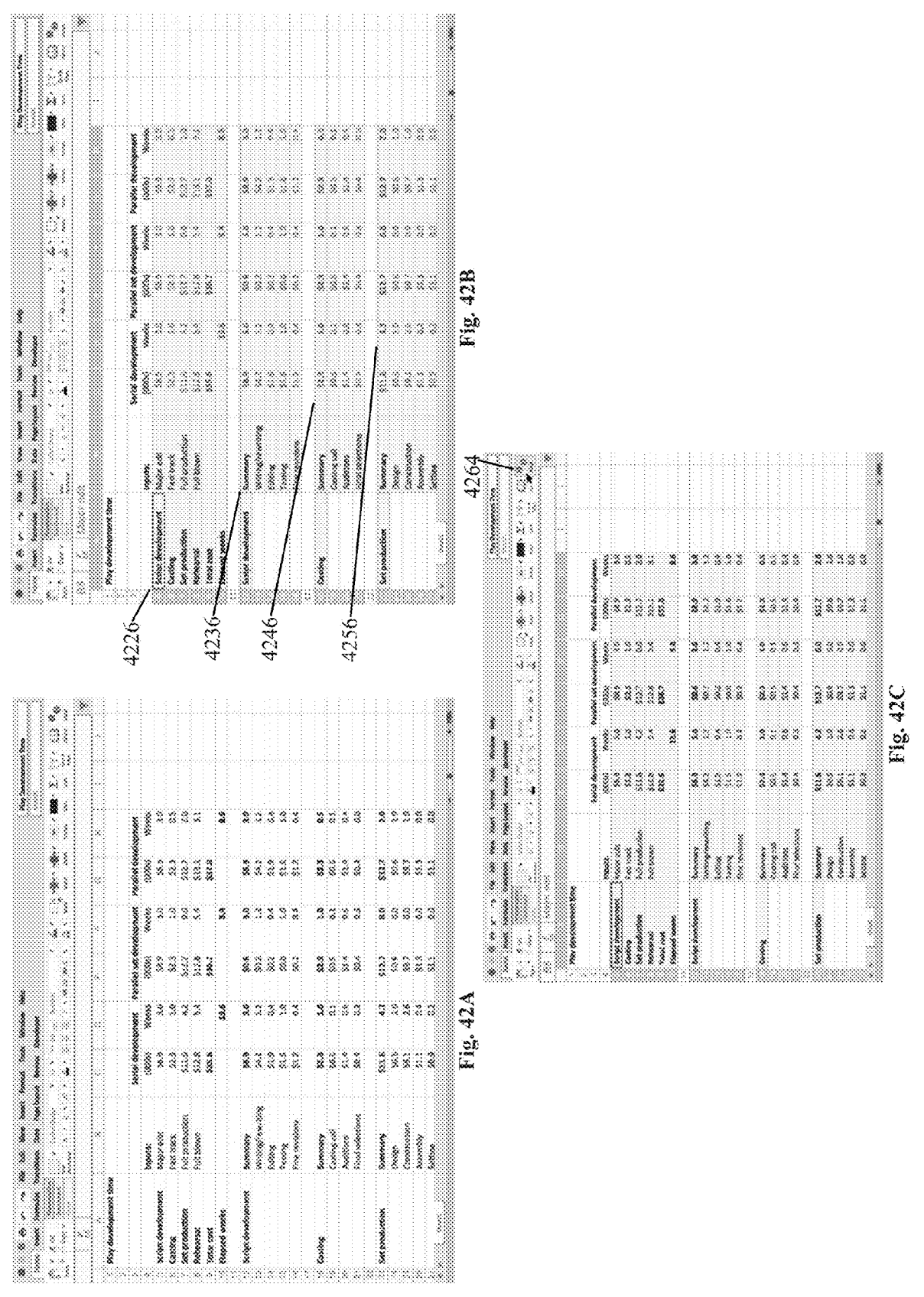
Figure 43:
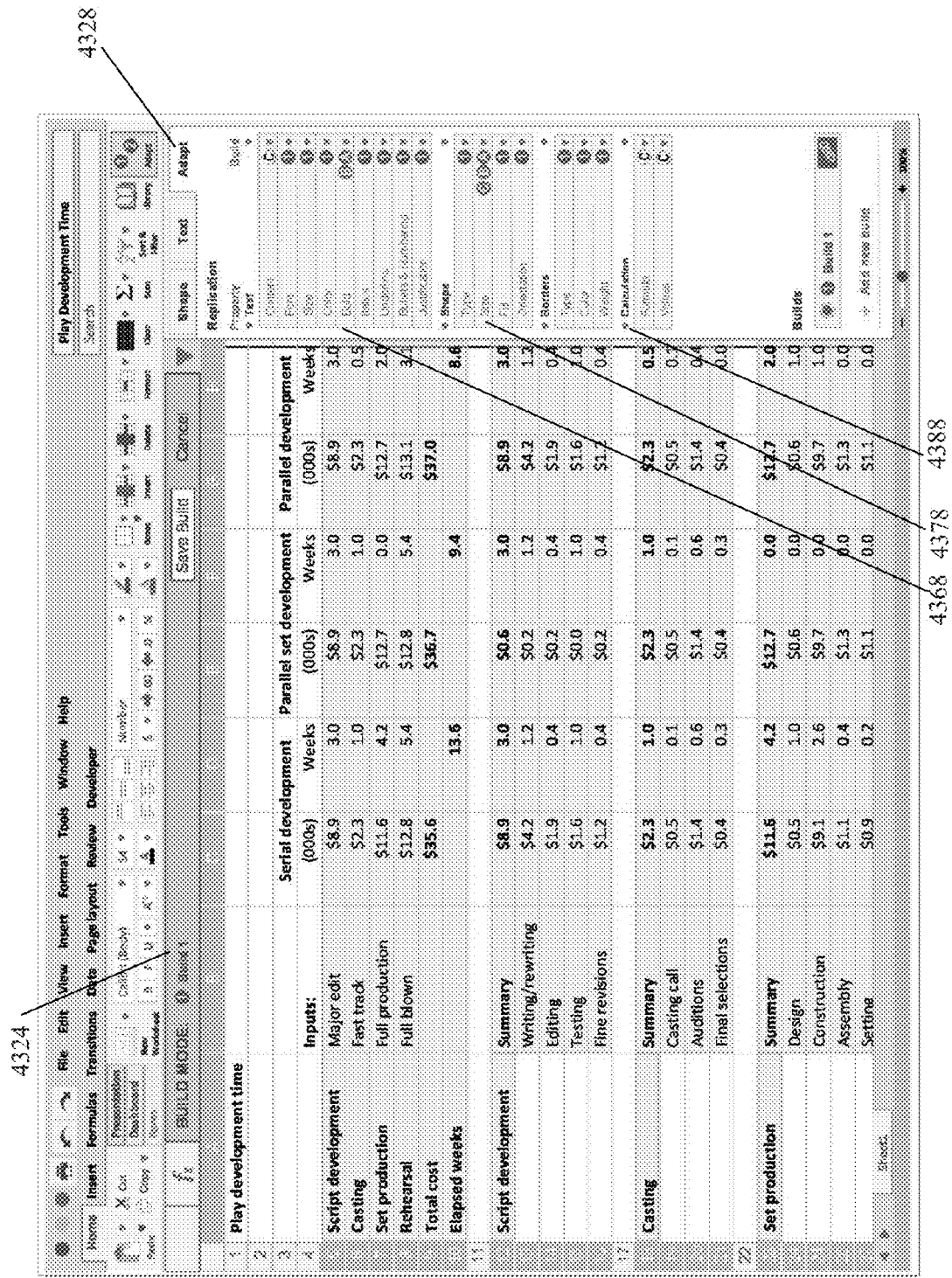
FIG. 43 displays the selective multi-way replication build created, based on FIG. 42A through FIG. 42C.

Selective multi-way replication can be applied to previously-created document elements. In this implementation of the disclosed technology, the application automatically determines any differences in the elements for which the multi-way selective replication 'adapt' capability is being applied and creates a group build or other builds to accommodate them. FIG. 42A shows a previously-created spreadsheet with many different cells, usable by a college theater group to estimate play production parameters. The user highlights many cells for which they would like to employ selective multi-way replication, for formatting and other purposes: spreadsheet cells 4226, 4236, 4246 and 4256 as shown in FIG. 42B. The user can employ the selective multi-way replication capability by clicking on the adapt control 4264 shown in FIG. 42C. The application then automatically creates Build 1 4324 for the highlighted selected cells, attributing properties with the same value across the cells to Build 1, as shown in adapt replication property tab 4328 in FIG. 43. For cells having large numbers of properties, or each cell having different properties, the application assigns a cell-specific build (the Capital C in the circle) as shown in Calculation 4388 for formula and values, signifying that there is no shared build across the highlighted cells for these properties. In this use case example, the application preferences are preset to five or fewer property differences for which the application automatically creates group build variants. In this example, two properties have a reasonable number of differences: bold text font 4368 which has two group variants (A and B) and shape size 4378 which has three group variants (A, B and C).

Figure 44:
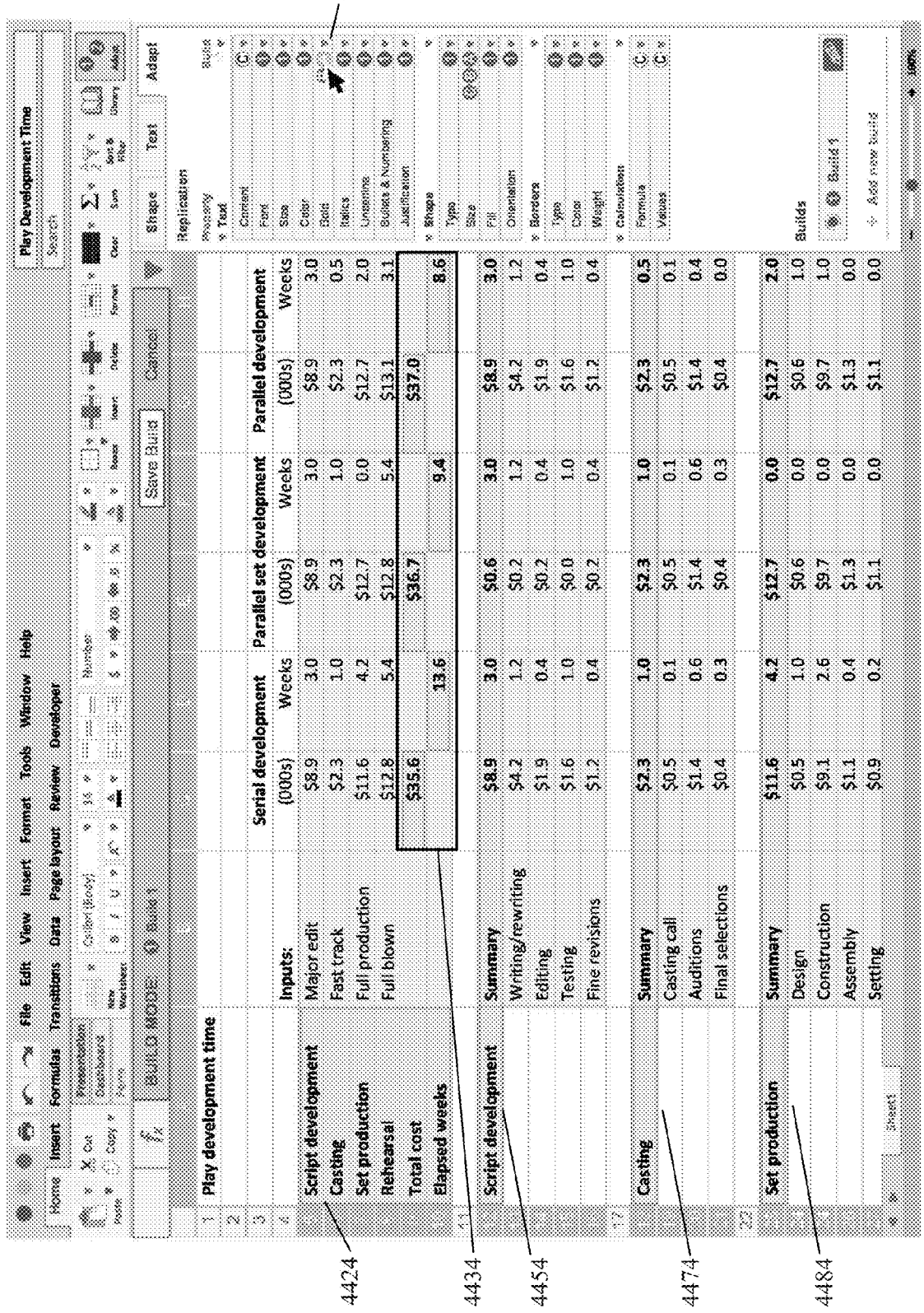
FIG. 44 displays the selected text font bold group A cells created by the build in FIG. 43.
Figure 45:
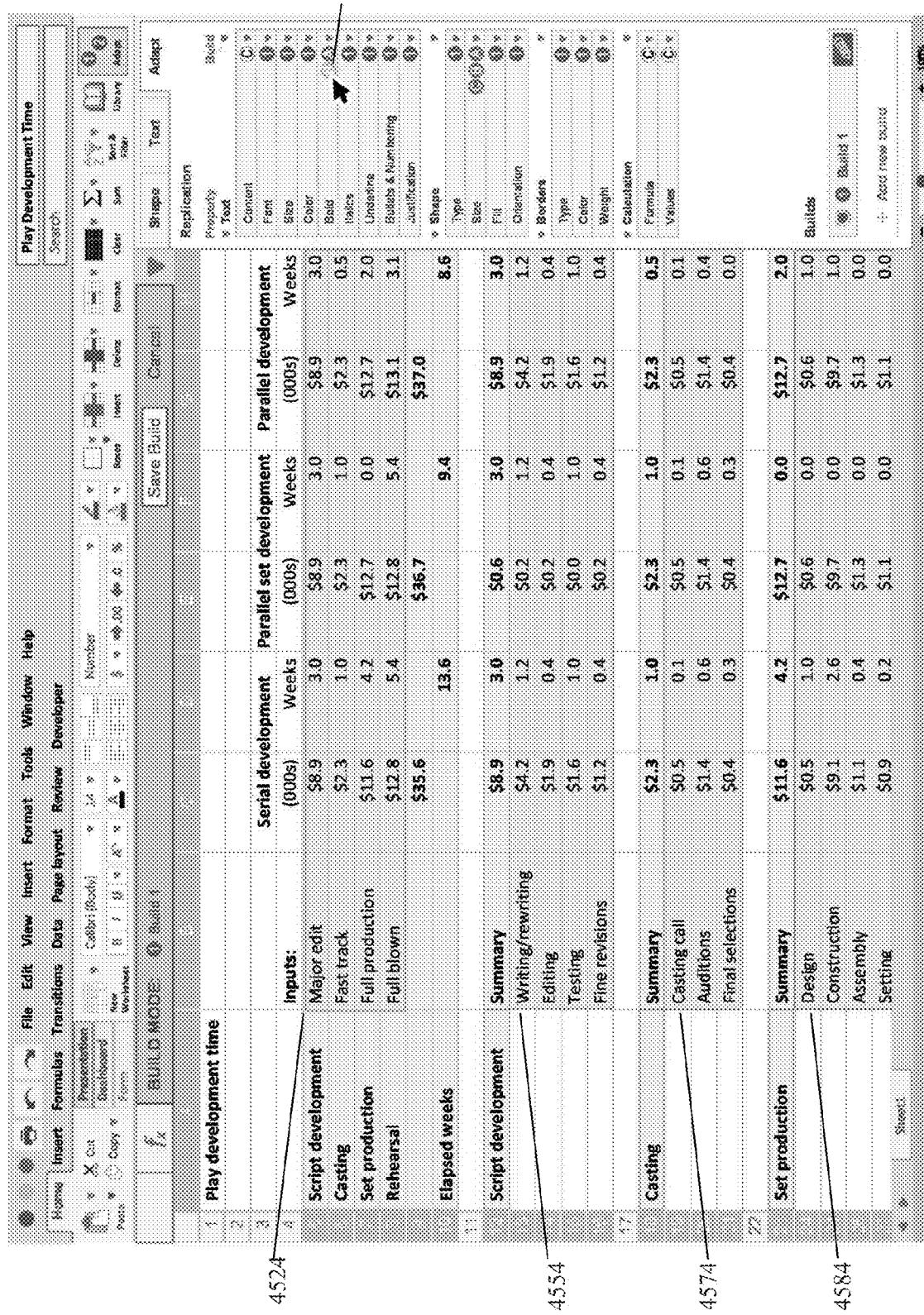
FIG. 45 shows the selected text font group B non-bolded cells created by the build in FIG. 43.

Continuing with the play production spreadsheet, FIG. 44 and FIG. 45 illustrate ways that group variants work. In one embodiment, when the user selects text font group variant icon 'A' 4438 in FIG. 44, the application highlights in green shading the cells that fall into that build: cells that utilize the bold font property 4424, 4434, 4454, 4474 and 4484. Similarly, FIG. 45 illustrates the results of the user selecting text font group build icon 13' 4538: the application highlights in green shading the cells that fit into B group build, the non-bolded cells. The user can then decide whether they want to (a) retain those groups, (b) eliminate the groups with a different build selection such as making bold not a replicated property, or (c) unify the cells and differences, and then assign them to a build without the group differences.

Figures 46A, 46B, 46C:
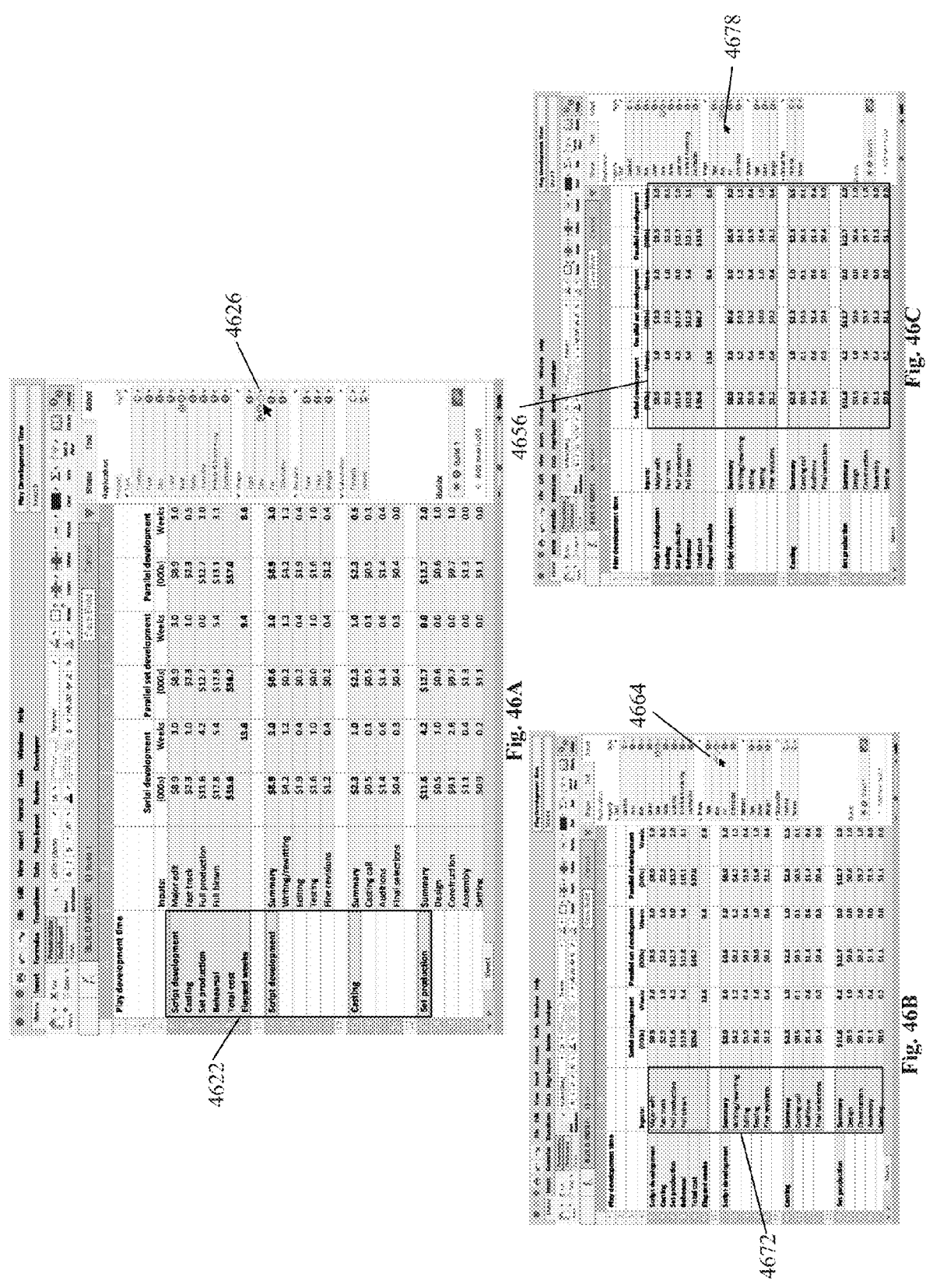

Continuing with the play production spreadsheet, FIG. 46A, FIG. 46B and FIG. 46C illustrate the selections for the shape size group property. When the user selects option 'A' 4626 the application highlights applicable cells 4622. When the user selects option '13' 4664, the application highlights applicable cells 4672 shown in FIG. 46B. When the user selects option 'C' 4678, the application highlights applicable cells 4656, shown in FIG. 46C. This automatic way of handling group variants enables users to quickly and easily create different variants that can be altered so that they impact only a subset of the cells sharing a build. Users can save the build and use it as a basis to create additional build variants.

Figures 47A, 47B, 47C, 47D:
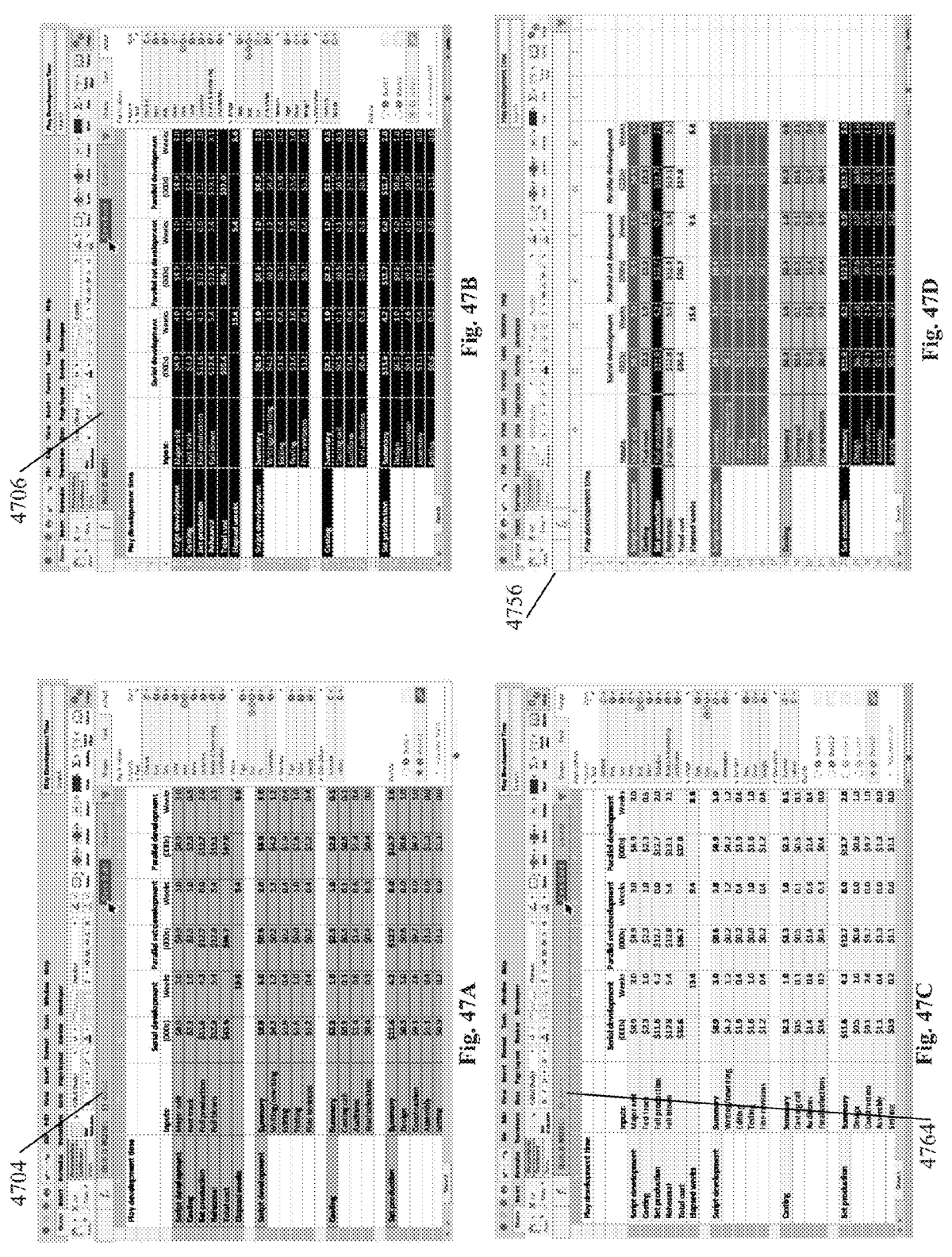

Continuing with a further example of selective multi-way replication applied to previously-created document elements, this use case utilizes the play production spreadsheet build described supra, to create a color coordinated spreadsheet in which the user can easily change colors in a single cell and have those changes replicate to many cells. FIG. 47A displays the creation of build 2 4704, based on build 1 in FIG. 46A through FIG. 46C. Similarly, the user creates build 3 4706 displayed in FIG. 47B, and a build 5 4764 in FIG. 47C. After creating the desired builds, the user can selectively turn on the different builds to create a color coordinated spreadsheet 4756 in which they can easily change colors in any single cell and have those changes replicate to many cells, as shown in FIG. 47D. That is, the disclosed selective multi-way replication offers a quick and easy way for users to create different variants that can then be altered such as to only impact a subset of the cells sharing a build.

Edit Synchronization Between Spreadsheets and Other Document Views

Selective multi-way replication can be applied to the format and content of spreadsheet cells that are incorporated in other document applications, with selective multi-way replication synchronization between updates in the spreadsheet and other document views. In some implementations, data is replicated and synchronized, as between two devices and in other user defined settings some formatting or formula changes are replicated.

Figures 26A, 26B:
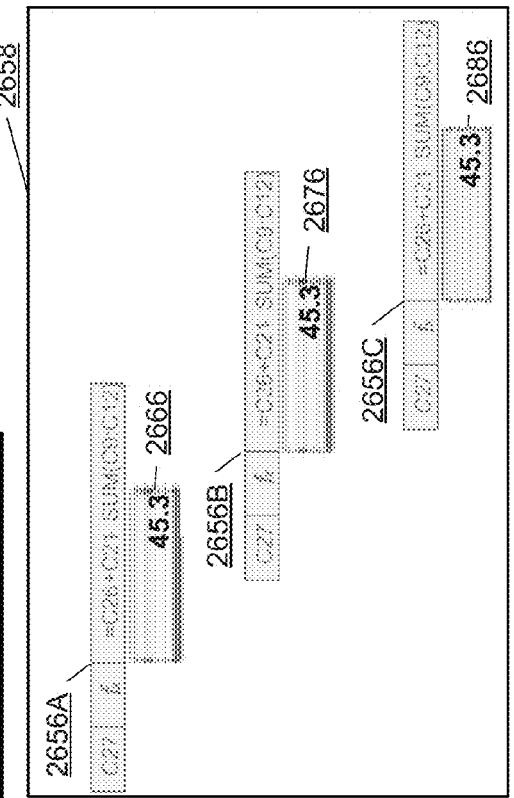
FIG. 26A shows an example for three groups of cells that are used in both spreadsheet and presentation views.
FIG. 26B displays a spreadsheet cell as it appears in three distinct locations in a presentation.

FIG. 26A shows an example for three groups of cells 2612 that are used in both spreadsheet and presentation views. The user has selected multi-way replication in cell D1 2624 to propagate summation formula 2622 to locations Il1 2634 and P18 2644. In this example, when the user later realizes that the next cell needs be included in the summation, they can change the summation formula in any of the three instances and the change in the formula will automatically propagate to the remaining instances, as shown in the three groups of cells 2616. When the change is automatically propagated, the summation formula is replicated in each summation formula cell—cell location D1 2626, cell location Il1 2636 and cell location P18 2646, the formula has been updated to sum all three cells to the left. This feature enables users to save a lot of time when they use the feature in more complicated settings, as described infra.

Selective multi-way replication and selective transposition capabilities are beneficial when users manipulate spreadsheet cells containing text, formulas and other content within spreadsheets or when those cells are copied into other documents. FIG. 26B displays a spreadsheet cell as it appears in three distinct locations in a presentation page 2658. Each of the cell instances has the same formula visible in respective pop-up formulas 2656A, 2656B and 2656C. By using the disclosed selective multi-way replication capability, the user can build all three cells by first selecting the spreadsheet cell and moving it to the presentation view, and then they can add the bold formatting, increase the size of the font, resize the box, add the fill color, add the outlining of the box, change the thickness of the box outline, select the color of the outline, add the 3D bevel and add the box shadow. In the example in FIG. 26B, the user chose to utilize the exact same formatting with 3D bevel and shadow for both cell 2666 and cell 2676—leaving the inherited selective multi-way replication settings in place, and then changing the settings to not utilizing the 3D bevel and shadow for cell 2688. In this example, a user can elect to utilize the selective multi-way replication inherited from the spreadsheet or they can add or alter builds for the cells within the presentation.

Figure 48:
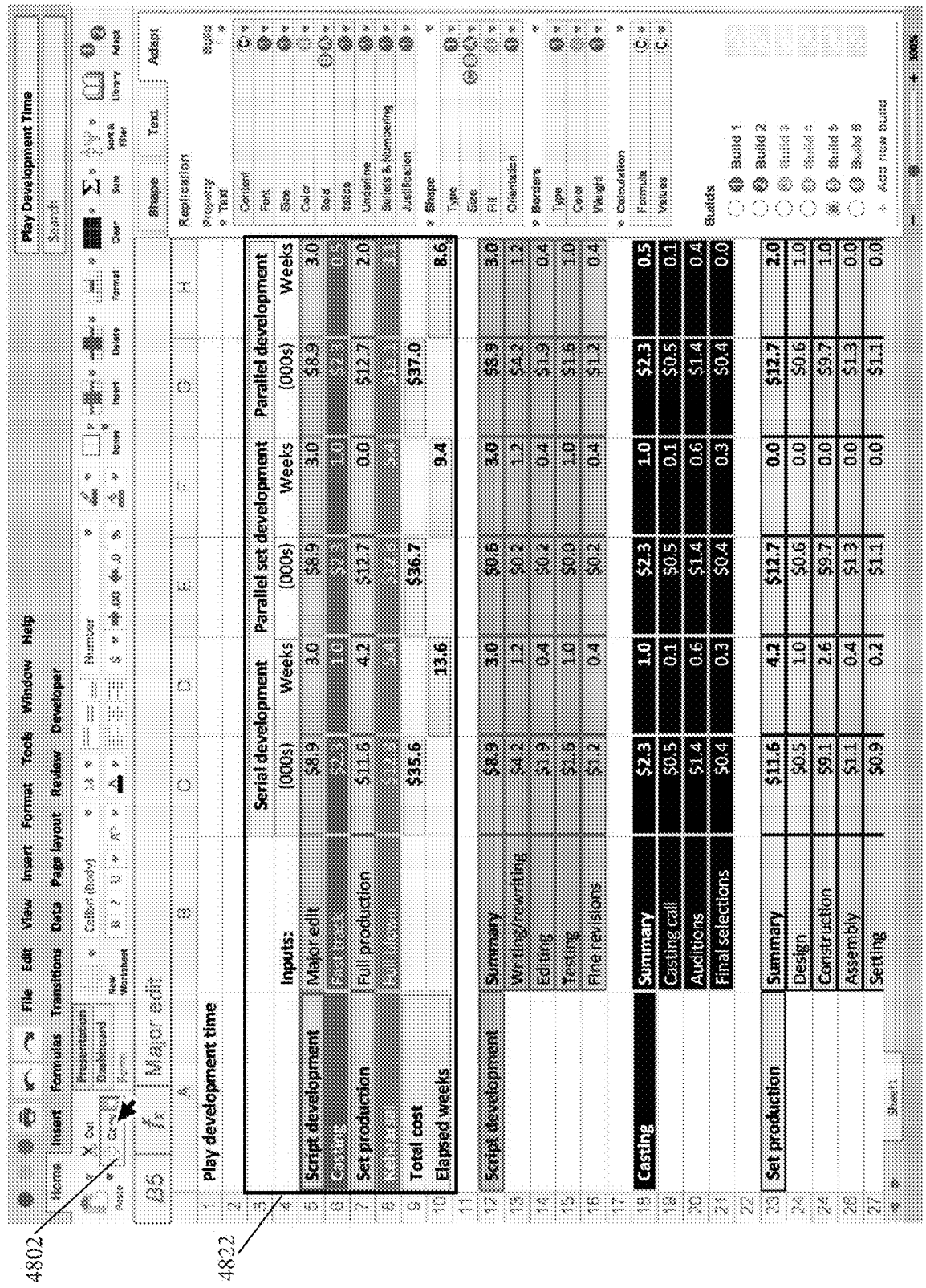

FIG. 48 shows the previously-created selective multi-way replicating spreadsheet in which the user has selected a subset of the cells 4822 to copy 4802 to a presentation view. FIG. 49 shows the results of the user doing adaptable paste 4902 that transfers the selective multi-way replication from the spreadsheet and to the presentation page with the default sharing settings 4918 for the highlighted cells 4944. The sharing settings determine the selective multi-way replication between the spreadsheet and the presentation views of the cells. The user can then decide whether they want to alter those sharing settings before finalizing the build sharing copy and paste. In this implementation, a presentation clone of the spreadsheet has been created that allows the user to decide whether they want all changes replicating back to the original spreadsheet or only to the clone spreadsheet. The clone spreadsheet allows the user to look at the cells in a spreadsheet format: FIG. 50A shows in the magnified pop up 5055, a set of sharing options that allow one-way replication, two-way replication or no sharing. In this example, those settings apply to sharing between three different documents, the original spreadsheet, the clone spreadsheet created for the presentation document, and the presentation document pages. As the user is now viewing the setting from a presentation document page, the sharing in this example is either with the Clone or All for both the Clone and the Original spreadsheet, None for neither and Blocked if auto set by for none by the app. In FIG. 50B the user has elected to make the Calculation formula sharing for both the clone and the original spreadsheet by selecting the 'All' 5068, which means if a formula correction is made anywhere it will replicate to the other views.

Figure 28C:
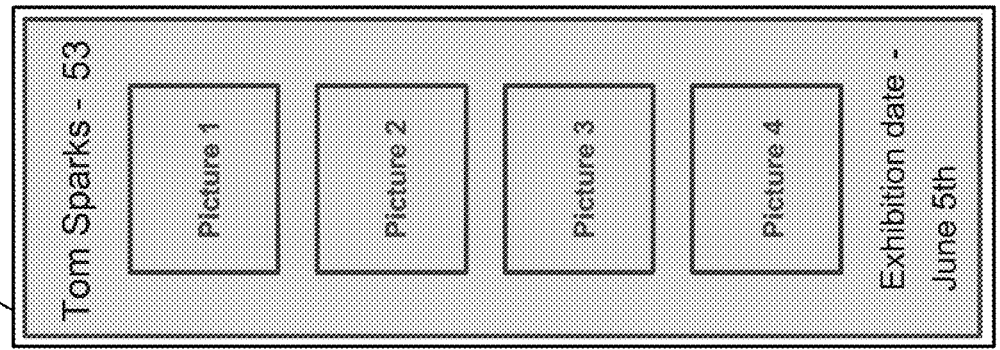
Figure 28A:
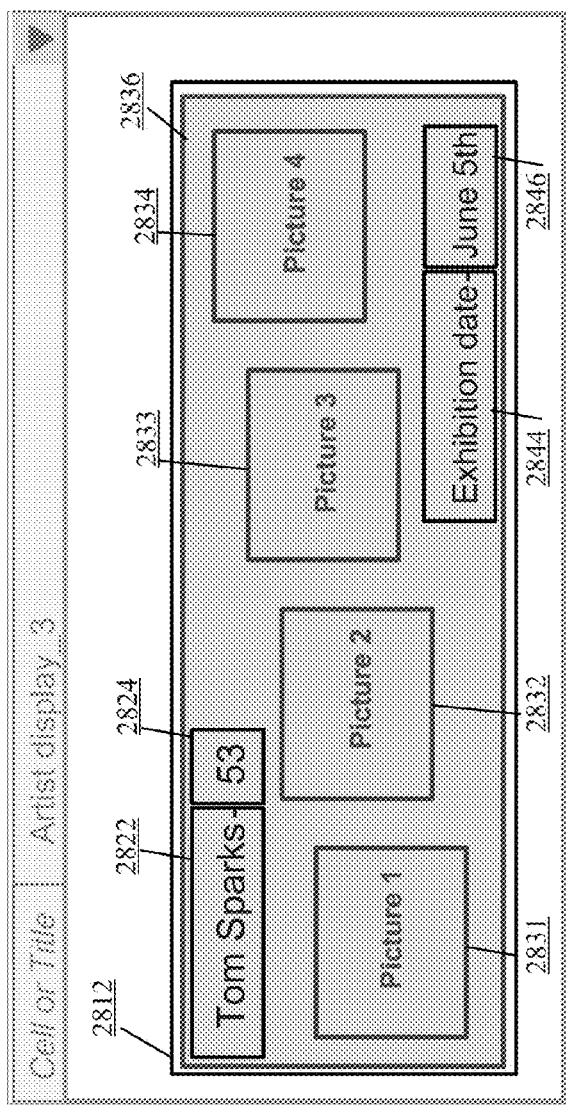
FIG. 28A shows an example of selective multi-way replication synchronization between presentation and spreadsheet views.
Figure 28B:
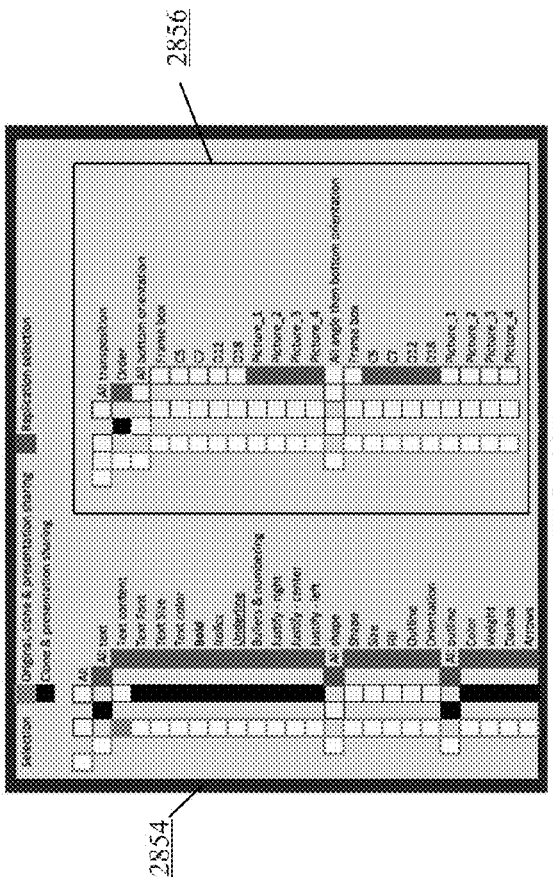
FIG. 28B displays a pop-up control dialog with settings for a titled group of cells/elements and formulaic cells, combined with a shape with a border and fill and four pictures.

FIG. 28A shows an example of selective multi-way replication synchronization between presentation and spreadsheet views, for a titled group of cells/elements 'Artist display 3' 2812 with text cell 2822 and text cell 2846, and formulaic cell 2824 and formulaic cell 2846, combined with a shape with a border and fill 2836, and four pictures 2831, 2832, 2833 and 2834. Artist display 3' 2812 element has selective transposition turned on, as shown in FIG. 28B pop-up control dialog 2854 with settings 2856. FIG. 28C shows the results of transposing 'Artist display 3' 2812 by 90 degrees clockwise. Note that the spreadsheet cells in this example retain their orientation towards the bottom of the page as shown in element 2828. These examples show a few of the many ways that users can incorporate edit synchronization between presentation and spreadsheet views to improve design efficiency when implementing and updating designs.

Rearranging Cells from Spreadsheet Blocks

We disclose a new feature of spreadsheet-to-other document integration—a way to integrate spreadsheet analytics and presentation, dashboard, form, word or other type of document content preparation that makes possible selecting spreadsheet content and moving it around freely to wherever the user wants it. Many documents include analytics from spreadsheets as part of the document. Frequently those analytics are still underway and changing after the other document preparation has begun. The creation, editing and revising of the spreadsheet-sourced content can create a lot of work in the other document. Therefore, many document applications have copy and paste features for embedding of spreadsheets, importing of spreadsheet content, importing of spreadsheet charts, and creating spreadsheet charts and tables. Despite those capabilities there are large limitations to using spreadsheet results for other documents without a great deal of manual work creating the document content and keeping it synchronized as the spreadsheet analytics change. The disclosed feature for rearranging cells from spreadsheet blocks allows users to truly integrate spreadsheet analytics and other document content preparation, to eliminate large amounts of document preparation and editing work.

An important dimension of spreadsheet-to-other document integration is the ability to use the spreadsheet content, including moving it around freely within the presentation, in a disclosed atomized cellular mode. FIG. 29A shows a typical simple spreadsheet 2902 and FIG. 29B shows ways a user might want to display some of the spreadsheet content into a presentation page 2906. In another use case, the user may want to display the spreadsheet content in a Word document, a dashboard, a form or other type of document. This would best be done by having the ability to move each cell of the spreadsheet to the location defined by the user, as shown by moving cell A1 2912 to presentation position 2918A, moving cell A4 2922 to presentation position 2936A, and moving cell B5 2934 to presentation position 2946A. Then the user would like to be able to change the formatting of content in the presentation positions 2918B, 2936B, and 2946B in presentation 2952 shown in FIG. 29C, to whatever they would like without changing the view in spreadsheet 2902. Additionally, the user would like to be able to intermingle the spreadsheet content with shapes, pictures and other content as shown in FIG. 29D presentation 2956, in which spreadsheet content text 'China' 2966 from cell C2 'China' 2924, is positioned atop graphical content—in this case Chinese flag element 2968.

Spreadsheet-to-presentation integration and moving elements around freely within the presentation as described supra requires integrating spreadsheet-like content or capabilities, in what we call an atomized cellular mode, into a presentation page. The beauty of doing this and retaining the integration of the spreadsheet is that if the numbers or labels change in the spreadsheet, the presentation features can be set to automatically update those numbers or labels in the presentation page. This can eliminate lots of revision work and, with simple point-and-click transfer from the spreadsheet view to the presentation page, can also eliminate a lot of chart-building work.

This disclosure describes spreadsheet and other document application capabilities that allow the atomized cellular use of content from spreadsheet applications or spreadsheet content created in another document application. That cellular content can be labelled, in a spreadsheet as A1, A2, B1 and B2, or other format such as naming by document and number or descriptive name, for identification in formulas, reuse, transformation, change replication and other purposes. This atomized cellular use of content will allow users of the presentation application to much more freely use information imported from spreadsheet applications. It will also make the creation and revision of different types of linked documents much easier, so a revision in a Word document could be selectively replicated in a cellular way in a connected spreadsheet, presentation and other type of document.

In an ideal setting, users who integrate spreadsheet data into other document applications would be able to move, change, or hide any cell without losing any cell calculation capabilities and without disrupting the original spreadsheet. While current-day spreadsheet and presentation applications offer multiple ways to copy and paste cells from spreadsheet to presentation, the existing technology does not offer the ability to retain cell capabilities while allowing cell separation (atomization). The next use case illustrates the disclosed features of copying spreadsheet cell content into a presentation page without losing the formulaic content of the cells and moving individual cells or groups of cells, from a spreadsheet, around in pages of a presentation, as desired.

Student Presentation Use Case

A use case of building a student presentation of age distribution of inhabitants among countries of the world is described next, to illustrate the disclosed features of copying spreadsheet cell content into a presentation page without losing the formulaic content of the cells, and being able to move individual cells or groups of cells from a spreadsheet around in pages of a presentation, as desired.

Users often continue to refine spreadsheet analytics in parallel with the task of pulling together the presentation of those analytics. In the process, the spreadsheet answers are changing while the presentation of that information is also changing. Additionally, users frequently find spreadsheet mistakes or changes and they would like to be able to automatically change the spreadsheet, while developing the presentation. To minimize work in the process, it would be great to have the spreadsheet and the presentation linked together so changes flow either way and yet are not limited to keeping the spreadsheet in a table block embedded in the presentation. In our invention, we will now describe examples of changes that are easily made in the spreadsheet calculations and the presentation pages can automatically flow both ways, as desired even when the spreadsheet-derived cells in the presentation have been separated and dispersed throughout a page or a number of pages. This same capability would then apply to spreadsheet cells dispersed in other forms of documents such as Word documents, user dashboards, user forms, data analytics and visualization tools and other forms of documents.

FIG. 30A shows an example spreadsheet 3002 in which a student has developed an analysis of world population ages. The spreadsheet is a combination of numeric and formulaic cells which may still have been undergoing changes as the presentation of that data was being created. The user in this case wanted to create a presentation page that includes information in spreadsheet 3002, so they moved around and reformatted spreadsheet content 3002 in different ways for presentation purposes.

FIG. 30B shows the somewhat typical high-school-level presentation page 3008 that the user has constructed, including map artwork 3018 and 3068, boxing of content 3066, labelling 3017, and boxing with shading 3028 and 3037. Column headings 3012 of spreadsheet 3002 are repositioned onto presentation page 3008, broken into individual cells 3014. In this example, individual cells 3014 are used again and individually positioned in age group column 3064 as well, and these cells are connected and retain any formulas, text or numeric values. Numbers and formulas 3011 are separated and repositioned in world column 3015 on presentation page 3008. The process is replicated, with additional rows of numbers and formulas separated and repositioned in columns: 3010 to 3065, 3072 to 3016 and 3076, 3073 to 3007, and 3074 to 3078. Cell 3032 is replicated at 3024 on presentation page 3008, cell 3042 at 3046, and 3052 replicated to both 3026 and 3036. Spreadsheet derived cells intermingle with presentation elements, as shown by the spreadsheet cells that make up difference columns 3007 and 3078, which rest atop the two boxes with grey shading 3028 and 3037.

The disclosed technology makes it very easy to import spreadsheet cells into a presentation page and allow repositioning, reformatting, reuse, hiding, and the addition of typical presentation text, shapes, graphics, pictures, and other content without the spreadsheet derived cells losing their data and formulas, to the extent preferred by the user.

A common situation, in which an error is found in data or a formula for a cell or group of cells of a spreadsheet, is depicted in FIG. 30C in which world numbers for 2015, ref 3082, are corrected numbers that replace the numbers in the same group of cells—world numbers for 2015, ref 3011 shown in FIG. 30A. The disclosed technology automatically changes the affected world numbers 3085 and difference calculations 3086, as shown on the snippet of presentation page 3088 shown in FIG. 30D.

Similarly, the disclosed technology makes it possible to deliver the transition shown from FIG. 29A, from spreadsheet 2902 to finished presentation 2956 depicted in FIG. 29D described supra. Changes made in the spreadsheet can automatically replicate, as desired, to the presentation page. Within the spreadsheet integrated into the disclosed presentation application, a user can use the disclosed selective multi-way replication of the spreadsheet view. That is, for the example shown in FIG. 29A, the user can set the spreadsheet view to accept all text content, value content and formula changes but not replicate text, value and formula size, color, font, bolding, italics, underlining and other changes. Those specified selections will then allow all the changes in presentation 2956 to be made to the presentation view without changing spreadsheet 2902. Yet, if the user finds a problem with a value or some text, as they do the presentation work, changes the user makes in the presentation view will replicate back to the spreadsheet view.

The power of being able to separate spreadsheet output for presentation purposes is explored further in the next use case, which includes waterfall charts.

Waterfall Chart Use Case

Figure 31B:
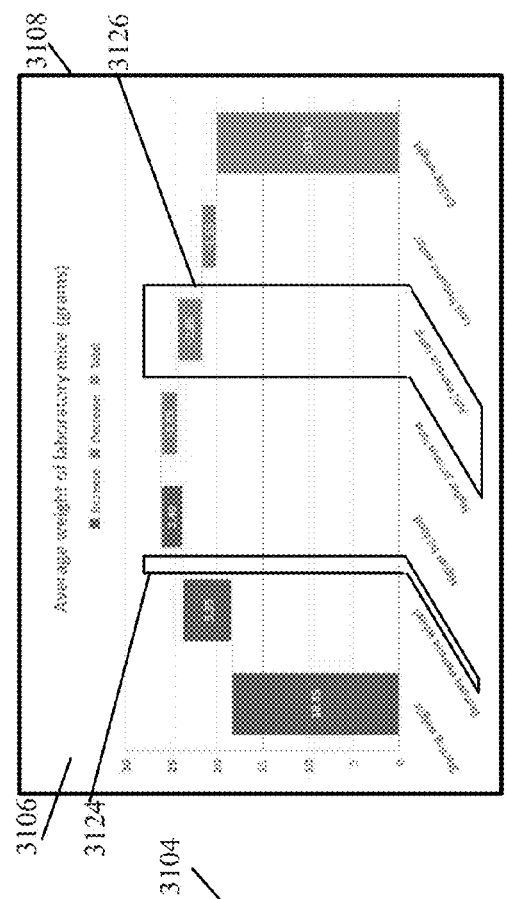
FIG. 31A through FIG. 31D display an example of the disclosed technology used to separate for repositioning elements of spreadsheet or presentation charts to reduce work and allow better auto replication of changes.
Figure 31D:
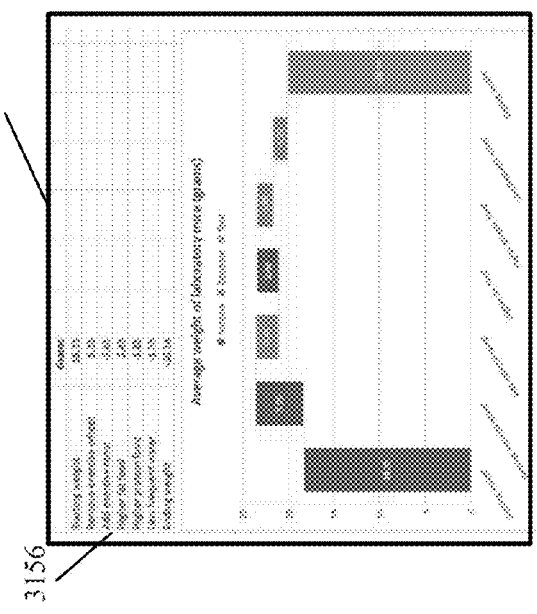
Figure 31A:
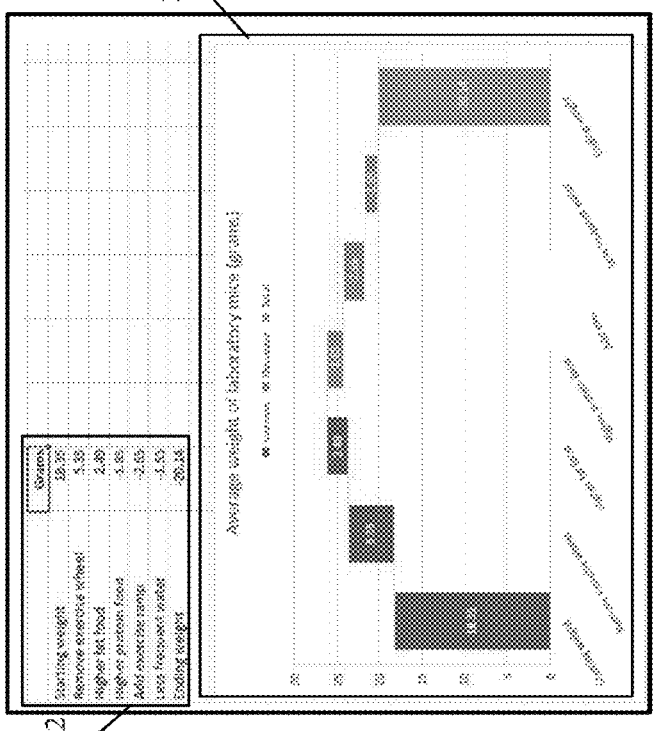
Figure 31C:
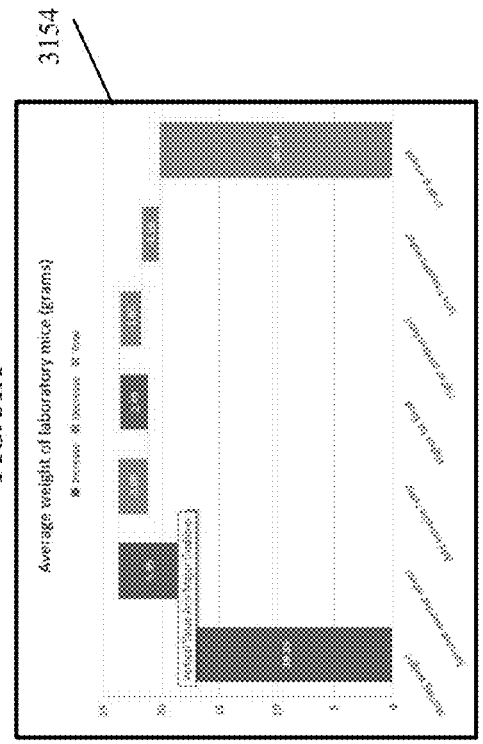

Construction of meaningful waterfall charts, by rearranging presentation of spreadsheet data without having to rearrange the source spreadsheet, illustrates the power of being able to separate output for presentation purposes within spreadsheets or using those charts in other documents. FIG. 31A shows waterfall chart 3104, generated from a summary result set of spreadsheet cells 3102 that show the average weight of mice in a school laboratory experiment. Using the disclosed technology, the user can reposition an element they want to change and the chart will change without impacting the spreadsheet. FIG. 31B shows waterfall chart 3106 on presentation page 3108 from a summary result set of spreadsheet cells 3102 that show the average weight of mice in a school laboratory experiment, with element 3126 selected to move to desired position 3124. The result of this change to presentation page 3108 is shown in in FIG. 31C waterfall chart 3154. By contrast, prior to availability of the features of the disclosed technology, if a user wanted to move one or more of the elements of an existing waterfall either in the spreadsheet, or on a presentation page, they needed to open and rearrange the spreadsheet 3158, as shown in prior art example FIG. 31D, so that the order of rows 3156 matched the order wanted in the waterfall and this action would have changed the original spreadsheet and thereby altered other usages of the spreadsheet information. In summary, using the disclosed feature of separable chart elements, a user can simply reposition an element they want to change in a document and the chart will change without impacting the spreadsheet, thus making it easier for a user to make a change and not disrupt the layout of the spreadsheet view supporting it—as well as avoiding disrupting any other chart driven from that spreadsheet.

Figure 32A:
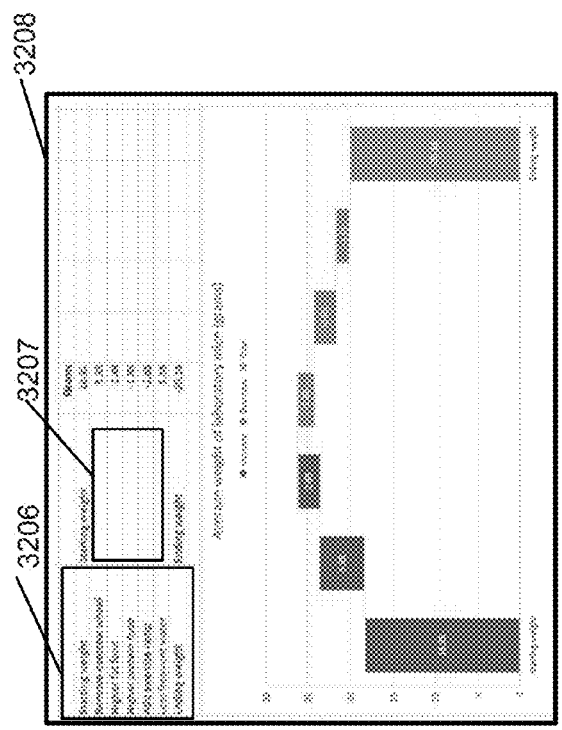
FIG. 32A through FIG. 32D illustrate another benefit of our atomized cellular mode of making chart elements separable.
Figure 32B:
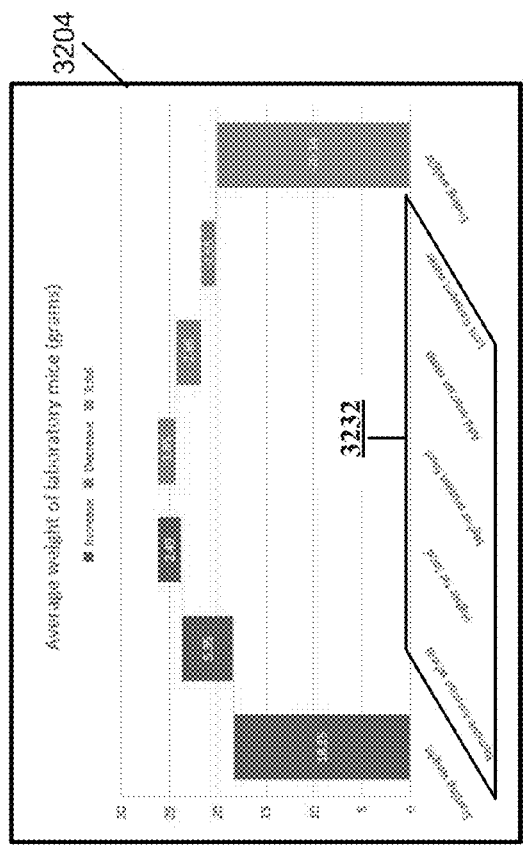
Figure 32C:
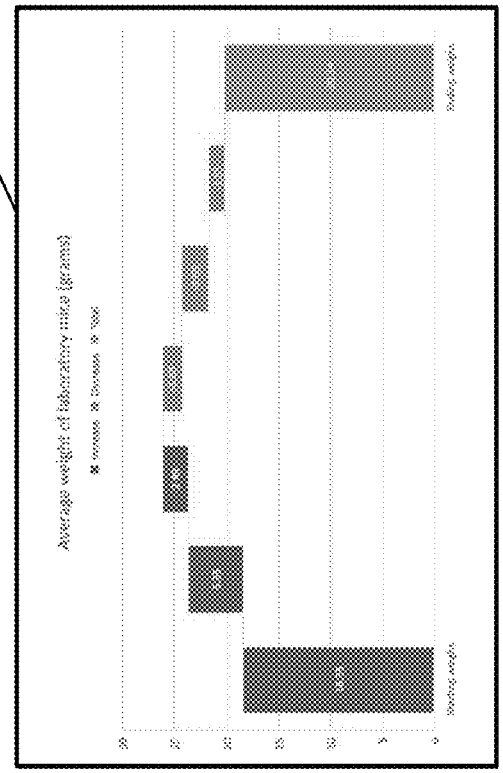
Figure 32D:
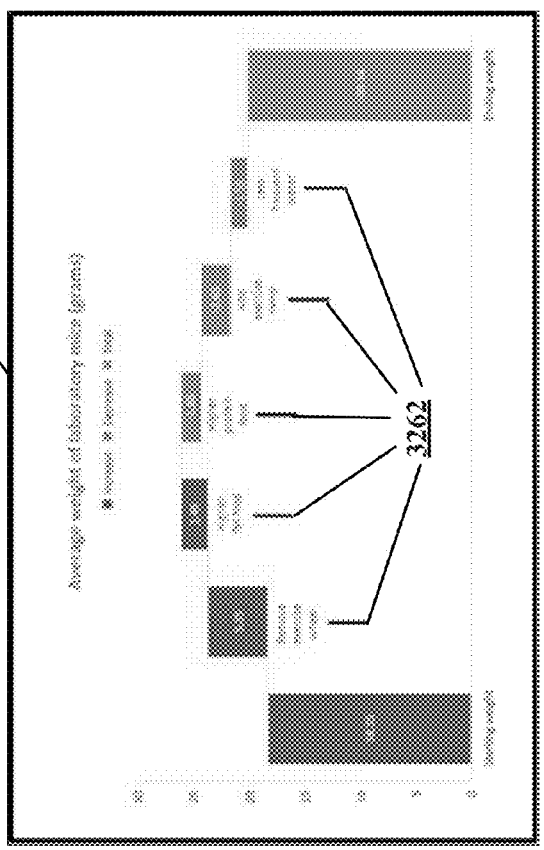

Continuing with the waterfall use case described relative to FIG. 31A-D, FIG. 32A-FIG. 32D illustrate another dimension in which making chart elements separable makes it much easier for the user to achieve their desired outcome. In this case, the user starts with spreadsheet chart 3204 and wants to move waterfall element labels 3232 so they are close to their waterfall elements as shown in presentation 3254 with the labels 3262 positioned as shown in FIG. 32C. The disclosed technology allows simple point and click movement for a simple repositioning of the labels. In contrast, prior art document applications cannot separate those graphical elements and allow movement to the location of choice—in this case just below the respective waterfall element without disruption of the underlying spreadsheet. The tedious steps are described: without the disclosed separable element feature, a user needs to open example spreadsheet 3208, as shown in FIG. 32B, insert a new column 3206, copy and paste the labels that are going to change into new column 3207, erase the labels in the previous column, to cause the labels that need to move to disappear, and manually create and position each of those labels 3262 onto the chart 3258 shown in FIG. 32D. In addition to being a lot of work and needing to change the underlying spreadsheet, if any of those spreadsheet labels change 3232, the changes will not auto replicate but will require the user to make those changes themselves. Separable chart elements require much less work than required when using prior art presentation applications, and include the advantages of leaving the existing spreadsheet untouched and auto replication intact. A pie chart use case shows another advantage of being able to separate cells.

Pie Chart Use Case

Figure 33:
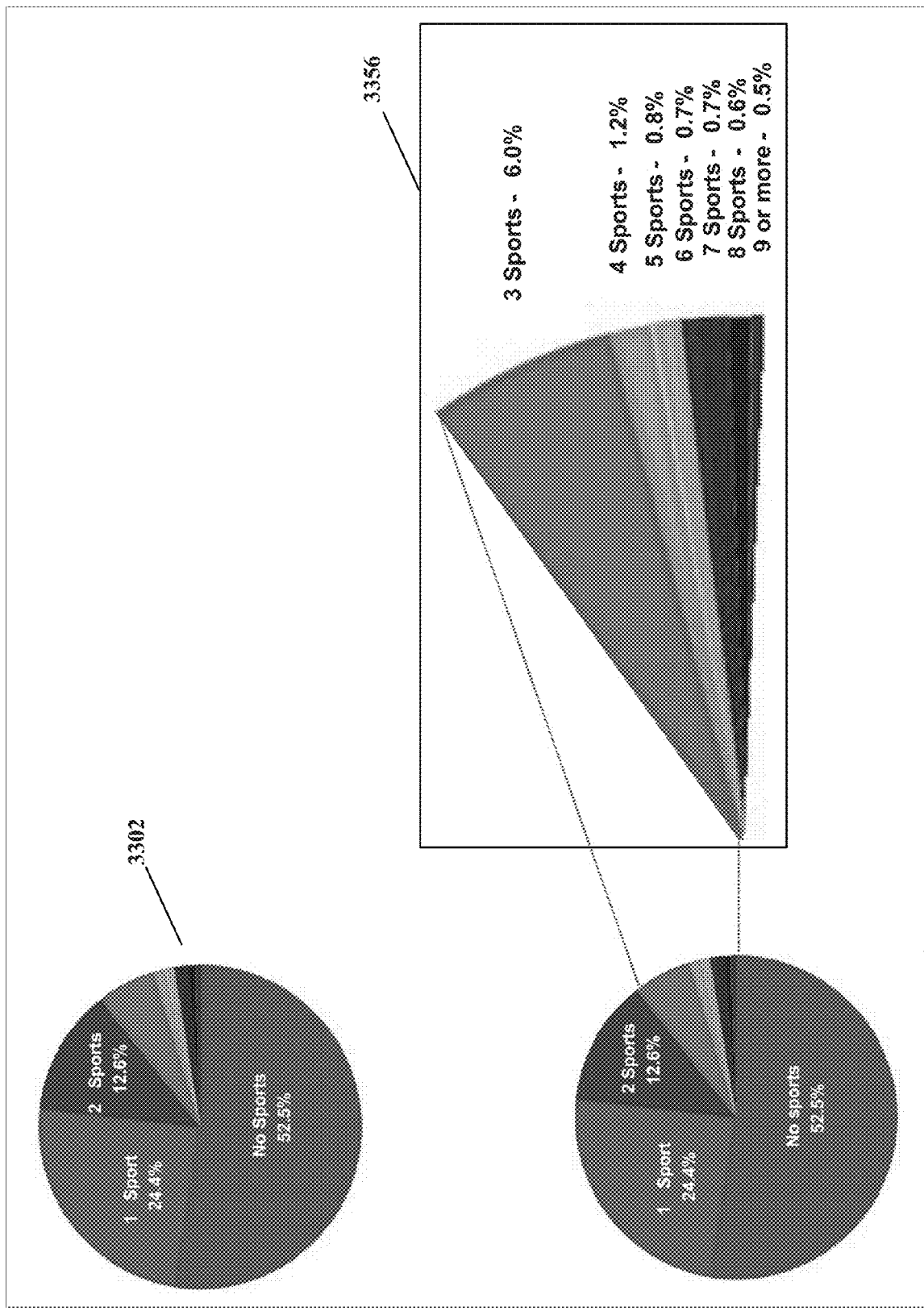
FIG. 33 displays an example pie chart and capabilities achieved using our atomized cellular mode of separation.

The pie chart example shown in FIG. 33 shows the advantage of being able to separate and reuse one or more cells of a spreadsheet or presentation app chart. Simple pie chart 3302 shows high school junior varsity and varsity sports participation by number of sports, over their high school years. Because values zero, one and two dominate the chart, the labels for the remaining athletes are unreadable and therefore have been removed. When the user wants to view participation in more than four sports more closely, they would like to separate the data and make that part of the graph larger, and turn on and reposition the labels. With prior art presentation applications there is no easy way to do what is shown in amplified area 3356 of FIG. 33. Utilizing the disclosed technology, the user can simply copy pie slices four through ten, increase their size as shown in amplified area 3356, turn on the labels and reposition them. The ability to replicate pieces of charts while retaining their formulaic and other properties opens a huge number of options for easily creating presentations and automatically having them alter themselves as changing analytics refine numbers or labeling underlying those charts.

Play Development Use Case

Some presentations of spreadsheet data look nothing like the underlying spreadsheets, as is the case for the example play development time use case described next. A user may want to create a spreadsheet-like cell structure in a presentation page and not be constrained by the tabular constraints of existing presentation formulaic cells. An example page may look similar to example presentation page 3405 in FIG. 34, a college theatrical play development time estimation page for presentation to a group deciding between alternative scripts which play to produce from a list of candidates.

Presentation page 3405 shows the time needed to develop a theatrical play, using three different development approaches. The times in this example are a function of three play requirement types 3402, specified as 'Mild edit' 3414 for 'Script' 3412, 'Fast' 3424 for 'Casting' 3422 and 'Full production' 3434 for 'Set' 3432. These specifications 3414, 3424 and 3434 feed formulaic models in the thirty cells created on the page to hold numeric values 34xx.

The user can create a page in many different ways, using the disclosed selective multi-way replication and selective transposition technology. One way of creating a page utilizes a blended approach with titled presentation elements, spreadsheet cells and titled groups of elements/cells. Each of these three approaches employs selective multi-way replication and may have some form of name that allows reuse. The fourth element available is regular unnamed presentation content that prior art presentation applications utilize, and which can be used with the disclosed technology but cannot be used with selective multi-way replication and selective transposition. The following description for building a document page utilizes the three named element types and describes ways that the process can be improved by use of the disclosed selective capabilities.

A user decides what design elements will be most readily developed via which element: presentation elements, spreadsheet cells or titled group of elements/cells. Example presentation page 3405 shown in FIG. 34 includes titled presentation elements: 'play requirement types' box 3402, icons 3442, 3452, 3462, 3472, and additional image and presentation element box instances, in various sizes. Spreadsheet cell examples include the following: 'Play development time' 3404, 'Mild edit' 3414, 'Script' 3412, 'Fast' 3424, 'Casting' 3422, 'Full production' 3434, 'Set' 3432, 'Total' and 'Elapsed' in each of the presentation element boxes, 'serial development' 3416, 'parallel set production' 3417 'parallel development' 3418, script development 3444, 'Set production' 3454, 'Rehearsal' 3464, and the thirty cells that hold numeric values 34xx. An example titled group of elements/cells is play development arrow 3474. These elements/cells will then be available to any page in the document, making it easy for users to reuse already-created elements on any page.

Figure 35B:
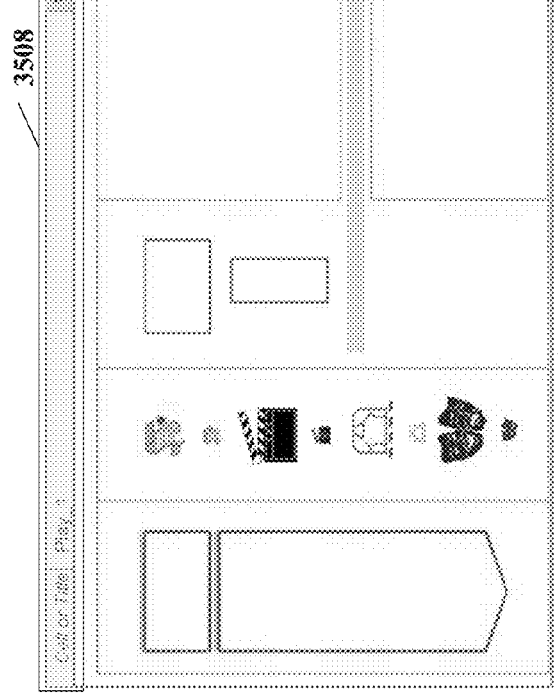
FIG. 35A through FIG. 35D display an example setup for automatically creating a presentation page that has multiple modes of selective multi-way replicating elements and uses atomized spreadsheet cells.
Figure 35D:
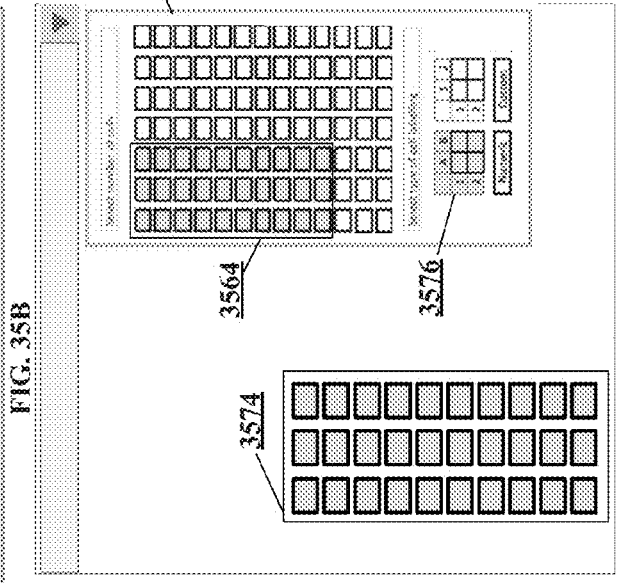
Figure 35A:
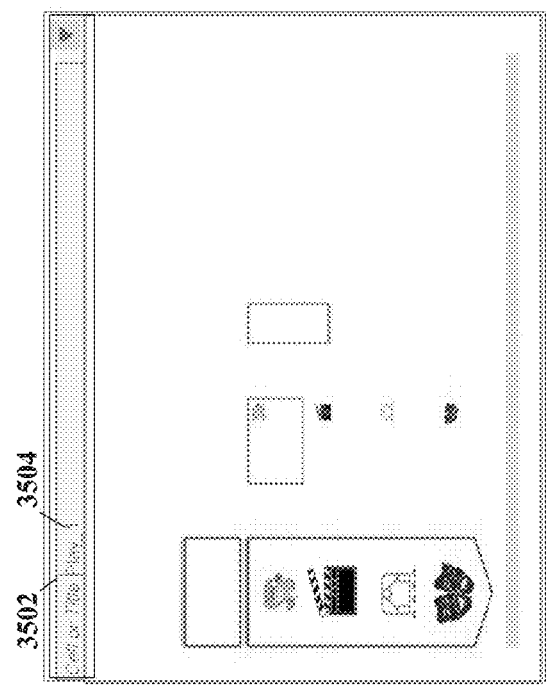

FIG. 35A shows example titled presentation elements created by the user, with a title of 'Play' 3502 and auto numbering so that the first item is '_1' 3504. After each of those elements is constructed, they will be available in titled presentation element view 3508, shown in FIG. 35B, and can easily be used as library elements for reuse. The titled presentation element view can be arranged in many different ways, including the order of number, like items and page usage. In this example, the elements are ordered by element number.

Figure 34:
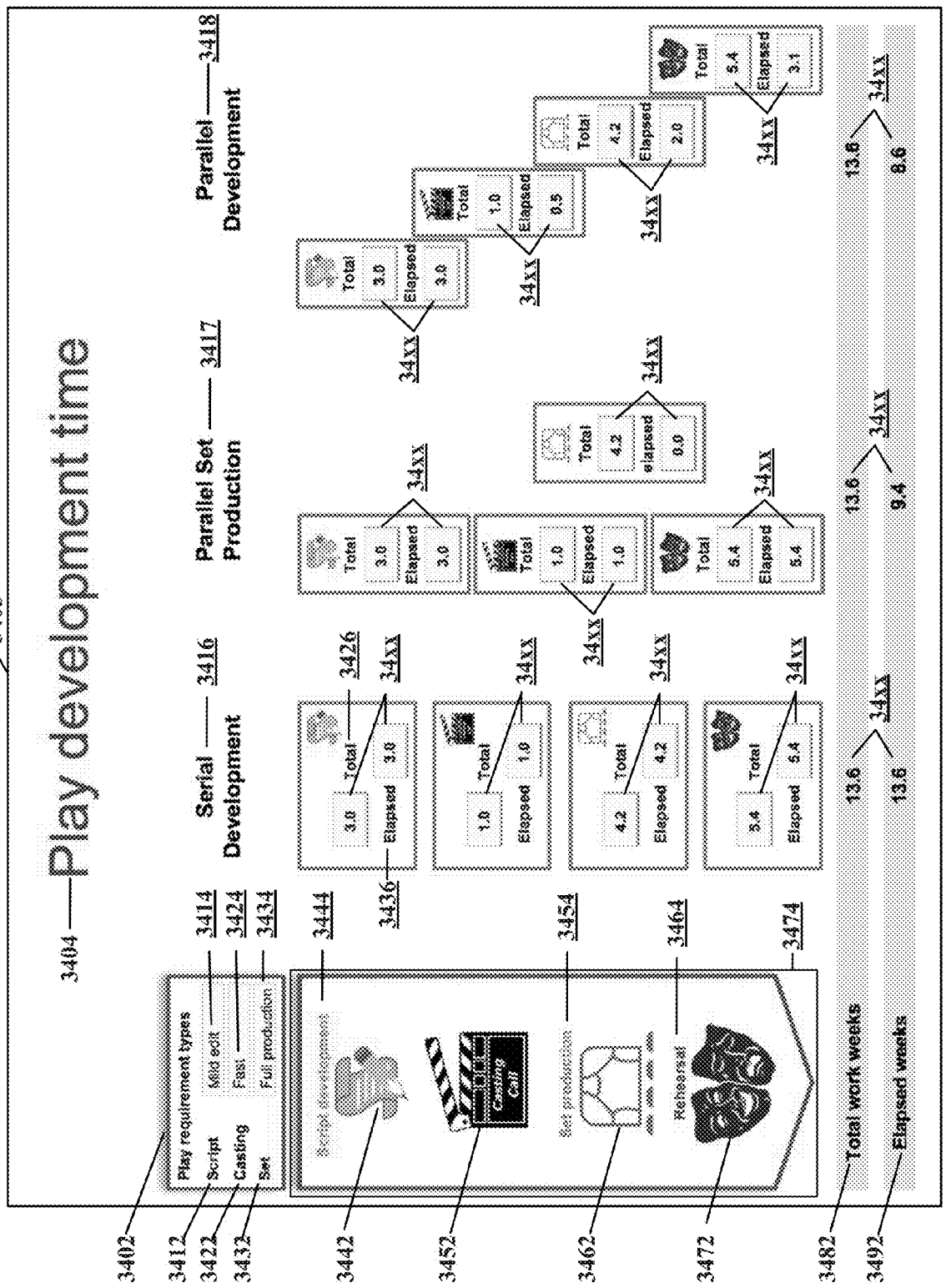
FIG. 34 illustrates an example application of automatically coordinating updates to multiple pages in a presentation: a play development time estimation presentation page usable for analyzing the work involved in alternative scripts.
Figure 35C:
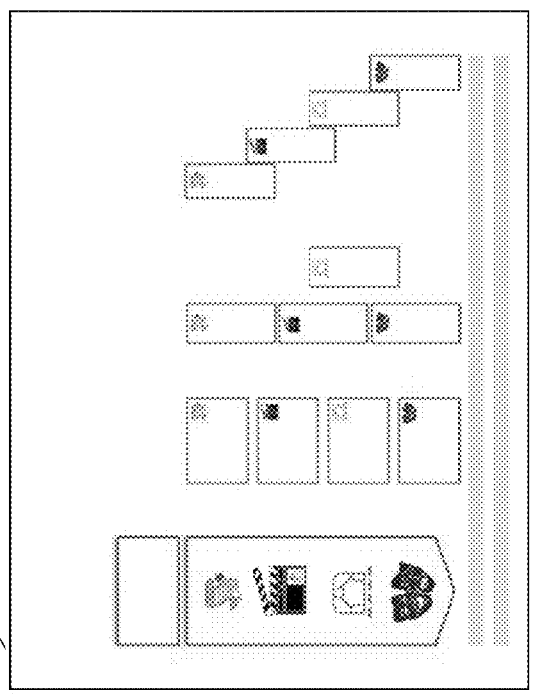

Continuing the play development use case, the user copies and pastes available presentation elements 3552 in FIG. 35C, as needed, to continue development of presentation page 3405 shown in FIG. 34. The user then turns their attention to creating the parts of the page most readily done as a spreadsheet: the thirty cells they envisioned to hold numeric values 34xx. If the page were empty, the user could opt to build a spreadsheet on the page by depositing the desired number of cells. For example, in the partial page shown in FIG. 35D, the user has elected to add thirty spreadsheet cells using pop-up 3566. In the pop-up, the user highlighted the thirty cells 3564 and selected the type of cell labelling, in this case alpha-numeric labelling 3576. Then the user deposited the highlighted cells on the page 3574 and users can fill in the content of the deposited cells, including any formulas they desire.

Figure 36:
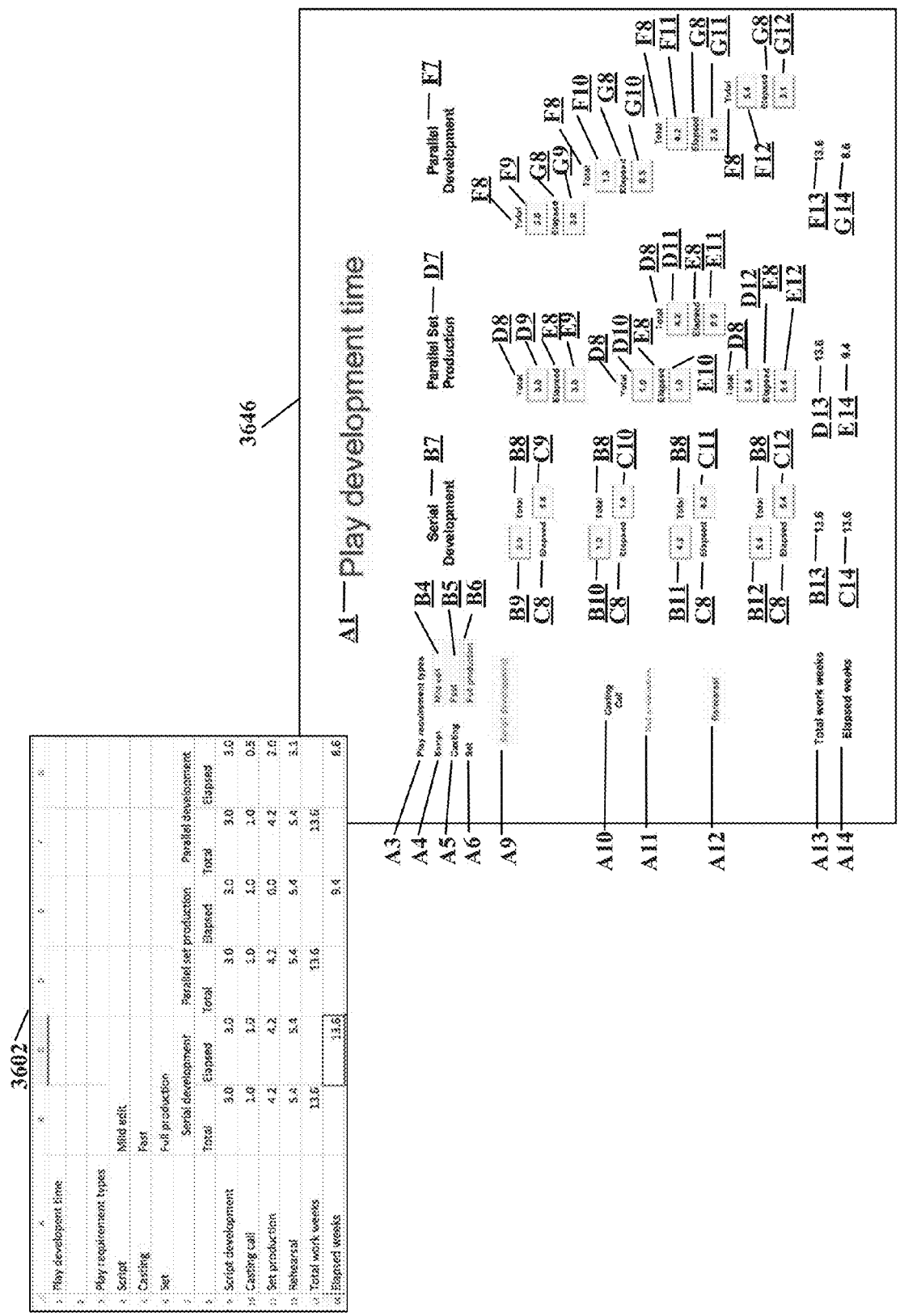
FIG. 36 shows a combination of a spreadsheet worksheet view and a presentation page that utilizes selective multi-way replicated elements.

Because users are often more comfortable doing spreadsheet-like work in a spreadsheet, they may prefer to open a new spreadsheet worksheet view and construct the content in a sheet, as shown in FIG. 36, instead of in a presentation page, as described supra. The user can move cells from spreadsheet view 3602 to a document presentation page 3646 as shown by cells identified by their row and column coordinates in spreadsheet view 3602. In this example, some cells are used more than once as the user continues to work toward creating the example presentation page 3405 in FIG. 34. For example, the cells B8, D8, F8 containing the word 'Total' and the cells containing the word 'Elapsed' C8, E8, G8 are each being utilized four times in presentation page 3646. The user can also make the formatting changes they like such as increasing the font, changing the color, adding center justification for the cell containing 'Play development time' 3404, and adding boxing to cells such as 'Mild edit' 3414, 'Fast' 3424, 'Full production' 3434, and to many of the cells created on the page to hold numeric values 34xx.

Figure 37:
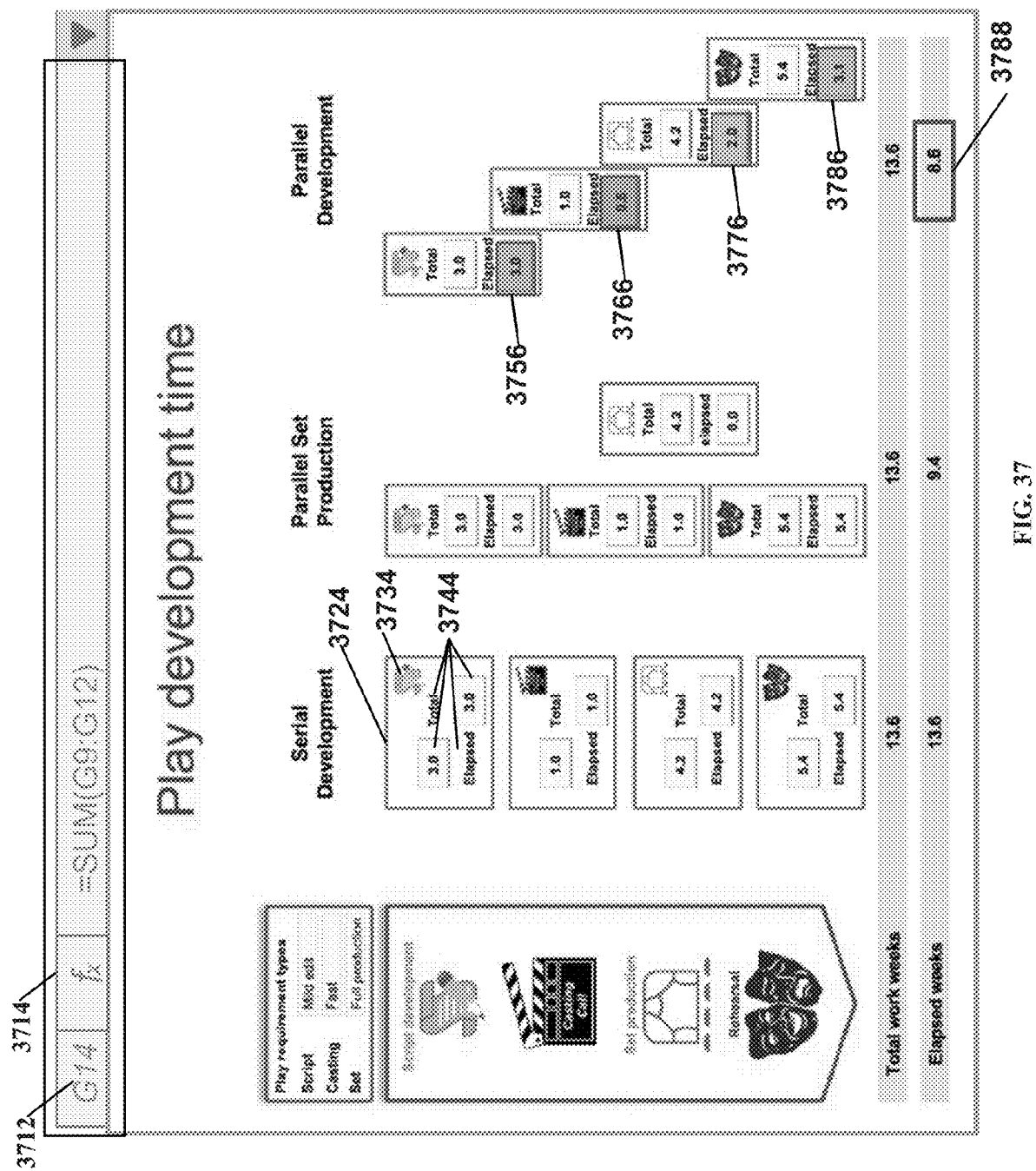
FIG. 37 displays an example presentation page that retains the formulaic and other capabilities of the selective multi-way replicated atomized spreadsheet cells.

The actions that were taken on presentation page 3646 in FIG. 36 could instead have been done in a presentation page that already contains all the presentation elements as shown in FIG. 35C, to create presentation view 3402 in FIG. 34. The result would retain the formulaic and other capabilities of the spreadsheet as shown in FIG. 37 for cell 3788. When the user clicks on cell 3788, the application highlights cells 3756, 3766, 3776 and 3786 (corresponding to spreadsheet cells G9, G10, G11 and G12 in FIG. 36), displays the formula 3714, and displays the cell number (G14) 3712 that was clicked on by a user of the presentation.

Another advantage of the disclosed technology is that cells can sit within other cells or elements as needed to create content. A simple example of this is shown with spreadsheet cells 3744 sitting within the box 3724, which also has an icon 3734 sitting within it. Cells and elements of all types can be layered on top of each other and still retain their properties, using the disclosed technology.

Further continuing the play development use case, with the third set of elements/cells, the user creates a titled group of elements/cells. A user would typically make a titled group of cells/elements of something that will be used elsewhere in the document. The titled group of cells/elements is made by grouping the desired cells and elements and giving them a name, in this example 'Play Development Arrow'. Play development arrow 3474 in FIG. 34 includes multiple icons 3442, 3452, 3462 and 3472 as presentation elements and multiple spreadsheet view cells 3444, 3454 and 3464. After being grouped and titled, the titled group cell/element will be visible in the titled group cell/element views, such as the presentation elements view in FIG. 35B. Having an easy-to-use view showing all the titled group cells/elements makes it easy for users to reuse the grouped elements, thereby reducing work.

As described supra, a user can utilize the disclosed features in many different ways to create a document. They can decide to use some regular presentation text, shapes or pictures elements blended with the disclosed presentation elements, spreadsheet cells and titled group cells/elements. Another user could opt to use some or all of the element/cell capabilities in the presentation view and not use the other views. They would put cellular spreadsheet cells onto the presentation view through one-by-one creation with a label and automatic numbering or depositing the desired number of cells on the page using the pop-up, or some similar mechanism, as shown in FIG. 35D.

At a different end of the usage spectrum, a user could also opt to put every element into a spreadsheet cell for the presentation page shown in FIG. 34, resulting in spreadsheet view 3802 in FIG. 38, if the user opted to literally put one cell per each element of the presentation page. Then the user could transfer each cell and element to the presentation view page and make any color, font, sizing or other modifications to create presentation page 3405 shown in FIG. 34. While some users may like this approach, many will focus the spreadsheet view of the application on the analytics and complete the more graphic elements using the disclosed titled elements, titled groups of elements/cells or regular presentation elements.

This technology offers users many different ways to use the disclosed titled elements and cellular cells to eliminate work and more quickly build better presentations, since all users and all presentations are not the same. The addition of the disclosed selective capabilities to the disclosed cellular spreadsheet cell capabilities creates possibilities for removing substantial quantities of additional document building and editing work.

Search Features for Special Objects

Given the build, reuse and change capabilities of the technology disclosed, easily finding and accessing replicated elements and cells is useful. Five different views of the content, the spreadsheet view, the other document view, the titled element view, the titled group element/cell view and the different library views are described supra. Each ideally allows users to quickly find and build what they want and easily put them on the document pages of their choice. To facilitate these four views, multiple search modes are helpful, starting with the typical presentation page search for text, expanded to include formulas and the ability to highlight shapes, pictures, icons, titled elements, cells, titled group elements/cells or other content and step through the document and views to see the other places it is used or stored.

FIG. 39A shows a titled presentation element 3922 'Play 1' that has been clicked on for search, triggering the ability to step through the document to view all the places the search element is in use, using the move arrow 3914 in search pop-up 3912. FIG. 39B shows for the same titled element 3922, employing a search that shows the user all the pages in 3922 where the element is used, letting the user click on any page number 3926 they would then like to visit. These capabilities can also be expanded beyond the current document to other documents that the user has, or even to documents they are given access to in a shared environment such as on a company's servers or in the cloud.

This search capability can be taken further for the content and titles for cells, titled presentation elements or titled groups of elements/cells. FIG. 39C shows the results for a scenario in which the user has elected to search for titled presentation elements or titled groups of elements/cells, working in search pop-up 3962 with the element 'Play development time arrow 270' selected 3964, to view the arrow titled element 3922 in the pop-up display. This ability to hunt previously created elements is a huge way to potentially reduce work and will likely motivate users to create libraries of elements for reuse.

That search capability could also be expanded to find connected data as shown in FIG. 39D: the user is hunting data for a formula in their presentation page 3932. Adding the ability to search for data across pages within the presentation, other presentations/spreadsheets or other data sources is another way to reduce work. One way of doing that would be to open a data library pop-up 3966 that lists the data available to the user. The user could then access that data in many ways to find what they are searching for. In the example shown in FIG. 39D, the user utilized data library pop-up 3966 search capability 3968 to find candidate tables, worksheets and presentations that contain data relevant to the search. In this example, the user has expanded dropdown control 'Step production' 3974 and selected one data set 'Full production' 3976 to examine. That data set 3969 opens and, in this example, the user has selected the value of '4.2' 3944 as shown in FIG. 39B. The user could instead have used the data as part of a calculation.

Figure 51A:
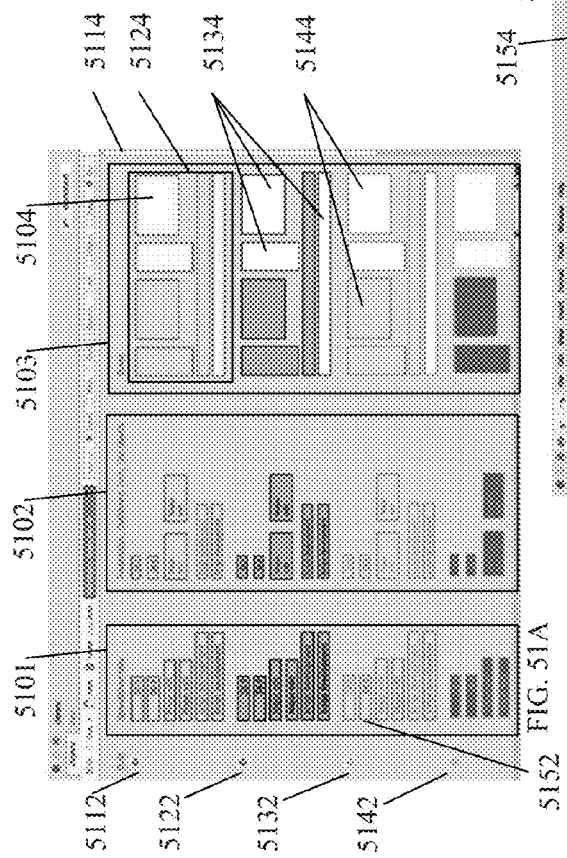
FIG. 51A through FIG. 51C show multiple document selective multi-way replication elements and examples of their usage.
Figure 51B:
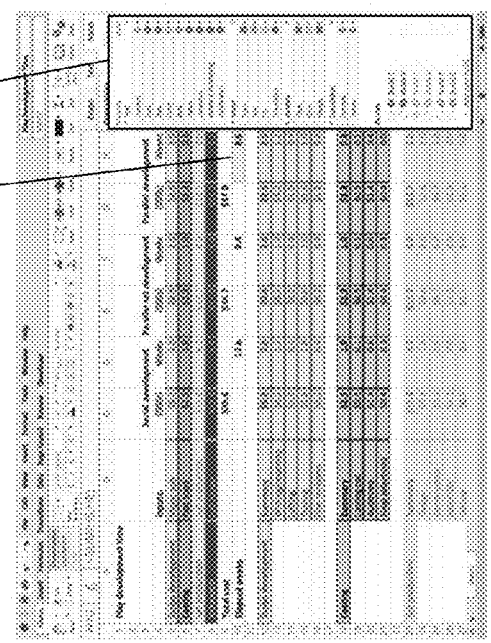
Figure 51C:
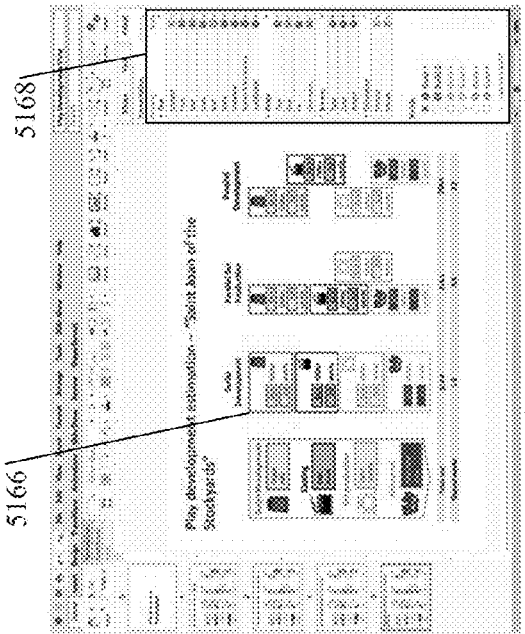

Elements with multiple documents and multiple connected types of instances and capabilities can be created and stored for reuse in the element library. The library can be set up to better show the user the different group configurations of the same element and linked other instances. FIG. 51A shows three different connected selective multi-way replication elements 5101, 5102 and 5103 with an example of each of their group property differences for each of the builds. In this example, four of the six total builds are visible with the other two builds visible by scrolling down using scrollbar 5114. The box element 5124 has a total of six different group variants within each build. Three different size variants 5134 and two different box fill variants 5144. The Build 3 5132 bolded smaller size variant of the spreadsheet cell 5152 of FIG. 51A is shown in FIG. 51B as cell 5154, with its build properties 5156 shown. Similarly, the library box 5104 is shown used in FIG. 51C as box 5166 with its build properties shown in 5168. This enablement of the library makes it very easy for users to quickly see all the different selective multi-way replication variants built into each of the three related elements. The user can quickly use those elements in their documents and, in this example, create a spreadsheet connected presentation, dashboard, form or Word document. The ability to access prebuild multi-way selective replicating elements and use them in individual or connected documents can dramatically reduce work, particularly if the document or documents are still changing, likely to go through multiple editing rounds, need some amount of formatting, or need connection with other documents.

Switching Between Spreadsheet and Presentation Views

The disclosed embodiments described supra cover the creation of different views, including spreadsheets, other documents, titled groups, libraries and other elements/cells, and describes ways to easily transfer elements and cells between those views to create spreadsheets and other document pages, worksheets, charts and other presentations. A user can turn on spreadsheet view 4006 while working on presentation page 4022 in FIG. 40A. In this example, the user sees the spreadsheet in a movable pop-up 4006 within the work area 4002 of the presentation view. In this case, the user has then copied cell A10 4026 and placed the cell copy 4034 on presentation page 4032. The user can then move as many cells as they like to the presentation page and add typical presentation content of text, shapes, pictures, titled presentation elements, titled group elements/cells and other content to create a page such as page 3405 in FIG. 34.

FIG. 40B shows other options for displaying the presentation and the spreadsheets views such as split screens 4042 within the app showing both the spreadsheet 4044 and presentation 4054 views. FIG. 40C shows the display of option of overlapping tiles 4046 allowing easy clicking forward and back between the spreadsheet 4048 and the presentation 4056 views. These are examples of the disclosed technology's features for making it easy for users to move from view to view, as the disclosed technology allows users to move content from many different views to a presentation, word, spreadsheet, dashboard, form, data visualization or other document view while retaining and replicating the properties of the content desired.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

Computer System

Figure 41:
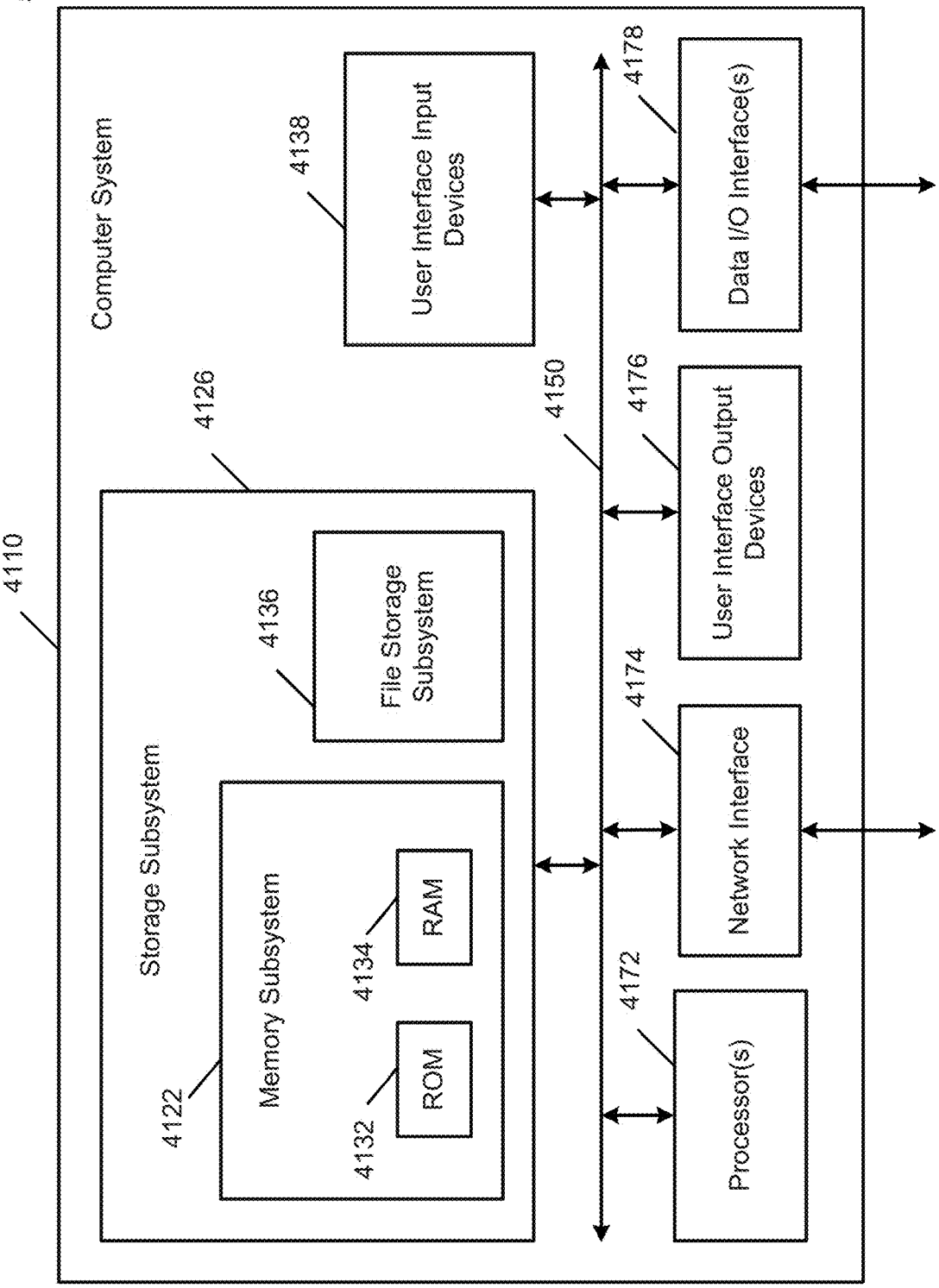
FIG. 41 shows a system environment for implementing a hardware system used for automatically coordinating updates to multiple pages in a presentation.

FIG. 41 is a simplified block diagram of an embodiment of a system 4100 that can be used for automatically coordinating updates to multiple pages in a presentation. Automatically coordinating updates to multiple pages in a presentation can be implemented using a computer program stored in system memory, or stored on other memory and distributed separately from the computer system.

Computer system 4110 typically includes a processor subsystem 4172 which communicates with a number of peripheral devices via bus subsystem 4150. These peripheral devices may include a storage subsystem 4126, comprising a memory subsystem 4122 and a file storage subsystem 4136, user interface input devices 4138, user interface output devices 4178, and a network interface subsystem 4176. The input and output devices allow user interaction with computer system 4110 and network and channel emulators. Network interface subsystem 4174 provides an interface to outside networks and devices of the system 4100. The computer system further includes communication network 4184 that can be used to communicate with user equipment (UE) units; for example, as a device under test.

The physical hardware component of network interfaces are sometimes referred to as network interface cards (NICs), although they need not be in the form of cards: for instance they could be in the form of integrated circuits (ICs) and connectors fitted directly onto a motherboard, or in the form of microcells fabricated on a single integrated circuit chip with other components of the computer system.

User interface input devices 4138 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 4110.

User interface output devices 4178 may include a display subsystem, a printer, a fax machine, or non-visual displays such as audio output devices. The display subsystem may include a cathode ray tube (CRT), a flat panel device such as a liquid crystal display (LCD) or LED device, a projection device, or some other mechanism for creating a visible image. The display subsystem may also provide non-visual display such as via audio output devices. In general, use of the term "output device" is intended to include all possible types of devices and ways to output information from computer system 4110 to the user or to another machine or computer system. The computer system further can include user interface output devices 4178 for communication with user equipment.

Storage subsystem 4126 stores the basic programming and data constructs that provide the functionality of certain embodiments of the present invention. For example, the various modules implementing the functionality of certain embodiments of the invention may be stored in a storage subsystem 4126. These software modules are generally executed by processor subsystem 4172.

Storage subsystem 4126 typically includes a number of memories including a main random access memory (RAM) 4134 for storage of instructions and data during program execution and a read only memory (ROM) 4132 in which fixed instructions are stored. File storage subsystem 4136 provides persistent storage for program and data files, and may include a hard disk drive, a CD ROM drive, an optical drive, or removable media cartridges. The databases and modules implementing the functionality of certain embodiments of the invention may have been provided on a computer readable medium such as one or more CD-ROMs, and may be stored by file storage subsystem 4136. The host memory storage subsystem 4126 contains, among other things, computer instructions which, when executed by the processor subsystem 4172, cause the computer system to operate or perform functions as described herein. As used herein, processes and software that are said to run in or on "the host" or "the computer", execute on the processor subsystem 4172 in response to computer instructions and data in the host memory storage subsystem 4126 including any other local or remote storage for such instructions and data.

Bus subsystem 4150 provides a mechanism for letting the various components and subsystems of computer system 4110 communicate with each other as intended. Although bus subsystem 4150 is shown schematically as a single bus, alternative embodiments of the bus subsystem may use multiple busses.

Computer system 4110 itself can be of varying types including a personal computer, a portable computer, a workstation, a computer terminal, a network computer, a television, a mainframe, or any other data processing system or user device. Due to the ever changing nature of computers and networks, the description of computer system 4110 depicted in FIG. 41 is intended only as a specific example for purposes of illustrating embodiments of the present invention. Many other configurations of computer system 4110 are possible having more or less components than the computer system depicted in FIG. 41.

Particular Implementations

Some particular implementations and features are described in the following discussion. The technology disclosed can be practiced as a variety of methods, devices or systems, or a computer readable media impressed with program instructions that, when executed on hardware, cause the hardware either to carry out a disclosed method or combine with the hardware to form a disclosed device or system.

One method implementation of the technology disclosed automatically coordinates updates to multiple elements in a document. In this context, the document can be a presentation deck, storyboard, a word processing document, a dashboard, a spreadsheet or a web page. Figures that illustrate multi-way replication outcomes include FIG. 1, 2, 3 15A-D, 16A-B, 18A-C, 19. Element types subject to multi-way replication are in FIG. 4 and the text of the disclosure.

The implementation includes maintaining, for the document, multiple builds of property sets that include formatting and content properties, and publishing the property sets of the builds for use by elements of the document. The multiple builds are used for selectively multi-way replicating respective properties from the multiple builds onto the elements of the document that subscribe to the respective properties from the property sets of the respective builds. Publication and subscription are illustrated in FIG. 18-19 and FIG. 43-46. Selectively replicating the respective properties to which an individual element subscribes, from one or more respective builds, includes controlling the replicating responsive to fine-grained selection among and subscription to the formatting and content properties in the property sets of the respective builds. The change to an element when a different build is selected is illustrated in FIG. 13 1376, FIG. 14 A-D 1434, 1428, 1454, 1448. The selective multi-way replication to related elements, following a change to an element sharing the build of the altered property or properties, is illustrated in FIG. 1, 2, 3 15A-D, 16A-B, 18A-C, 19.

This method and other implementations of the technology disclosed can include one or more of the following features and/or features described in connection with additional methods disclosed. In the interest of conciseness, the combinations of features disclosed in this application are not individually enumerated and are not repeated with each base set of features. The method can be applied to replication in multiple documents, as illustrated in FIG. 27, 48, 49. Default settings for multi-way replication element properties can be established, as illustrated in FIG. 49. Named or titled groups of elements can be supported, as illustrated in FIG. 20B-C, 34. A named or titled group can be referenced as a single element. An element can be added to or removed from a group of elements, as illustrated in FIG. 23. Elements that subscribe to a particular build can be visually identified, by highlighting, for instance, upon selection of a build identifier, as illustrated in FIG. 44, 45, 46A-C.

In some implementations, the disclosed method further includes, when creating repeating elements on a page of the document in a group that begins with a base element, causing the repeating elements in the group to automatically subscribe to and share formatting properties subscribed to by the base element without subscribing to a content property of the base element.

The method can further include, responsive to a change in a formatting of any base or repeating element in the group, applying the change in formatting to other elements in the group that share a subscription to the formatting property changed. It can include, responsive to a change in a subscription to a formatting property of any base or repeating element in the group, differentiating the changed subscription from a shared subscription that is shared among other elements in the group. Elements can be automatically named in a group or outside a group, as illustrated in FIG. 4. A user can change automatically named elements to have a user selected name.

Some implementations of the disclosed method include, in a build mode and responsive to a user change to properties in a first build while in the build mode, creating a second build that combines unchanged and changed properties in the property set of the first build, while leaving the first build unchanged. An implementation of this build mode feature is illustrated in FIG. 9-FIG. 11. While in the build creation mode, the technology disclosed includes auto recording of build properties as the user adds properties to or changes properties of an element or elements which are the subject of the build creation. So, in addition to extending a first build to a second build, recording can be used to formulate the first build.

Figure 17B:
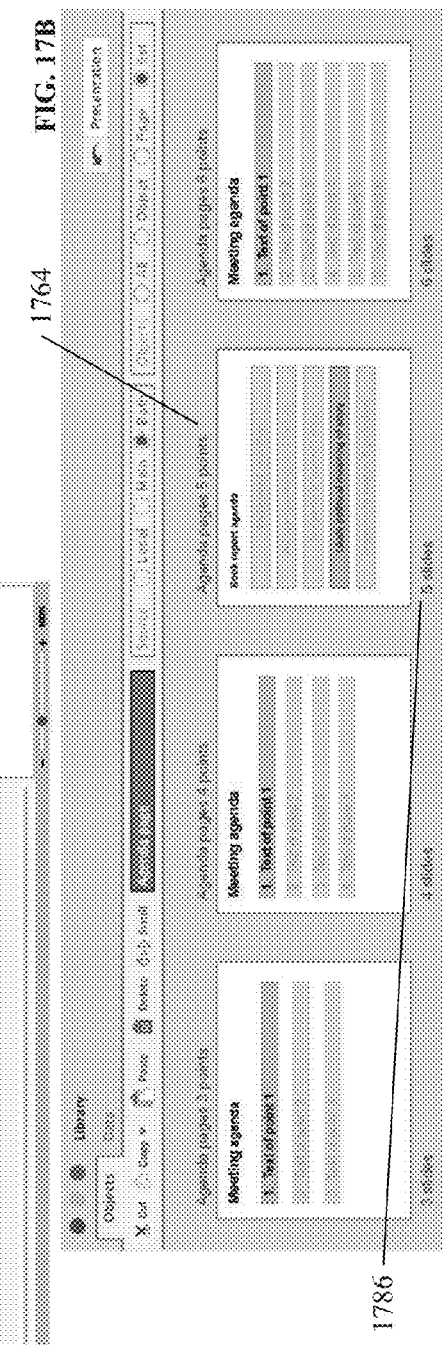
FIG. 17B shows a new library item, a meeting agenda with five slides, available in the library.

One implementation of the disclosed method includes a library containing different variants of elements and builds. Some of the element builds are subject to shared subscriptions such that changes are selectively or totally applied across related elements within the library. The disclosed method can also include a library containing different variants of elements sharing common characteristics in which the elements are grouped together based on those common characteristics and share similar types of shared subscriptions of multi-way replication changes. The different elements may share common characteristics like the different Agenda pages shown in FIG. 17B or the different arrow charts shown in FIG. 24A-C. The different builds may example their different properties in a visual way, as shown in FIG. 51A, to make it easier for a user to specifically select what they want for use and better understand, what is shared selectively or totally across the different related elements sharing build properties.

In a library, the elements can be nested elements that include a parent element and children elements. The parent element controls an order in which the children elements visually appear. The parent element can include a graphic frame in which the children elements visually appear. The property sets of the children elements include an orientation property. Responsive to rotation of the graphic frame of the parent element in the document, the method includes adjusting orientation of children elements in the graphic frame responsive to respective orientation properties of the children elements.

Several the orientation property members are available, that can be used together or separately, in a library or without a library. Selective transposition, orientation shifting is illustrated in FIG. 21, 22, 23, 28A-C. Available orientations include a snap to axis orientation that causes content of a child element to retain a graphic orientation along a major axis of the graphic frame, when the graphic frame is rotated. Another is a snap to most horizontal axis orientation that causes content of the child element to assume a graphic orientation along a first or second axis of the graphic frame, whichever is most horizontal, when the graphic frame is rotated. In this context, the first and second axis are orthogonal. A third is an orient to horizontal orientation that causes content of the child element to retain a horizontal orientation within the graphic frame, when the graphic frame is rotated.

More generally, the technology can be implemented as a method that includes maintaining property set subscriptions for nested elements that include a parent element and children elements. The parent element controls an order in which the children elements visually appear. The property sets of the children elements include an orientation property. Responsive to rotation of the parent element in the document, adjusting orientation of children elements in the parent element responsive to respective orientation properties of the children elements.

Another method that implements the technology disclosed coordinates updates in a first document of a first document type to elements in a second document of a second document type that is different from the first document type. This method extends the previous method from within a document to among multiple documents of different types, with synchronization direction control. It includes maintaining, for the first document, multiple builds of property sets that include formatting and content properties, and publishing the property sets of the builds for use by elements of the document. Then, selectively multi-way replicating respective properties that subscribe to the respective properties from the property sets of the respective builds. Selectively replicating respective properties from the multiple builds onto an element of the second document to which the element subscribes, from one or more respective builds, includes controlling the replicating responsive to fine-grained selection among and subscription to the formatting and content properties in the property sets of the respective builds and controlling synchronization of the formatting and content properties of the first and second documents responsive to property-by-property specification of a direction of synchronization.

In some instances, the first document type is a spreadsheet and the second document type is a presentation. The direction of synchronization can include from the first document to the second document, from the second document to the first document, and both ways.

Default blocking of synchronization can be configured, depending on the first and second document types, so that values are cloned and embedded but not linked, or so that content is embedded and linked. Examples of the default settings for across document synchronization are shown in FIG. 49, 50A-B. In some instances, our technology automatically blocks the linkage of properties that do not translate from document type to document type well, such as size or location that has a very different meaning in a spreadsheet than in a presentation document. In some cases, our technology will also create a clone document, for example for a spreadsheet that is specifically attached to a presentation, form, dashboard, Word or other document for purposes of retaining presentation specific spreadsheet values without altering values of the original spreadsheet.

As explained above, the preceding following features and/or features described in connection with this and following additional methods. In the interest of conciseness, the combinations of features disclosed in this application are not individually enumerated and are not repeated with each base set of features.

Yet another method that implements the technology disclosed connects cells in a spreadsheet to cells on a page in a document. As above, document has a broad meaning. Atomization of cells copied in a grid is illustrated in FIG. 29A-D, 30A-D, 34, 35, 36. The method includes both embedding and linking content of select cells within a grid of cells from a spreadsheet onto a page in a document. Content, in this context, includes values and formulas. The shape of a grid of cells depends on how it is selected. Lassoing cells selects a rectangle. An irregular grid of cells can be selected using a control-click selection, as shown in FIG. 48-49. Individual embedded and linked cells are rearrangeable, on the page of the document, from a pattern of cells selected in the spreadsheet. Responsive to user commands that rearrange the cells in the grid of cells on the page, the method includes rearranging individual cells or adjoining groups cells to positions on the page separated from the grid, while maintaining the linking of content of the rearranged individual cells to corresponding non-rearranged cells in the spreadsheet. Rearranging the cells in the document does not rearrange their position in the spreadsheet.

As explained above, the preceding following features and/or features described in connection with this and following additional methods. In the interest of conciseness, the combinations of features disclosed in this application are not individually enumerated and are not repeated with each base set of features.

This method implementation can further include selectively replicating respective properties to which an individual cell on the page subscribes from property sets of one or more respective builds, independently of formatting in the spreadsheet linked to the page, responsive to fine-grained selection among and subscription to formatting properties in the property sets of the respective builds.

A similar method implementation connects graph elements in a spreadsheet or data table to a page in a document. Application of atomization to graph elements, similar to atomization of cells from a grid, is illustrated in FIG. 31A-D, 32A-D, 33. This variation on the technology disclosed includes both embedding and linking content of graph elements from a spreadsheet onto a page in a document. Individual embedded and linked graph elements are rearrangeable, on the page of the document, from a pattern in the spreadsheet, without changing their positions in the spreadsheet. Responsive to user commands that rearrange the graph elements, rearranging individual graph elements or adjoining groups graph elements to positions on the page differing from the pattern the spreadsheet, while maintaining the linking of content of the rearranged individual graph elements on the page to corresponding graph elements in the spreadsheet.

Features can further include selectively replicating respective properties to which an individual graph element on the page subscribes from property sets of one or more of respective builds, allowing change from formatting in the spreadsheet linked to the page, responsive to fine-grained selection among and subscription to formatting properties in the property sets of the respective builds. The graph elements can include categorical labels and at least some of the categorical labels are rearranged from an axis to other positions on the page. The graph elements can include wedges of a pie or a donut chart and the rearranging includes rearranging a subset of wedges of the pie or donut chart. And, the graph elements can include bars of a bar graph and the rearranging includes rearranging an order of the bars on the page without changing formatting or content of the spreadsheet. Bars of a bar graph can be rearranged so at least some of the bars are positioned away from an axis used in the spreadsheet, rearranged to other positions on the page.

Some implementations of the disclosed technology can include the automatic creation of selective multi-way replicating capabilities for existing spreadsheet, presentation, or other document elements. This capability is exampled in FIG. 42A-C, 43 where our technology automatically converts selected elements of an existing document into selective multi-way replicating elements automatically identifying and grouping differences in the content, formatting and other properties. One embodiment of this implementation includes analyzing a selected grid of cells in a document to determine formatting properties applied to the cells. While cells are referred to in this description, a presentation document might have text boxes or other elements, to which the technology disclosed equally applies. The example of cells in a spreadsheet may be the easiest to follow. The method continues with creating a build of property sets that includes formatting properties shared by the cells in the grid. For a formatting property that differs among the cells in the grid, automatically identifying each property value of the formatting property applied in any of the cells in the grid, and automatically establishing a build group that represents each property value with a distinct symbol. Then, publishing the build groups and property sets of the build for use by elements of the document.

Some method implementations further include, responsive to user selection of a first distinct symbol, causing display with emphasis on the cells in the selected grid which apply a property value corresponding to the first distinct symbol.

Other method implementations further include, responsive to user selection of a first distinct symbol in the context of an element of the document, applying a property value corresponding to the first distinct symbol to a corresponding property of the element of the document.

The method implementation of the technology disclosed also can be practiced as a device or system. A device can include a processor and memory, the memory loaded with instructions that, when executed, cause the device to locally implement any of the methods disclosed. A system can include a local device running a browser or light weight interface that uses network based web apps and connects to a server, instead of using traditional applications to implement the technology disclosed.

Yet another implementation may include a tangible, non-transitory computer readable storage media including computer program instructions that, when combined with computer hardware and executed, cause a computer to implement any of the methods described earlier. In this application, tangible computer readable storage media do not include non-patentable transitory signals. While the technology disclosed could be implemented using transitory signals, reference to tangible computer readable storage media does not include the non-patentable transitory signals. If the law changes and transitory signals become patentable, separate claims may be made to transitory signals.

Yet another implementation may include a tangible, non-transitory computer readable media, including program instructions loaded onto the media that, when combined with computer hardware, configures the hardware device to carry out any of the devices or systems described.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method of automatically coordinating updates to elements in a document, including:
    maintaining multiple builds of property sets that include formatting properties and content, and publishing resulting build sets for use by elements of the document;
    applying, to an individual element of the document, fine-grained selection by a user among the formatting properties and content from both first and second build sets, thereby causing the individual element to subscribe to some, but not all of the formatting properties and content of each of the first and second build sets;
    upon updating of the first build set, including updating of at least a first one of the formatting properties and content to which the individual element subscribes, automatically propagating a first update to the individual element; and
    upon updating of the second build set, including updating of at least a second one of the formatting properties and content to which the individual element subscribes, automatically propagating a second update to the individual element;
    thereby automatically selectively multi-way replicating to the individual element subscribed-to properties from both the first and the second builds.

2. The method of claim 1, further including:
    when creating repeating elements on a page of the document in a group that begins with a base element, causing the repeating elements in the group to automatically subscribe to and share formatting properties subscribed to by the base element without subscribing to the content of the base element.

3. The method of claim 2, further including:
    responsive to a change in a formatting of any base or repeating element in the group, applying the change in formatting to other elements in the group that share a subscription to the formatting property changed.

4. The method of claim 2, further including:
    responsive to a change in a subscription to a formatting property of any base or repeating element in the group, differentiating the changed subscription from a shared subscription that is shared among other elements in the group.

5. The method of claim 1, further including:
    in a build mode and responsive to a user change to properties in a first build while in the build mode, creating a second build that combines unchanged and changed properties in the property set of the first build, while leaving the first build unchanged.

6. The method of claim 1, further including:
    a library containing different variants of elements and builds; and
    wherein some of the element builds are subject to shared subscriptions such that changes are selectively applied across related elements within the library.

7. The method of claim 6, further including:
    in a library containing different variants of elements sharing common characteristics; and
    wherein the elements are grouped together based on those common characteristics and share similar types of shared subscriptions of multi-way replication changes.

8. The method of claim 1, further including:
    maintaining property set subscriptions for nested elements that include a parent element and children elements;
    wherein the parent element includes a graphic frame in which the children elements visually appear;
    wherein the property sets of the children elements include an orientation property; and
    responsive to rotation of the graphic frame of the parent element in the document, adjusting orientation of children elements in the graphic frame responsive to respective orientation properties of the children elements.

9. The method of claim 8, wherein the orientation properties include:
    a snap to axis orientation that causes content of a child element to retain a graphic orientation along a major axis of the graphic frame, when the graphic frame is rotated;
    a snap to most horizontal axis orientation that causes content of the child element to assume a graphic orientation along a first or second axis of the graphic frame, whichever is most horizontal, when the graphic frame is rotated, wherein the first and second axis are orthogonal; and an orient to horizontal orientation that causes content of the child element to retain a horizontal orientation within the graphic frame, when the graphic frame is rotated.

10. The method of claim 1, further including:
maintaining property set subscriptions for nested elements that include a parent element and children elements;
   wherein the parent element controls an order in which the children elements visually appear;
   wherein the property sets of the children elements include an orientation property; and
responsive to rotation of the parent element in the document, adjusting orientation of children elements in the parent element responsive to respective orientation properties of the children elements.

11. A device including a processor and memory, the memory loaded with instructions that, when executed, cause the processor to carry out the method of claim 1.

12. A tangible computer readable storage media loaded with instructions that, when combined with a hardware device, configures the hardware device to carry out the method of claim 1.

* * * * *